US012677082B2

(12) United States Patent
   Yamashita

(10) Patent No.: US 12,677,082 B2
(45) Date of Patent: Jul. 7, 2026

(54) IMAGING APPARATUS AND ELECTRONIC APPARATUS HAVING A TRANSFER TRANSISTOR GATE ELECTRODE EXTENDING INTO A PIXEL SEPARATION SECTION FROM A FIRST SURFACE TO A SECOND SURFACE OF A SEMICONDUCTOR SUBSTRATE

(71) Applicant: SONY SEMICONDUCTOR SOLUTIONS CORPORATION, Kanagawa (JP)

(72) Inventor: Hirofumi Yamashita, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 10 days.

(21) Appl. No.: 18/847,579

(22) PCT Filed: Mar. 22, 2023

(86) PCT No.: PCT/JP2023/011085
   § 371 (c)(1),
   (2) Date: Sep. 16, 2024

(87) PCT Pub. No.: WO2023/189882
   PCT Pub. Date: Oct. 5, 2023

(65) Prior Publication Data
   US 2025/0211879 A1    Jun. 26, 2025

(30) Foreign Application Priority Data
   Mar. 31, 2022    (JP) ................................. 2022-059051

(51) Int. Cl.
   *H04N 5/335*      (2011.01)
   *H04N 25/772*     (2023.01)
   (Continued)

(52) U.S. Cl.
   CPC ........... *H04N 25/79* (2023.01); *H04N 25/772* (2023.01); *H04N 25/78* (2023.01)

(58) Field of Classification Search
   CPC ..................................................... H10F 39/807
   See application file for complete search history.

(56) References Cited

U.S. PATENT DOCUMENTS 12,356,748 B2 *   7/2025   Matsumura ........... H10F 39/199
12,453,195 B2 *   10/2025   Nakamoto ............ H10F 39/813
   (Continued)

FOREIGN PATENT DOCUMENTS

JP      2010-114273      5/2010
JP      2011-159757      8/2011
   (Continued)

OTHER PUBLICATIONS

English Translation of International Search Report prepared by the Japan Patent Office on Jun. 15, 2023, for International Application No. PCT/JP2023/011085, 2 pgs.

*Primary Examiner* — Gary C Vieaux
(74) *Attorney, Agent, or Firm* — SHERIDAN ROSS P.C.

(57) ABSTRACT

An imaging apparatus includes a plurality of pixels each including a photoelectric conversion section that is located in a pixel region divided by the pixel separation section and generates a charge according to incident light, a floating diffusion that holds the charge generated by the photoelectric conversion section, and a transfer transistor that transfers the charge from the photoelectric conversion section to the floating diffusion. The transfer transistor has a gate electrode that extends into the pixel separation section, along a thickness direction of a first semiconductor substrate, from a second surface of the first semiconductor substrate located on an opposite side to a first surface that is a light incident surface of the first semiconductor substrate.

20 Claims, 37 Drawing Sheets

(51) Int. Cl.
    H04N 25/78      (2023.01)
    H04N 25/79      (2023.01)

(56)           References Cited

U.S. PATENT DOCUMENTS

2009/0303371  A1     12/2009   Watanabe et al.
2011/0181749  A1      7/2011   Yamada
2021/0084249  A1      3/2021   Nakazawa et al.
2024/0422454  A1*    12/2024   Togashi  ................ H10F 39/191

FOREIGN PATENT DOCUMENTS

JP          2021-101491        7/2021
JP          2021-153161        9/2021
WO      WO 2019/131965         7/2019

* cited by examiner

THICKNESS DIRECTION

THICKNESS
DIRECTION

THICKNESS
DIRECTION

FIG.18E

THICKNESS
DIRECTION

THICKNESS DIRECTION

FIG.34

IMAGING APPARATUS AND ELECTRONIC APPARATUS HAVING A TRANSFER TRANSISTOR GATE ELECTRODE EXTENDING INTO A PIXEL SEPARATION SECTION FROM A FIRST SURFACE TO A SECOND SURFACE OF A SEMICONDUCTOR SUBSTRATE

CROSS REFERENCE TO RELATED APPLICATIONS

This application is a national stage application under 35 U.S.C. 371 and claims the benefit of PCT Application No. PCT/JP2023/011085, having an international filing date of 22 Mar. 2023, which designated the United States, which PCT application claimed the benefit of Japanese Patent Application No. 2022-059051, filed 31 Mar. 2022, the entire disclosures of each of which are incorporated herein by reference.

FIELD

The present disclosure relates to an imaging apparatus and an electronic apparatus.

BACKGROUND

In recent years, in order to realize further downsizing of an imaging apparatus, a three-dimensional imaging apparatus has been proposed. As an example, an imaging apparatus in Patent Literature 1 below is disclosed. In a technology disclosed in Patent Literature 1, a substrate provided with a plurality of pixels and a substrate provided with a plurality of pixel transistors that drives each pixel are stacked on each other, thereby downsizing the imaging apparatus.

CITATION LIST

Patent Literature

Patent Literature 1: WO 2019/131965 A

SUMMARY

Technical Problem

However, in the conventional technology, when the imaging apparatus is further downsized, noise may increase due to further size reduction of a transfer transistor. As a result, image quality may be deteriorated.

Therefore, the present disclosure proposes an imaging apparatus and an electronic apparatus capable of suppressing deterioration in image quality.

Solution to Problem

According to the present disclosure, there is provided an imaging apparatus including: a first semiconductor substrate; a plurality of pixels arranged along a row direction and a column direction on the first semiconductor substrate; and a pixel separation section that partitions the first semiconductor substrate into a plurality of pixel regions in which the pixels are respectively arranged. The plurality of pixels is adjacent to each other. In the imaging apparatus, each of the plurality of pixels includes: a photoelectric conversion section that is located in one of the pixel regions partitioned by the pixel separation section and generates a charge according to incident light; a floating diffusion that holds the charge generated by the photoelectric conversion section; and a transfer transistor that transfers the charge from the photoelectric conversion section to the floating diffusion, and the transfer transistor has a gate electrode that extends into the pixel separation section, along a thickness direction of the first semiconductor substrate, from a second surface of the first semiconductor substrate located on an opposite side to a first surface that is a light incident surface of the first semiconductor substrate.

Furthermore, according to the present disclosure, there is provided an electronic apparatus including an imaging apparatus. The imaging apparatus includes: a first semiconductor substrate; a plurality of pixels arranged along a row direction and a column direction on the first semiconductor substrate; and a pixel separation section that partitions the first semiconductor substrate into a plurality of pixel regions in which the pixels are respectively arranged. The plurality of pixels is adjacent to each other. In the imaging apparatus, each of the plurality of pixels includes: a photoelectric conversion section that is located in one of the pixel regions partitioned by the pixel separation section and generates a charge according to incident light; a floating diffusion that holds the charge generated by the photoelectric conversion section; and a transfer transistor that transfers the charge from the photoelectric conversion section to the floating diffusion, and the transfer transistor has a gate electrode that extends in the pixel separation section, along a thickness direction of the first semiconductor substrate, from a second surface of the first semiconductor substrate located on an opposite side to a first surface that is a light incident surface of the first semiconductor substrate.

BRIEF DESCRIPTION OF DRAWINGS

FIG. 16 is a diagram of assistance in explaining a part of a plane of the imaging apparatus 1 according to a seventh embodiment of the present disclosure.

FIG. 18B is a diagram of assistance in explaining a part of the method of manufacturing the imaging apparatus 1 according to the first embodiment of the present disclosure subsequent to FIG. 18A.

FIG. 18E is a diagram of assistance in explaining a part of the method of manufacturing the imaging apparatus 1 according to the first embodiment of the present disclosure subsequent to FIG. 18D.

FIG. 18F is a diagram of assistance in explaining a part of the method of manufacturing the imaging apparatus 1 according to the first embodiment of the present disclosure subsequent to FIG. 18E.

FIG. 18G is an explanatory diagram depicting a diagram of assistance in explaining a part of the method of manufacturing the imaging apparatus 1 according to the first embodiment of the present disclosure subsequent to FIG. 18F.

FIG. 34 is a block diagram depicting an example of schematic functional configuration of a smartphone.

DESCRIPTION OF EMBODIMENTS

Figure 1:
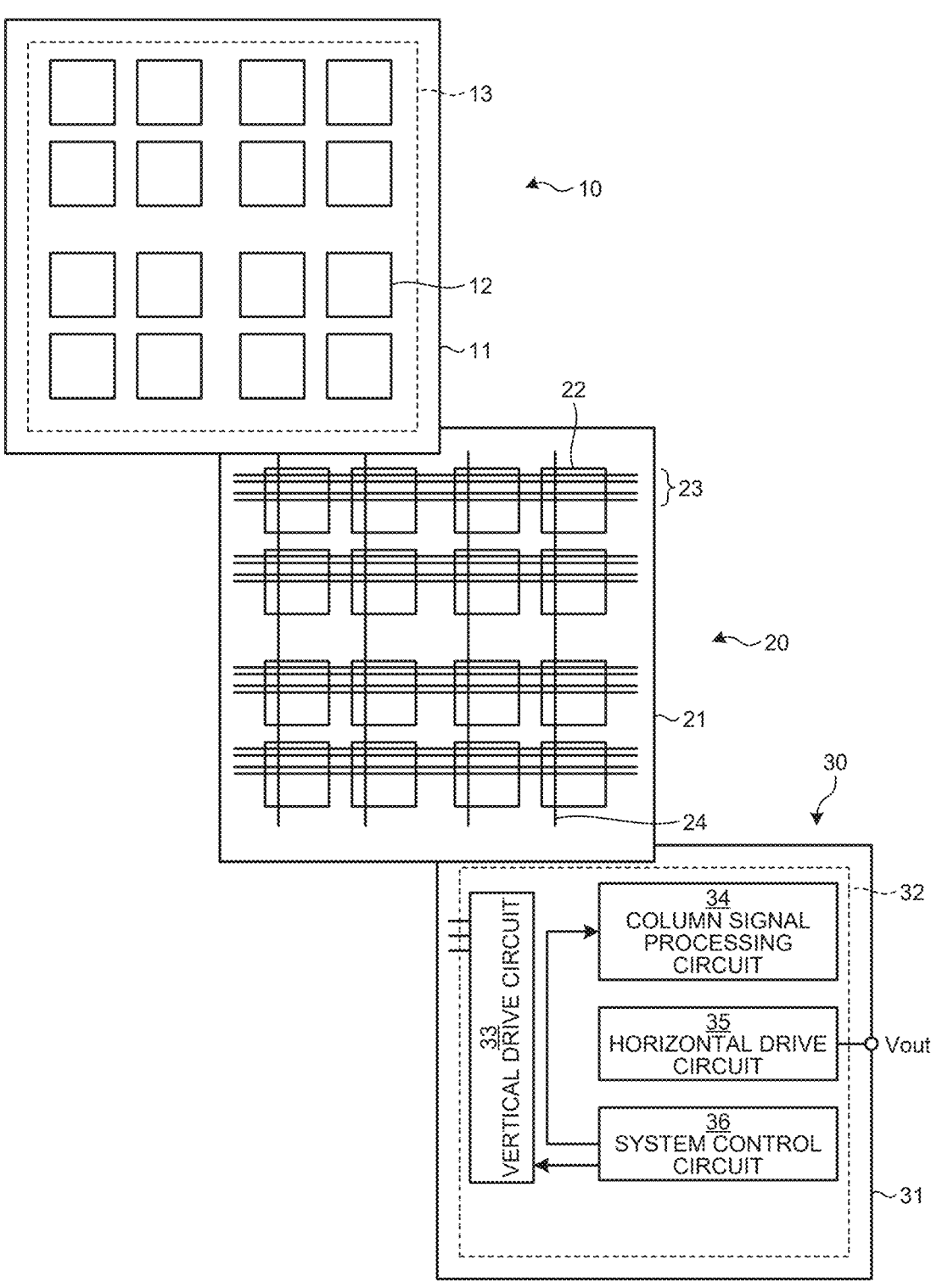
FIG. 1 is a diagram of assistance in explaining a planar configuration example of an imaging apparatus 1 according to an embodiment of the present disclosure.

Hereinafter, embodiments of the present disclosure will be described with reference to the drawings. In each of the following embodiments, same parts are given the same reference signs to omit redundant description.

In addition, in the present specification and the drawings, a plurality of components having substantially the same or similar functional configurations may be distinguished by attaching different numbers after the same reference signs. However, when it is not particularly necessary to distinguish each of the plurality of components having substantially the same or similar functional configuration, only the same reference sign is given. In addition, similar components in different embodiments may be distinguished by adding different alphabets after the same reference signs. However, when it is not necessary to particularly distinguish each of similar components, only the same reference sign is given.

In addition, the drawings referred to in the following description are drawings for facilitating the description and understanding of an embodiment of the present disclosure, and shapes, dimensions, ratios, and the like illustrated in the drawings may be different from actual ones for the sake of clarity. Furthermore, an imaging apparatus illustrated in the drawings can be appropriately modified in design in consideration of the following description and known techniques. Furthermore, in the description using a cross-sectional view of the imaging apparatus, a vertical direction of a stacked structure of the imaging apparatus corresponds to a relative direction when a light receiving surface into which light incident on the imaging apparatus enters is downward, and may be different from the vertical direction according to actual gravitational acceleration.

Furthermore, in the following description, "electrically connecting" means connecting a plurality of elements directly or indirectly via other elements.

Furthermore, in the following description, "sharing" means the use of one other element (e.g., on-chip lens) by elements different from each other (e.g., pixels).

Note that the description will be given in the following order.

<1. Schematic configuration of imaging apparatus>
<2. Background to creation of embodiments according to the present disclosure by the inventor>
<3. First embodiment>
<3-1. Cross-sectional configuration>
<3-2. Planar configuration>
<3-3. Modification>
<4. Second embodiment>
<5. Third embodiment>
<6. Fourth embodiment>
<7. Fifth embodiment>
<8. Sixth embodiment>
<8-1. Planar configuration>
<8-2. Cross-sectional configuration>
<9. Seventh embodiment>
<10. Method of manufacturing imaging apparatus 1 according to first embodiment>
<11. Eighth embodiment>
<11-1. Schematic configuration of imaging apparatus>
<11-2. Cross-sectional configuration>
<11-3. Planar configuration>
<11-4. First modification>
<11-5. Second modification>
<12. Summary>
<13. Application examples>
<13-1. Application to camera>
<13-2. Application to smartphone>
<13-3. Application to mobile body>
<14. Supplement>

1. Schematic Configuration of Imaging Apparatus

A schematic configuration of an imaging apparatus 1 according to an embodiment of the present disclosure will be described with reference to FIGS. 1 and 2A to 2C. FIG. 1 is a diagram of assistance in explaining a configuration example of the imaging apparatus 1 according to the embodiment of the present disclosure. The imaging apparatus 1 includes three substrates (a first substrate 10, a second substrate 20, and a third substrate 30). The imaging apparatus 1 has a three-dimensional structure formed by bonding the three substrates (the first substrate 10, the second substrate 20, the third substrate 30). The first substrate 10, the second substrate 20, and the third substrate 30 are stacked in this order.

The first substrate 10 includes a plurality of pixels 12, on a semiconductor substrate 11, that performs photoelectric conversion. The semiconductor substrate 11 corresponds to a specific example of a "first semiconductor substrate" of the present disclosure. The plurality of pixels 12 is provided on a matrix in a pixel region 13 in the first substrate 10. The second substrate 20 includes, on a semiconductor substrate 21, a readout circuit 22 that outputs a pixel signal based on a charge output from the pixel 12. The semiconductor substrate 21 corresponds to a specific example of a "second semiconductor substrate" of the present disclosure. The second substrate 20 includes a plurality of pixel drive lines 23 extending in a row direction and a plurality of vertical signal lines 24 extending in a column direction. The third substrate 30 includes a logic circuit 32, on a semiconductor substrate 31, that processes a pixel signal. The semiconductor substrate 31 corresponds to a specific example of a "third semiconductor substrate" of the present disclosure. The logic circuit 32 includes, for example, a vertical drive circuit 33, a column signal processing circuit 34, a horizontal drive circuit 35, and a system control circuit 36. The logic circuit 32 (specifically, the horizontal drive circuit 35) outputs an output voltage Vout of each pixel 12 to outside. In the logic circuit 32, for example, a low resistance region including silicide such as cobalt silicide ($CoSi_2$) or nickel silicide (NiSi) formed using a self aligned silicide process may be formed on a surface of an impurity diffusion region in contact with a source electrode and a drain electrode.

For example, the vertical drive circuit 33 sequentially selects the plurality of pixels 12 row by row. For example, the column signal processing circuit 34 performs an analog-to-digital (AD) conversion process and a correlated double sampling (CDS) process on the pixel signal output from each pixel 12 in a row selected by the vertical drive circuit 33. The column signal processing circuit 34 extracts a signal level of a pixel signal by performing, for example, the CDS process and holds pixel data corresponding to an amount of received light of each pixel 12. For example, the horizontal drive circuit 35 sequentially outputs the pixel data held in the column signal processing circuit 34 to the outside. For example, the system control circuit 36 controls driving of each block (vertical drive circuit 33, column signal processing circuit 34, and horizontal drive circuit 35) in the logic circuit 32.

Figure 2A:
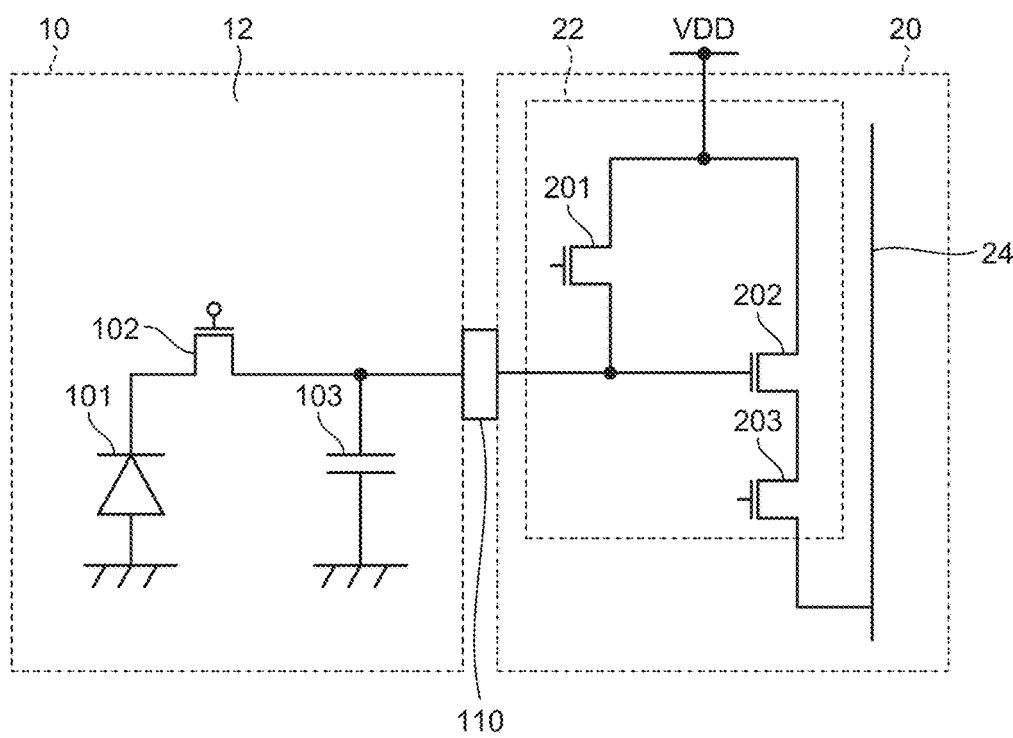
FIG. 2A is a diagram of assistance in explaining an example of a pixel and a readout circuit in FIG. 1.
Figure 2B:
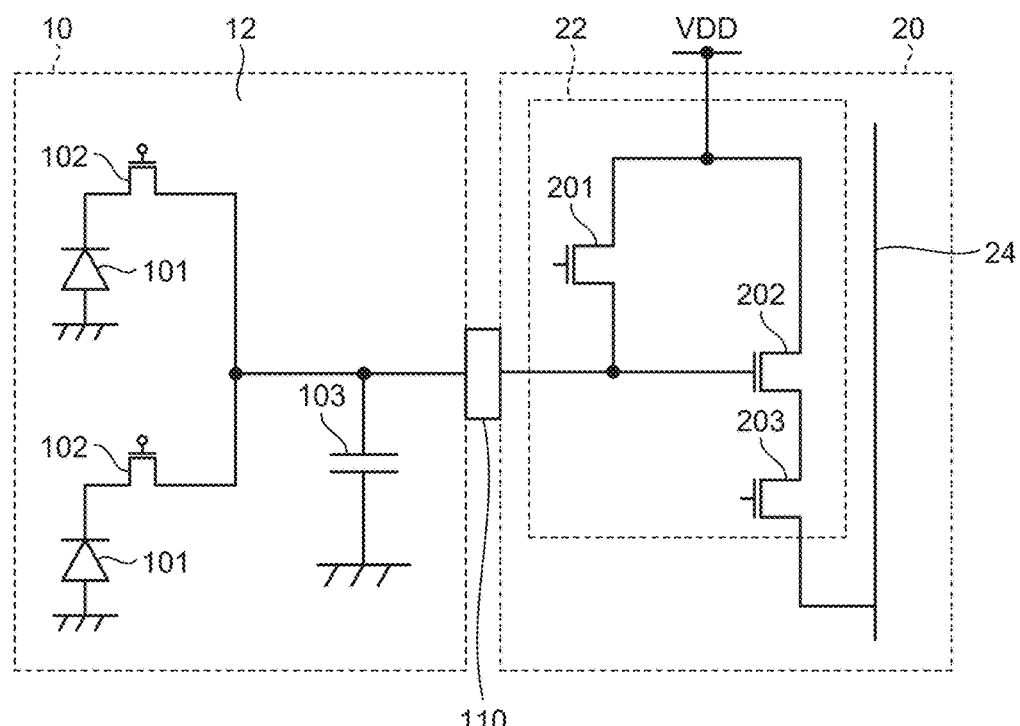
FIG. 2B is a diagram of assistance in explaining an example of the pixel and the readout circuit in FIG. 1.
Figure 2C:
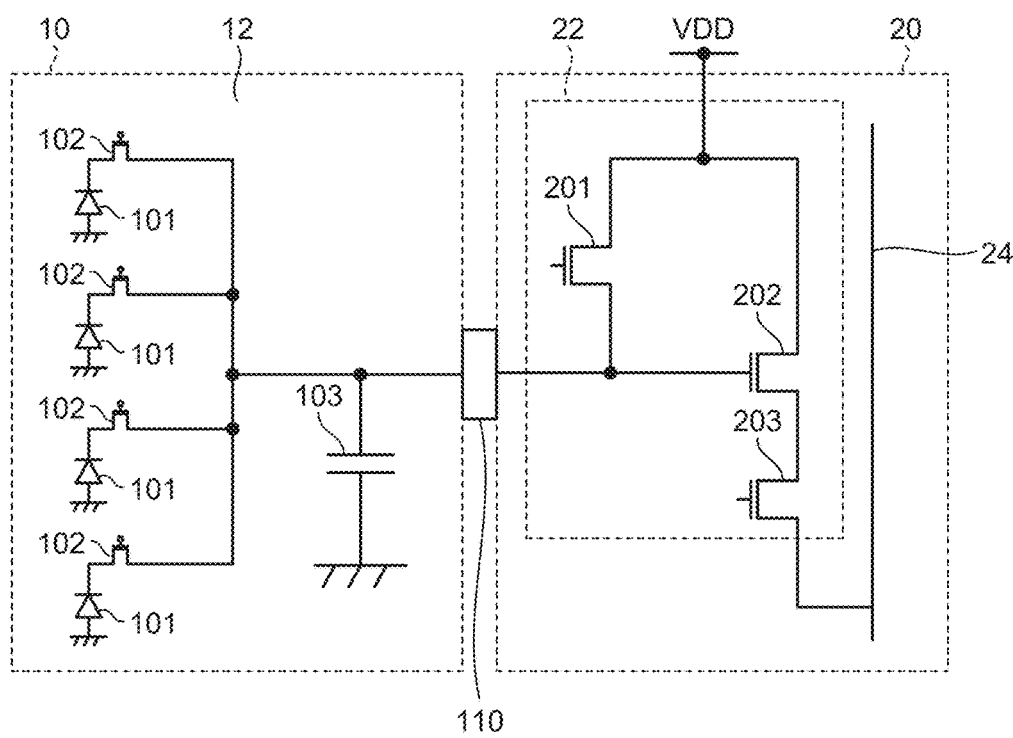
FIG. 2C is a diagram of assistance in explaining an example of the pixel and the readout circuit in FIG. 1.

FIGS. 2A to 2C are diagrams depicting examples of the pixel 12 and the readout circuit 22. FIG. 2A depicts a case where the pixel 12 is electrically connected to one readout circuit 22. FIG. 2B depicts a case where two pixels 12 share one readout circuit 22. FIG. 2C depicts a case where four pixels 12 share one readout circuit 22. Hereinafter, a circuit configuration in each of FIGS. 2A to 2C will be described. Here, "sharing" means that outputs of two or four pixels 12 are input to a common readout circuit 22.

Each pixel 12 in FIG. 2A has a common component. Each pixel 12 includes, for example, a photoelectric conversion section 101, a transfer transistor 102 electrically connected to the photoelectric conversion section 101, and a floating diffusion 103 that temporarily holds a charge output from the photoelectric conversion section 101 via the transfer transistor 102. The photoelectric conversion section 101 performs photoelectric conversion to generate a charge corresponding to the amount of received light. A cathode of the photoelectric conversion section 101 is electrically connected to a source of the transfer transistor 102, and an anode of the photoelectric conversion section 101 is electrically connected to a reference potential line (e.g., ground). A drain of the transfer transistor 102 is electrically connected to the floating diffusion 103, and a gate of the transfer transistor 102 is electrically connected to the pixel drive line 23. The transfer transistor 102 is, for example, a complementary metal oxide semiconductor (CMOS) transistor.

The readout circuit 22 includes, for example, a reset transistor 201, an amplification transistor 202, and a selection transistor 203. Note that the selection transistor 203 may be omitted as necessary. A source of the reset transistor 201 (input end of the readout circuit 22) is electrically connected to the floating diffusion 103, and a drain of the reset transistor 201 is electrically connected to a power supply line VDD and a drain of the amplification transistor 202. A gate of the reset transistor 201 is electrically connected to the pixel drive line 23 (see FIG. 1). A source of the amplification transistor 202 is electrically connected to the drain of the selection transistor 203, and a gate of the amplification transistor 202 is electrically connected to the source of the reset transistor 201. A source of the selection transistor 203 (output end of the readout circuit 22) is electrically connected to the vertical signal line 24, and a gate of the selection transistor 203 is electrically connected to the pixel drive line 23 (see FIG. 1). Note that the pixel 12 and the readout circuit 22 are electrically connected via a connecting section 110. Further, the floating diffusion 103 and the amplification transistor 202 are electrically connected via the connecting section 110. In addition, the readout circuit 22 and the logic circuit 32 are electrically connected via the connecting section 110. The connecting section 110 is made of, for example, a metal material such as tungsten (W), aluminum (Al), or copper (Cu).

Figure 3:
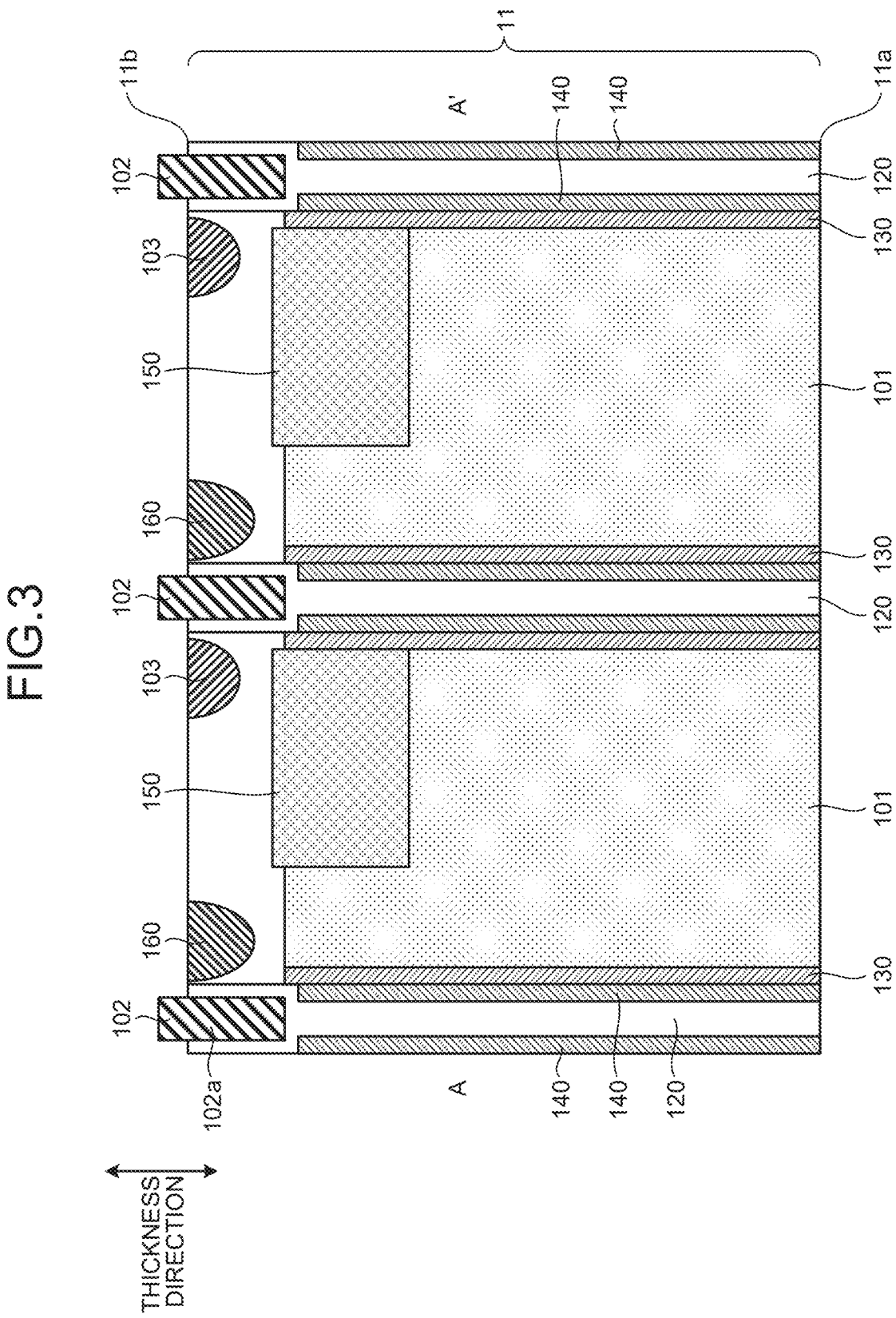
FIG. 3 is a diagram of assistance in explaining a part of a cross section of the imaging apparatus 1 according to a first embodiment of the present disclosure.

When the transfer transistor 102 is turned on, the transfer transistor 102 transfers the charge of the photoelectric conversion section 101 to the floating diffusion 103. A gate 102a of the transfer transistor 102 is provided, for example, to extend from a surface of the semiconductor substrate 11 opposite to a light incident surface to an inside of the pixel separation section 120 in a thickness direction of the semiconductor substrate 11 as depicted in FIG. 3 to be described later. The reset transistor 201 resets a potential of the floating diffusion 103 to a predetermined potential. When the reset transistor 201 is turned on, the potential of the floating diffusion 103 is reset to the potential of the power supply line VDD. The selection transistor 203 controls an output timing of the pixel signal from the readout circuit 22. The amplification transistor 202 generates a signal (voltage signal) of a voltage corresponding to a level of charge held in the floating diffusion 103 as the pixel signal. When the selection transistor 203 is turned on, the amplification transistor 202 amplifies the potential of the floating diffusion 103 and outputs a voltage corresponding to the potential to the column signal processing circuit 34 via the vertical signal line 24. The reset transistor 201, the amplification transistor 202, and the selection transistor 203 are, for example, CMOS transistors.

The case where each pixel 12 is electrically connected to one readout circuit 22 has been described above. Cases where two or four pixels 12 share one readout circuit 22 as depicted in FIGS. 2B and 2C will be described below.

FIG. 2B depicts a configuration different from the configuration in FIG. 2A in that two pixels 12 share the floating diffusion 103 and are electrically connected to the input end of the common readout circuit 22. Other configurations are common to those in FIG. 2A.

FIG. 2C depicts a configuration different from the configuration in FIG. 2A or FIG. 2B in that four pixels 12 share the floating diffusion 103 and are electrically connected to the input end of the common readout circuit 22. Other configurations are common to those in FIG. 2A or FIG. 2B.

Figure 2D:
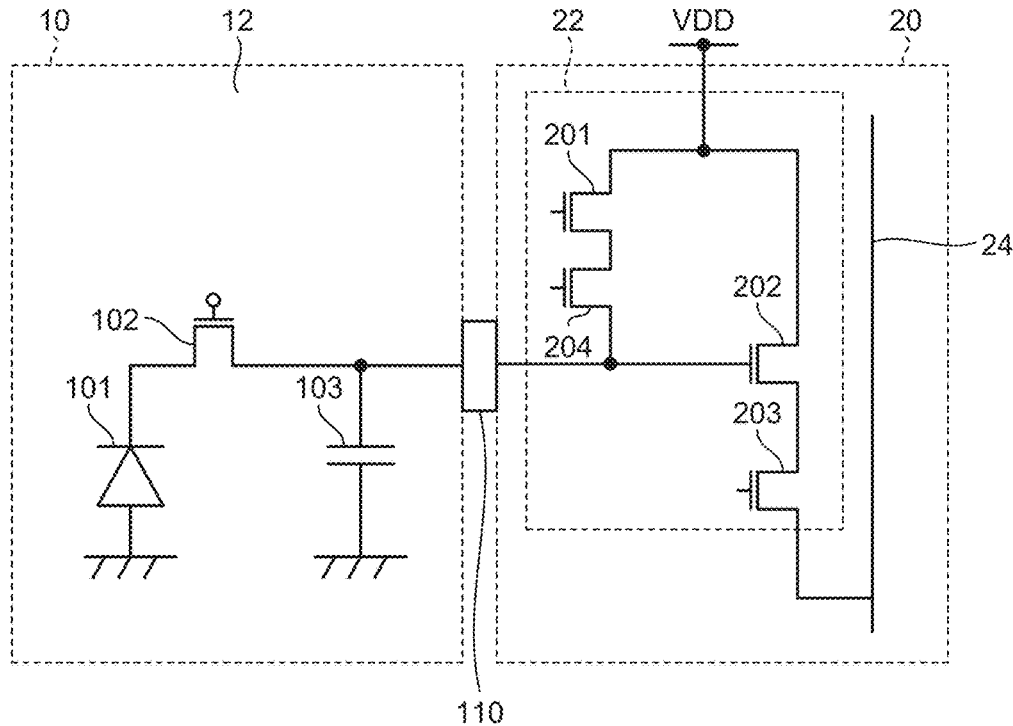
FIG. 2D is a diagram of assistance in explaining an example of the pixel and the readout circuit in FIG. 1.

Note that the configuration of the imaging apparatus 1 according to the present embodiment is not limited to the configurations depicted in FIGS. 1 and 2A to 2C. For example, in FIGS. 2A to 2C, a conversion efficiency switching transistor 204 may be further provided between the source of the reset transistor 201 and the gate of the amplification transistor 202. FIG. 2D depicts a case where each pixel 12 is electrically connected to one readout circuit 22, and the readout circuit 22 further includes the conversion efficiency switching transistor 204.

FIG. 2D depicts an example in which the readout circuit 22 further includes the conversion efficiency switching transistor 204. The conversion efficiency switching transistor 204 is used to switch the conversion efficiency. In general, a signal charge is small at the time of photographing in a dark place. When a capacitance of the floating diffusion 103 is large at the time of performing charge-voltage conversion based on $Q=CV$, V at the time of conversion into voltage by the amplification transistor 202 becomes small. On the other hand, since the signal charge increases in a bright place, the floating diffusion 103 cannot fully receive the charge of the photoelectric conversion section 101 unless the floating diffusion 103 has a large capacitance. Furthermore, the capacitance of the floating diffusion 103 needs to be large so that V does not become too large when the charge is converted into a voltage by the amplification transistor 202. In view of these, when the conversion efficiency switching transistor 204 is turned on, the gate capacitance of the conversion efficiency switching transistor 204 increases, so that the capacitance of the entire floating diffusion 103 increases. On the other hand, when the conversion efficiency switching transistor 204 is turned off, the capacitance of the entire floating diffusion 103 decreases. As described above, by switching on and off the conversion efficiency switching transistor 204, the capacitance of the floating diffusion 103 can be made variable, and the conversion efficiency can be switched.

Note that although FIG. 2D depicts a case where one readout circuit 22 is electrically connected to each pixel 12, a plurality of pixels 12 may share one readout circuit 22 as depicted in FIGS. 2B and 2C.

2. Background to Creation of Embodiments According to the Present Disclosure by the Inventor Next, before describing the details of the embodiments according to the present disclosure, a background in which the inventor of the present disclosure has created the embodiments according to the present disclosure will be described.

The inventor of the present disclosure has studied further downsizing of the imaging apparatus 1 with the above-described configuration. However, as the inventor has made intensive studies, it has become clear that it is difficult to sufficiently transfer the signal charge of the photoelectric conversion section 101 by the transfer transistor 102 when the imaging apparatus 1 is downsized because a gate area of the transfer transistor 102 is also reduced. When the transfer of the signal charge is insufficient, noise may be generated due to the signal charge that cannot be transferred, and the image quality may be deteriorated. In other words, the inventor has found that it is difficult to avoid deterioration in image quality when the imaging apparatus 1 is further downsized.

Therefore, in view of the above situation, the inventor has uniquely conceived extension of the gate 102a of the transfer transistor 102 into the pixel separation section 120. In the embodiments of the present disclosure created by the inventor, a suitable gate area can be secured in a thickness direction of the semiconductor substrate 11 by extending the gate 102a into the pixel separation section 120 even when the area of the gate 102a of the transfer transistor 102 on a plane of the semiconductor substrate 11 is reduced. Therefore, in the embodiments of the present disclosure, since a width of a transfer channel can be enlarged, the signal charge of the photoelectric conversion section 101 can be sufficiently and efficiently transferred, and noise caused by reduction in the gate area of the transfer transistor 102 on the plane of the semiconductor substrate 11 can be suppressed. As a result, according to the embodiments of the present disclosure, it is possible to suppress deterioration in image quality in the imaging apparatus 1.

In other words, based on the above-described point of view, the inventor has created the embodiments according to the present disclosure capable of suppressing deterioration in image quality while downsizing the imaging apparatus 1. Hereinafter, details of the embodiments according to the present disclosure created by the inventor will be sequentially described.

3. First Embodiment

<3-1. Cross-Sectional Configuration>

First, a cross-sectional configuration of the imaging apparatus 1 according to a first embodiment of the present disclosure will be described with reference to FIG. 3. FIG. 3 is a diagram of assistance in explaining a part of a cross section of the imaging apparatus 1 according to the present embodiment, and specifically corresponds to a cross section obtained by cutting the imaging apparatus 1 along line A-A' in FIG. 4.

As depicted in FIG. 3, the imaging apparatus 1 according to the present embodiment includes the semiconductor substrate 11 and the pixel separation section 120 provided on the semiconductor substrate 11. In addition, the semiconductor substrate 11 includes the photoelectric conversion section 101, the transfer transistor 102, and the floating diffusion 103.

The semiconductor substrate 11 is made of, for example, a silicon substrate. For example, the photoelectric conversion section 101 having impurities of a first conductivity type (e.g., N type) is provided in the semiconductor substrate 11 of a second conductivity type (e.g., P type) for each of the plurality of pixels 12 adjacent to each other. For example, the photoelectric conversion section 101 contains the above impurities of $1E16$ $cm^{-3}$ to $5E17$ $cm^{-3}$. Note that the impurity concentration of the photoelectric conversion section 101 is not limited thereto, and may be out of the above range depending on the size (pixel size) of an imaging element 100. Furthermore, the plurality of pixels 12 is provided with the floating diffusion 103 containing impurities having the same first conductivity type as the photoelectric conversion section 101 at a higher concentration than the photoelectric conversion section 101. The semiconductor substrate 11 has a configuration in which the transfer transistor 102 and the floating diffusion 103 are provided in a portion on a front surface (second surface) 11b side (side opposite to light incident surface (first surface) 11a, side of the second substrate 20) of the semiconductor substrate 11. For example, the floating diffusion 103 includes impurities of the first conductivity type of $1E19$ $cm^{-3}$ to $1E21$ $cm^{-3}$.

Note that, in the embodiment of the present disclosure described above, the imaging element 100 in which the first conductivity type is N type, the second conductivity type is P type, and an electron is used as the signal charge has been described, but the embodiments of the present disclosure are not limited thereto. For example, the present embodiment can also be applied to the imaging element 100 in which the first conductivity type is P-type, the second conductivity type is N-type, and a hole is used as the signal charge.

Furthermore, in the present embodiment, the plurality of pixels 12 adjacent to each other is physically separated by the pixel separation section 120. The pixel separation section 120 includes a groove (trench) provided as a penetrating deep trench isolation (DTI) so as to penetrate the semiconductor substrate 11 along the thickness direction of the semiconductor substrate 11, and a material embedded in the trench, for example, an insulating film (insulating layer) such as silicon oxide ($SiO_2$), a conductive material such as polycrystalline silicon (Poly-Si), or a metal material such as tungsten (W). The semiconductor substrate 11 further includes a P-type layer 130 that is a side surface of the pixel separation section 120 and is in contact with a surface on a side of the photoelectric conversion section 101. The semiconductor substrate 11 further includes a fixed charge film 140 contacting the light incident surface 11a of the semiconductor substrate 11 and the inside of the pixel separation section 120. The fixed charge film 140 is negatively charged in order to suppress generation of dark current due to an interface state of the semiconductor substrate 11. The fixed charge film 140 is formed of, for example, an insulating film having a negative fixed charge. Examples of a material of the insulating film include hafnium oxide ($HfO_2$), zirconium oxide ($ZrO_2$), aluminum oxide ($Al_2O_3$), titanium oxide ($TiO_2$), and tantalum oxide ($Ta_2O_5$). A hole accumulation layer is formed on an interface on the side of the light incident surface 11a of the semiconductor substrate 11 and an interface of the pixel separation section 120 by an electric field induced by the fixed charge film 140. The hole accumulation layer suppresses generation of electrons from the interface.

Furthermore, in the present embodiment, the semiconductor substrate 11 includes an N-type diffusion layer 150 containing impurities having the same first conductivity type as the photoelectric conversion section 101 at a higher concentration than the photoelectric conversion section 101 and a lower concentration than the floating diffusion 103. Further, the semiconductor substrate 11 has a P-type diffusion layer 160 containing impurities of the second conductivity type at a position opposite to the floating diffusion 103. The P-type diffusion layer 160 has a higher concentration than the semiconductor substrate 11, and a reference potential is applied thereto. More specifically, the reference potential is applied to each pixel 12 via the P-type diffusion layer 160 provided for each pixel 12. The N-type diffusion layer 150 electrically connects the photoelectric conversion section 101 and the floating diffusion 103, and serves as a source of the transfer transistor 102. The drain of the transfer transistor 102 is the floating diffusion 103. Furthermore, the gate (gate electrode) 102a of the transfer transistor 102 extends into the pixel separation section 120 in the thickness direction (thickness direction in the drawing) of the semiconductor substrate 11 from the front surface 11b of the semiconductor substrate 11. A material of the gate 102a is, for example, polycrystalline silicon (Poly-Si). An end portion of the gate 102a extends to a vicinity of the N-type diffusion layer 150 that will be a source of the transfer transistor 102. When the gate 102a is turned on, electric charge is transferred from the photoelectric conversion section 101 to the floating diffusion 103 via the transfer channel. The transfer channel is formed along the thickness direction of the semiconductor substrate 11.

As described above, in the present embodiment, since the gate 102a of the transfer transistor 102 of each pixel 12 is provided so as to extend into the pixel separation section

120, the width of the transfer channel can be easily increased along the thickness direction of the semiconductor substrate 11. Therefore, according to the present embodiment, signal charges are easily transferred from the photoelectric conversion section 101 to the floating diffusion 103. As a result, according to the present embodiment, the transfer efficiency of the transfer transistor 102 can be improved even when the imaging apparatus 1 is downsized.

Furthermore, in the present embodiment, since the gate 102a is provided so as to extend into the pixel separation section 120, the gate area can be suitably secured. Therefore, according to the present embodiment, since the gate area of the transfer transistor 102 can be suitably secured in the thickness direction of the semiconductor substrate 11, the signal charge of the photoelectric conversion section 101 can be sufficiently transferred. According to the present embodiment, since the transfer transistor 102 can sufficiently transfer the signal charge of the photoelectric conversion section 101, it is possible to suppress noise caused by inability to sufficiently transfer the signal charge. As a result, according to the present embodiment, the imaging apparatus 1 can suppress deterioration in image quality even when the imaging apparatus 1 is downsized.

<3-2. Planar Configuration>

Figure 4:
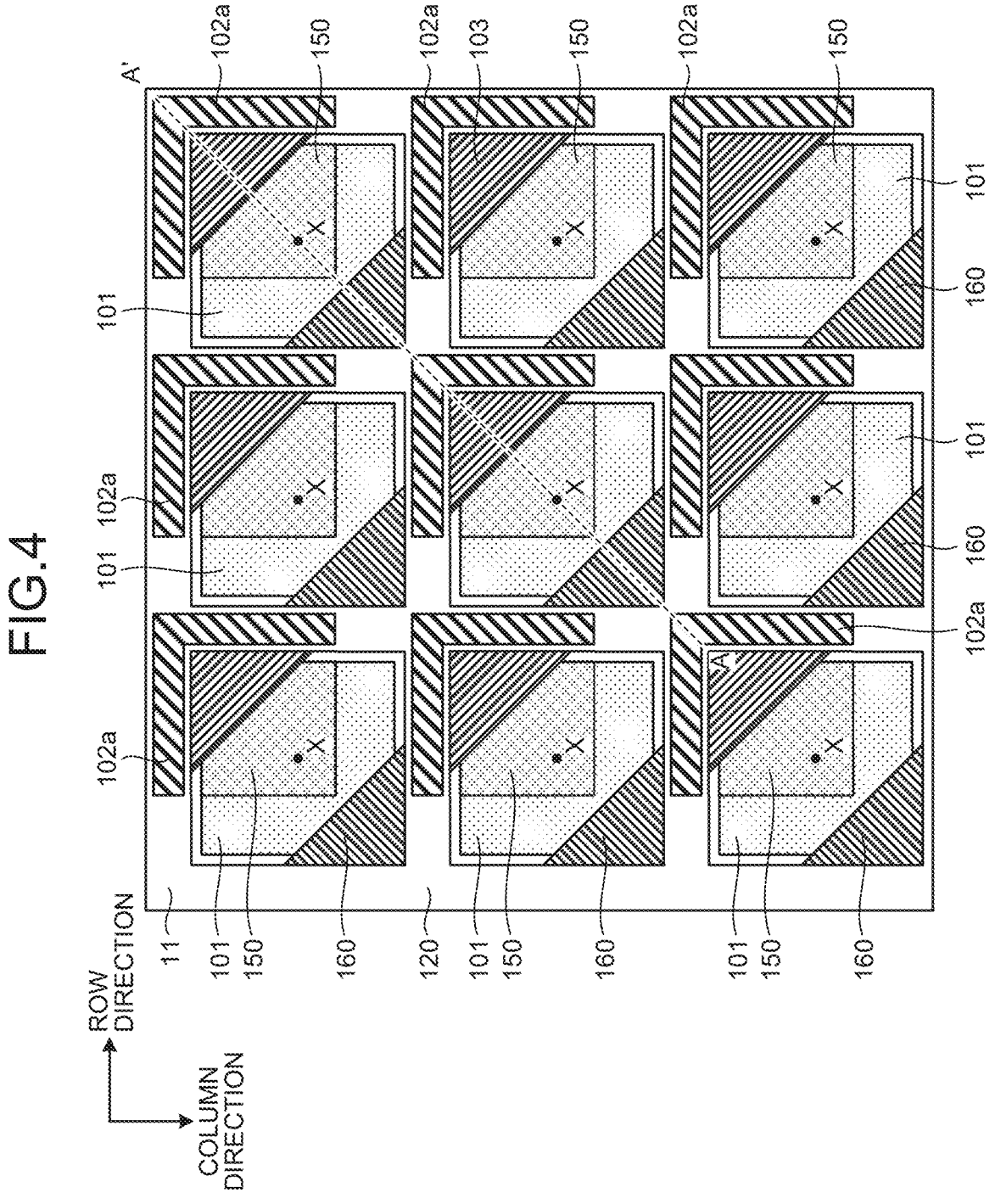
FIG. 4 is a diagram of assistance in explaining a part of a plane of the imaging apparatus 1 according to the first embodiment of the present disclosure.

A planar configuration of the imaging apparatus 1 according to the first embodiment of the present disclosure will be described with reference to FIG. 4. FIG. 4 is a diagram of assistance in explaining a part of a plane of the imaging apparatus 1 according to the present embodiment, and specifically corresponds to the cross section of the imaging apparatus 1 depicted in FIG. 3.

As depicted in FIG. 4, in the present embodiment, the plurality of pixels 12 adjacent to each other is separated by the pixel separation section 120.

Furthermore, in the present embodiment, the floating diffusion 103 contains impurities of the first conductivity type, and is formed at a corner of each pixel 12. Furthermore, when viewed from the side of the front surface 11b of the semiconductor substrate 11, each pixel 12 includes a P-type diffusion layer 160 provided at a point symmetrical position of the floating diffusion 103 with respect to a center point X of each pixel 12, and the P-type diffusion layer 160 contains impurities of the second conductivity type. The P-type diffusion layer 160 has a higher concentration than the semiconductor substrate 11, and a reference potential is applied thereto. Furthermore, each pixel 12 includes the N-type diffusion layer 150 between the floating diffusion 103 and the P-type diffusion layer 160.

Furthermore, the shape of the gate 102a of the transfer transistor 102 as viewed from the front surface 11b of the semiconductor substrate 11 is a substantially L-shape. The gate 102a is provided along the row direction (left-right direction in the drawing) and the column direction (up-down direction in the drawing) of each pixel 12, and is formed so as to surround the floating diffusion 103.

As described above, in the present embodiment, in each pixel 12, the floating diffusion 103 and the P-type diffusion layer 160 are provided at point-symmetric positions with respect to the center point X of each pixel 12. Therefore, the P-type diffusion layer 160 to which the reference potential is applied is positioned between the floating diffusion 103 of each pixel 12 and the gate 102a of the transfer transistor 102 of the other pixel 12. As a result, the pixels 12 can be electrically separated. Therefore, according to the present embodiment, even when the gate 102a is formed in the pixel separation section 120 that is a boundary of the pixel 12, it is possible to drive the gate independently for each pixel 12.

Furthermore, in the present embodiment, since the gate 102a has a substantially L-shape, voltage modulation can be performed from the row direction and the column direction of the floating diffusion 103. Therefore, according to the present embodiment, since the width of the transfer channel is easily enlarged, the signal charge is easily transferred. As a result, according to the present embodiment, the transfer efficiency can be improved.

As described above, according to the present embodiment, since the gate 102a of the transfer transistor 102 of each pixel 12 is provided so as to extend into the pixel separation section 120, the width of the transfer channel is easily enlarged along the thickness direction of the semiconductor substrate 11. Therefore, the signal charge is easily transferred from the photoelectric conversion section 101 to the floating diffusion 103. As a result, according to the present embodiment, even when the imaging apparatus 1 is downsized, the transfer efficiency can be improved. Furthermore, in the present embodiment, since the gate 102a of the transfer transistor 102 is provided so as to extend into the pixel separation section 120, the gate area can be suitably secured. Therefore, the signal charge of the photoelectric conversion section 101 can be sufficiently transferred. Then, according to the present embodiment, since the transfer transistor 102 can sufficiently transfer the signal charge of the photoelectric conversion section 101, noise caused by insufficient transfer of the signal charge can be suppressed. As a result, according to the present embodiment, it is possible to suppress deterioration in image quality of the imaging apparatus 1.

In addition, in the present embodiment, since the gate 102a of the transfer transistor 102 has the substantially L-shape, voltage modulation can be performed from the row direction and the column direction of the floating diffusion 103, and the width of the transfer channel is easily enlarged. Therefore, the signal charge is easily transferred. As a result, according to the present embodiment, the transfer efficiency of the transfer transistor 102 can be improved.

Note that the "substantially L-shape" used in the embodiment of the present disclosure described above does not mean only an L-shape formed by two elements intersecting at a right angle, but also includes a shape similar to the L-shape formed in an approximately L-shape.

<3-3. Modification>

Figure 5:
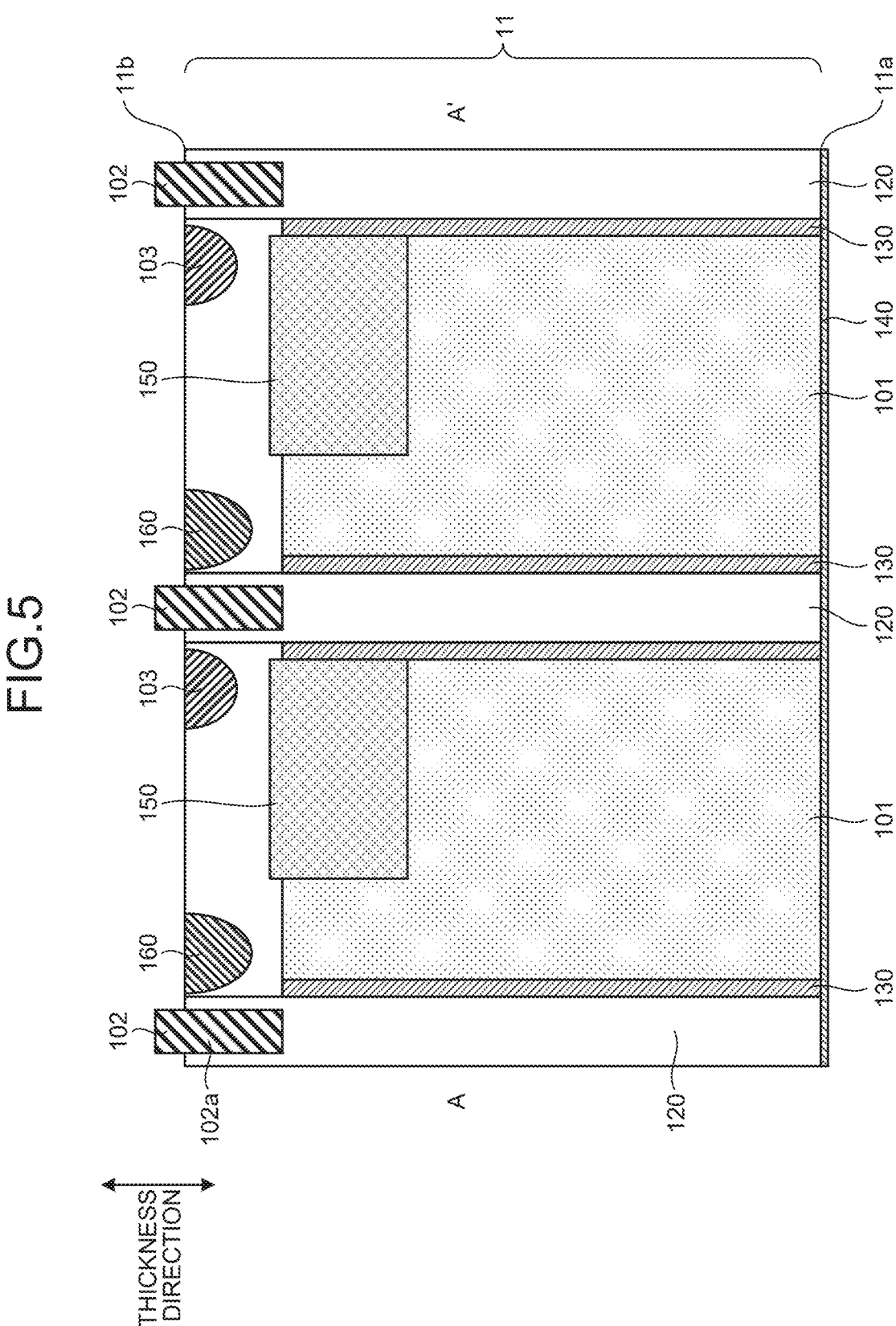
FIG. 5 is a diagram of assistance in explaining a configuration example of a pixel separation section 120 according to a modification of the first embodiment of the present disclosure.
Figure 6:
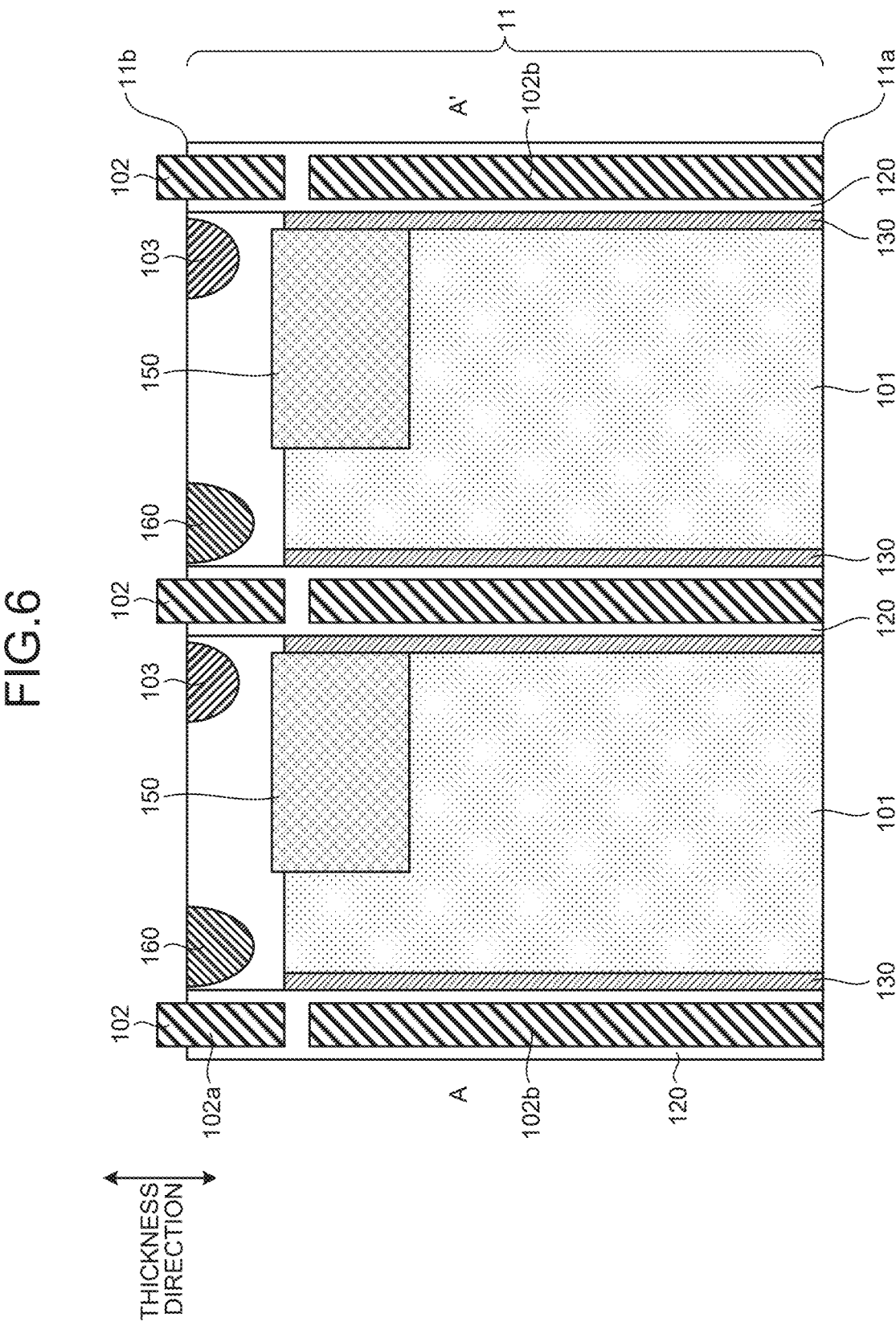
FIG. 6 is a diagram of assistance in explaining a configuration example of the pixel separation section 120 according to a modification of the first embodiment of the present disclosure.
Figure 7:
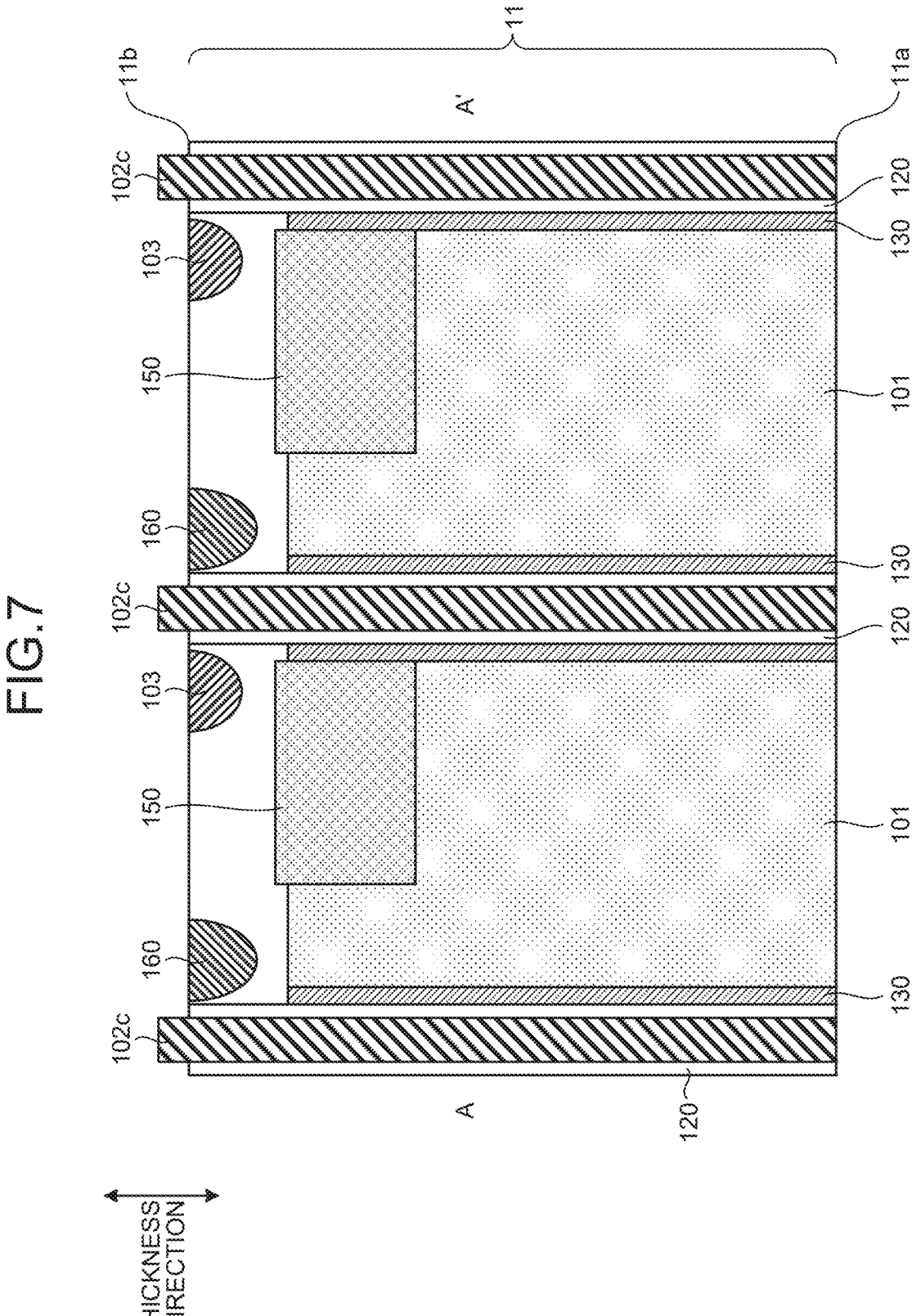
FIG. 7 is a diagram of assistance in explaining a configuration example of the pixel separation section 120 according to the modification of the first embodiment of the present disclosure.
Figure 8:
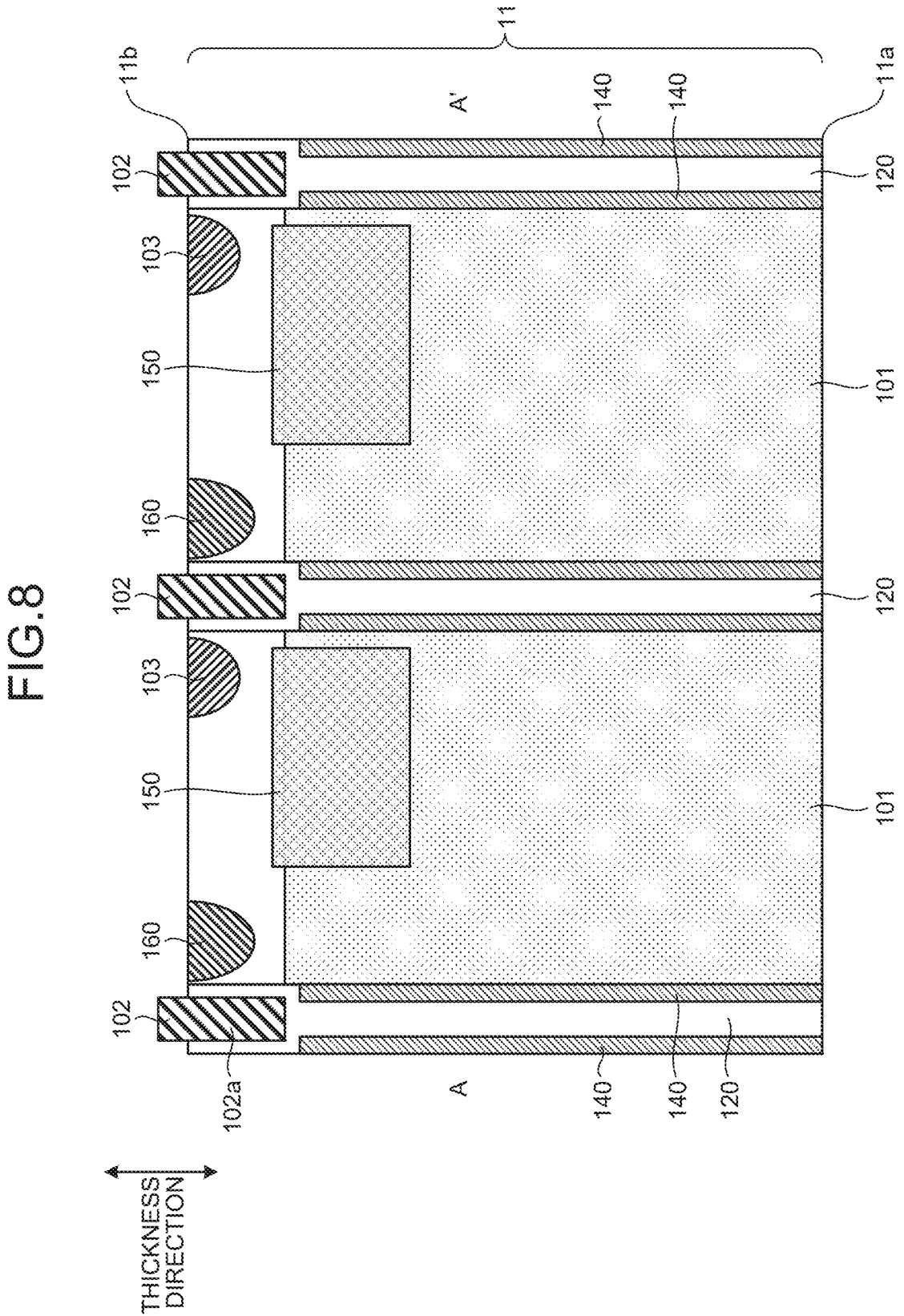
FIG. 8 is a diagram of assistance in explaining a configuration example of the pixel separation section 120 according to the modification of the first embodiment of the present disclosure.
Figure 9:
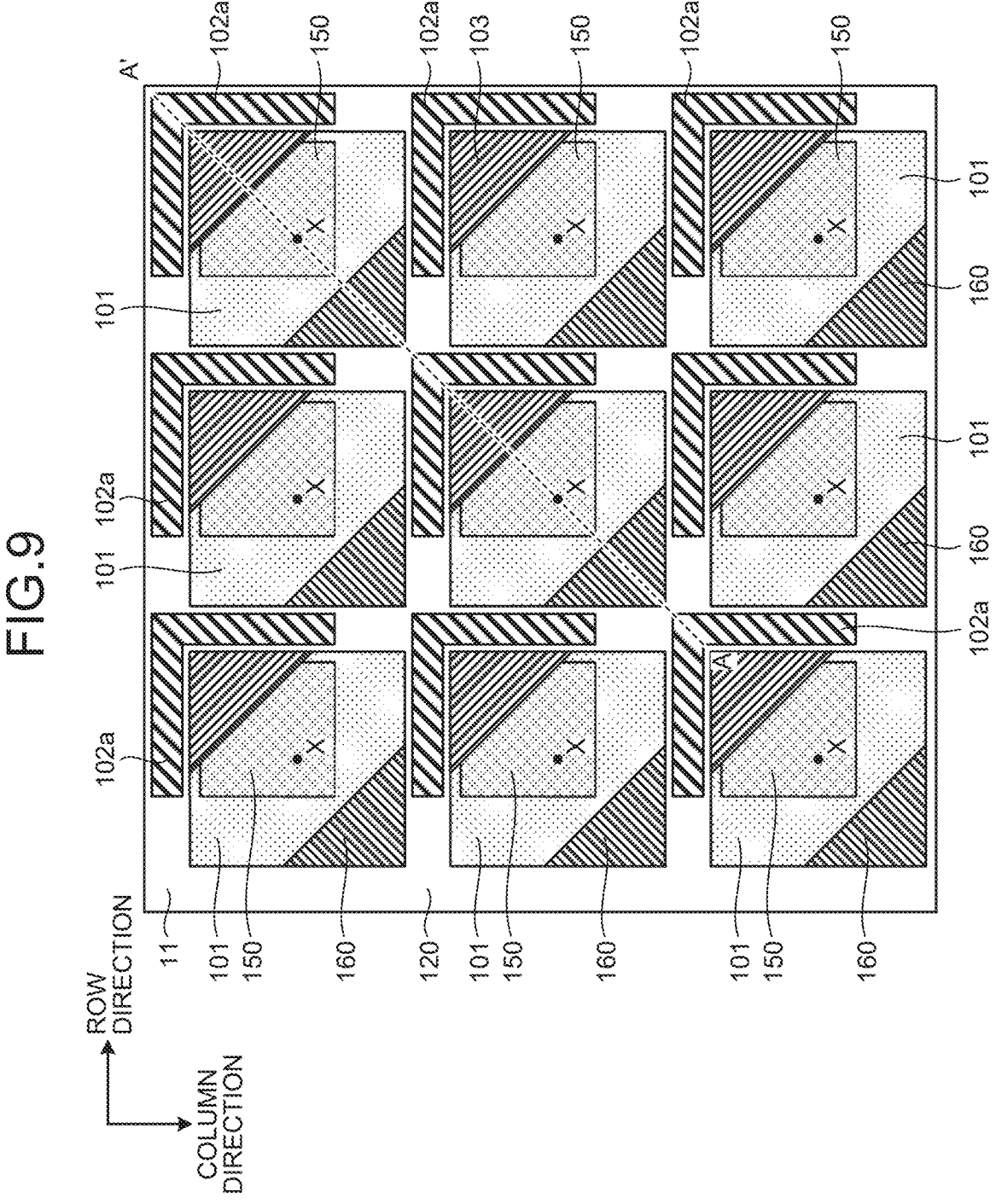
FIG. 9 is a diagram of assistance in explaining a part of a plane of the imaging apparatus 1 according to the modification of the first embodiment of the present disclosure.

In the present embodiment, the pixel separation section 120 can be modified as follows. A detailed configuration of the pixel separation section 120 will be described with reference to FIGS. 3, 5, 6, 7, 8, and 9. FIG. 3 is an explanatory diagram depicting a configuration example of the pixel separation section 120 according to the present embodiment, and FIG. 5 is an explanatory diagram depicting a configuration example of the pixel separation section 120 according to a modification of the present embodiment. FIG. 6 is an explanatory diagram depicting a configuration example of the pixel separation section 120 according to still another modification of the present embodiment, FIG. 7 is an explanatory diagram depicting a configuration example of the pixel separation section 120 according to still another modification of the present embodiment, and FIG. 8 is an explanatory diagram depicting a configuration example of the pixel separation section 120 according to still another modification of the present embodiment. Furthermore, FIG. 9 is an explanatory diagram depicting a part of a plane of the imaging apparatus 1 according to the modification of the present embodiment. Note that FIGS. 3, 5, 6, 7, and 8 correspond to a cross section of the imaging apparatus 1 taken along line A-A' in FIG. 4 or 9.

In the present embodiment, for example, as depicted in FIG. 3, the pixel separation section 120 may include the insulating film such as silicon oxide (SiO$_2$) and the fixed charge film 140 in the pixel separation section 120.

Furthermore, in the modification of the present embodiment, for example, as depicted in FIG. 5, the pixel separation section 120 may include only the insulating film such as silicon oxide (SiO$_2$) in the pixel separation section 120. Furthermore, the fixed charge film 140 may be provided on the light incident surface 11a of the semiconductor substrate 11.

Furthermore, in the modification of the present embodiment, for example, as depicted in FIG. 6, the pixel separation section 120 may include an electrode 102b provided so as to extend from the light incident surface 11a of the semiconductor substrate 11 into the pixel separation section 120. The electrode 102b may be provided to apply a negative potential, and may be formed of a conductive material such as P-type-doped polycrystalline silicon (Poly-Si) or a metal material such as tungsten (W).

Furthermore, in the modification of the present embodiment, for example, as depicted in FIG. 7, the pixel separation section 120 may include an electrode 102c provided so as to penetrate the pixel separation section 120. The electrode 102c may be provided as a gate of the transfer transistor 102 or may be provided for applying the negative potential. The electrode 102c may be formed of a conductive material such as P-type-doped polycrystalline silicon (Poly-Si) or a metal material such as tungsten (W).

Furthermore, in the modification of the present embodiment, for example, as depicted in FIGS. 8 and 9, the semiconductor substrate 11 may not include the P-type layer 130 provided so as to be in contact with the side surface of the pixel separation section 120 and the surface on the side of the photoelectric conversion section 101, unlike the present embodiment depicted in FIGS. 3 and 4. Alternatively, in the present modification, instead of the P-type layer 130 in the present embodiment, the semiconductor substrate 11 may have an N-type layer (not illustrated) containing impurities having the same first conductivity type (e.g., N-type) as the photoelectric conversion section 101 at a lower concentration than the photoelectric conversion section 101. Note that the N-type layer is provided so as to be in contact with the side surface of the pixel separation section 120 and the surface on the side of the photoelectric conversion section 101, similarly to the P-type layer 130. Furthermore, N-type impurities may be contained in a region between the photoelectric conversion section 101 and the N-type layer so as to have a concentration gradient in which the concentration of the impurities decrease toward the N-type layer. Note that, in the modifications of the first embodiment disclosed in the present specification and other embodiments, the semiconductor substrate 11 may not be provided with the P-type layer 130, or may be provided with the N-type layer instead of the P-type layer 130.

4. Second Embodiment

Figure 10:
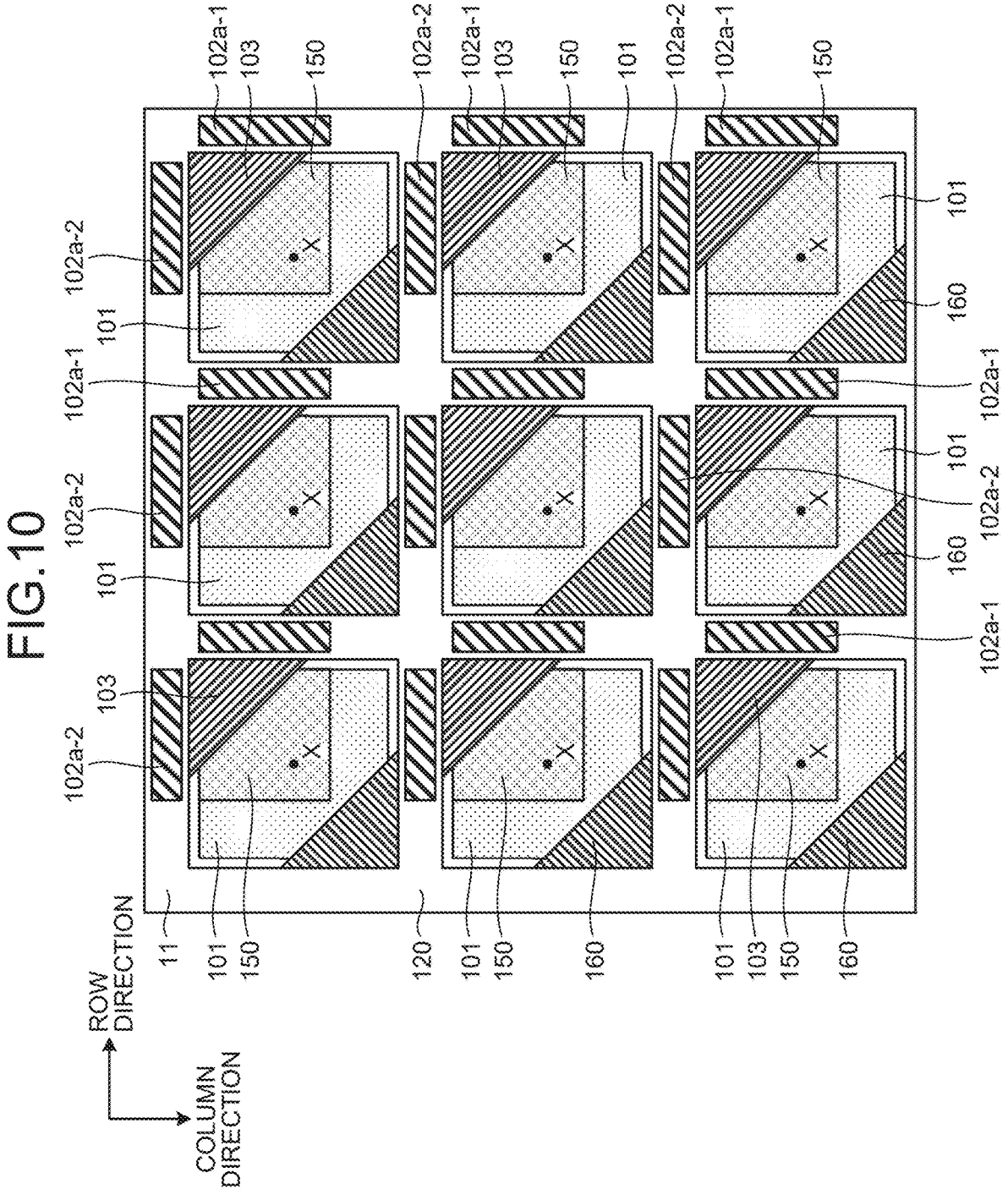
FIG. 10 is a diagram of assistance in explaining a part of a plane of the imaging apparatus 1 according to a second embodiment of the present disclosure.

In the embodiment of the present disclosure, when the imaging apparatus 1 is viewed from the front surface 11b of the semiconductor substrate 11, the number of gates 102a of the transfer transistor 102 is not limited to one, and a plurality of gates 102a may be provided. In other words, the second embodiment is different from the first embodiment in that the plurality of gates 102a is provided in the present embodiment. Therefore, the second embodiment of the present disclosure in which the plurality of gates 102a is provided will be described with reference to FIG. 10. FIG. 10 is a diagram of assistance in explaining a part of a plane of the imaging apparatus 1 according to the present embodiment, and specifically corresponds to the cross section of the imaging apparatus 1 depicted in FIG. 3. Hereinafter, the same reference signs are given to the same components as those of the first embodiment, and the description thereof will be appropriately omitted.

As depicted in FIG. 10, in the present embodiment, the transfer transistor 102 has two gates, a gate 102a-1 and a gate 102a-2.

The gate 102a-1 is provided between the pixels 12 adjacent in the row direction, and the gate 102a-2 is provided between the pixels 12 adjacent in the column direction. The same drive signal and the same voltage are applied to the two gates 102a, and the two gates 102a simultaneously transfer the signal charge to one floating diffusion 103.

Note that, in the present embodiment, the number of the gates 102a is not limited to that depicted in FIG. 10, and for example, the transfer transistor 102 may have four gates 102a. In this case, the two gates 102a may be provided between the pixels 12 adjacent in the row direction, and the other two gates 102a may be provided between the pixels 12 adjacent in the column direction.

As described above, in the present embodiment, since the gate 102a is provided in each of the row direction and the column direction, voltage modulation can be performed from the row direction and the column direction of the floating diffusion 103. Therefore, according to the present embodiment, the width of the transfer channel can be easily increased, and the signal charge can be transferred without delay. As a result, according to the present embodiment, the transfer efficiency of the imaging apparatus 1 can be improved. Furthermore, in the present embodiment, since the plurality of gates 102a can be simultaneously formed in the row direction and the column direction, the imaging apparatus 1 can be easily manufactured.

5. Third Embodiment

Figure 11:
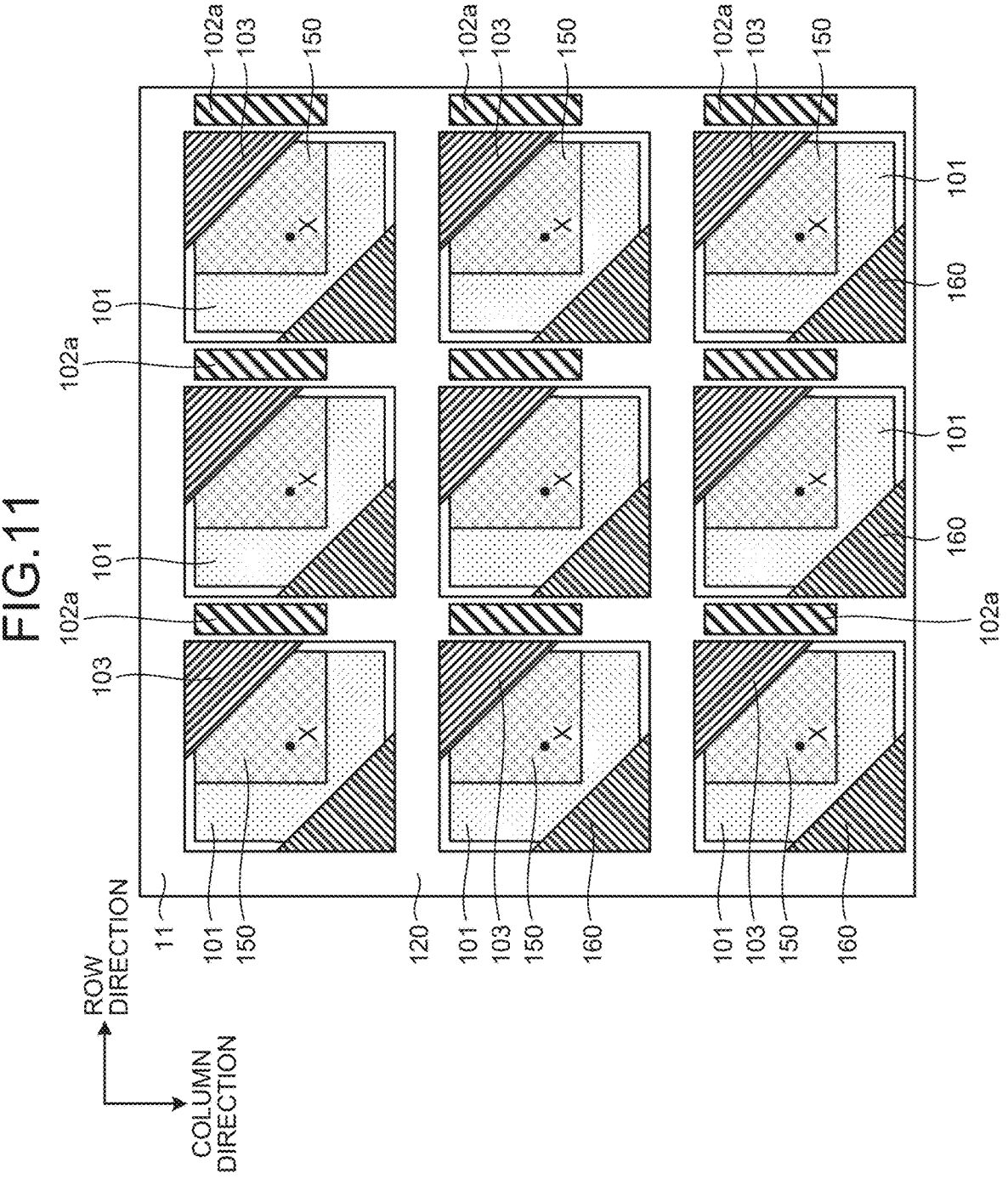
FIG. 11 is a diagram of assistance in explaining a part of a plane of the imaging apparatus 1 according to a third embodiment of the present disclosure.

In the embodiment of the present disclosure, when the imaging apparatus 1 is viewed from the front surface 11b of the semiconductor substrate 11, an arrangement of the gates 102a of the transfer transistor 102 are not limited to two sides in the matrix direction, and the gates 102a may be formed along a single direction. A third embodiment is different from the first embodiment in that the arrangement of the gates 102a is different. Therefore, the third embodiment of the present disclosure in which the gates 102a are formed along the single direction will be described with reference to FIG. 11. FIG. 11 is a diagram of assistance in explaining a part of a plane of the imaging apparatus 1 according to the present embodiment, and specifically corresponds to the cross section of the imaging apparatus 1 depicted in FIG. 3. Hereinafter, the same reference signs are given to the same components as those of the first embodiment, and the description thereof will be appropriately omitted.

As depicted in FIG. 11, in the present embodiment, the transfer transistor 102 has the gates 102a formed along the column direction. The gate 102a is provided between the pixels 12 adjacent in the row direction.

Note that, in the present embodiment, the gates 102a are not limited to the arrangement illustrated in FIG. 11, and may include, for example, the gates 102a formed along the row direction. In that case, the gate 102a is provided between the pixels 12 adjacent in the column direction.

As described above, in the present embodiment, since the gates 102a are provided in either the row direction or the column direction, voltage modulation can be performed in the row direction or the column direction of the floating diffusion 103. Therefore, according to the present embodiment, the width of the transfer channel can be easily increased, and the signal charge can be easily transferred without delay. As a result, according to the present embodiment, it is possible to improve the transfer efficiency of the imaging apparatus 1, and eventually, it is possible to suppress deterioration in image quality. Furthermore, according to the present embodiment, since the gates 102a are formed in either the row direction or the column direction, desired gates 102a can be easily formed with high accuracy even when the imaging apparatus 1 is downsized.

6. Fourth Embodiment

Figure 12:
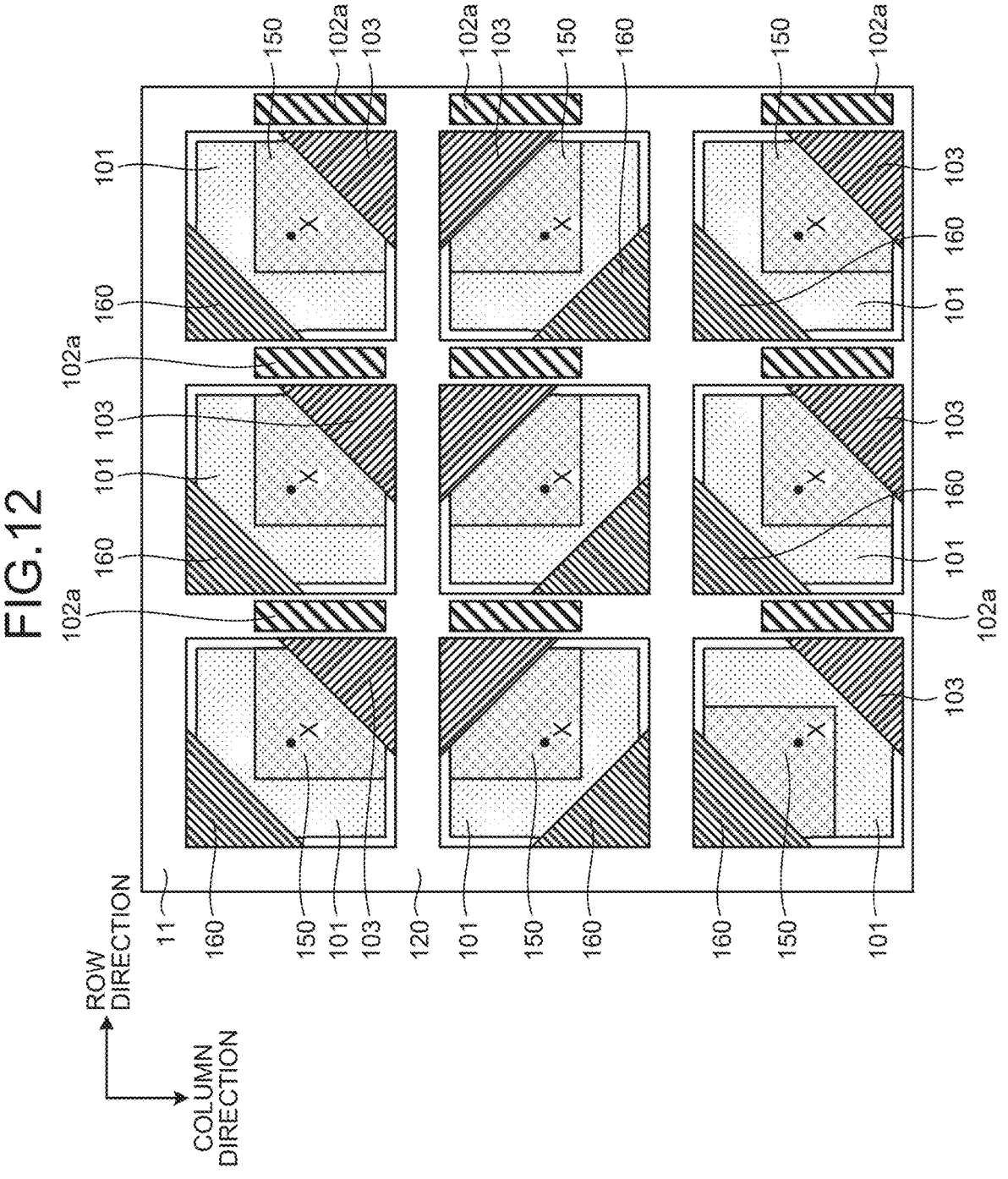
FIG. 12 is a diagram of assistance in explaining a part of a plane of the imaging apparatus 1 according to a fourth embodiment of the present disclosure.

In the above embodiment, as depicted in FIG. 2A, an example in which each pixel 12 is connected to one readout circuit 22 has been described. The method of connecting to the readout circuit 22 is not limited to that illustrated in FIG. 2A, and a plurality of pixels 12 may share one readout circuit 22 as depicted in FIGS. 2B and 2B. By doing so, according to the present embodiment, a transistor area in the readout circuit 22 can be easily increased. Therefore, noise of the transistor can be suppressed. As a result, according to the present embodiment, it is possible to suppress deterioration in image quality of the imaging apparatus 1. A fourth embodiment of the present disclosure in which two pixels 12 share one readout circuit 22 will be described with reference to FIG. 12. FIG. 12 is a diagram of assistance in explaining a part of a plane of the imaging apparatus 1 according to the present embodiment, and specifically corresponds to the cross section of the imaging apparatus 1 depicted in FIG. 3. Hereinafter, the same reference signs are given to the same components as those of the first embodiment, and the description thereof will be appropriately omitted.

The present embodiment is the same as the embodiment described above in that the gate 102a is provided between two pixels 12 adjacent in the row direction as depicted in FIG. 12. Furthermore, as depicted in FIG. 12, the present embodiment is the same as the embodiment described above in that the floating diffusion 103 and the P-type diffusion layer 160 are provided at point-symmetric positions with respect to the center point X of each pixel 12. However, the present embodiment is different from the embodiments described above in that the two pixels 12 adjacent in the column direction are provided line-symmetrically with respect to the pixel separation section 120, as an axis, provided between the two pixels 12 and extending in the row direction.

As depicted in FIG. 12, in the present embodiment, the two pixels 12 are provided in line symmetry. The floating diffusions 103 of the two pixels 12 adjacent in the column direction are provided at positions close to each other for the pixels 12 sharing one readout circuit 22.

Note that, in the present embodiment, the arrangement of the components of the pixel 12 is not limited to that illustrated in FIG. 12. In the present embodiment, for example, the two pixels 12 adjacent in the row direction may be provided line-symmetrically with respect to the pixel separation section 120, as an axis, provided between the two pixels 12 and extending in the column direction. In this case, the gate 102a is provided between the two pixels 12 adjacent in the column direction.

As described above, in the present embodiment, since the gates 102a are provided in either the row direction or the column direction, voltage modulation can be performed in the row direction or the column direction of the floating diffusion 103. Therefore, according to the present embodiment, the width of the transfer channel can be easily increased, and the signal charge can be easily transferred without delay. As a result, according to the present embodiment, the transfer efficiency of the imaging apparatus 1 can be improved, and eventually, deterioration in image quality can be suppressed. Furthermore, according to the present embodiment, since the gate 102a is formed in either the row direction or the column direction, the desired gate 102a can be easily formed with high accuracy even when the pixel 12 is downsized.

Furthermore, in the present embodiment, since the pixels 12 adjacent in the column direction are provided line-symmetrically for each shared readout circuit 22, the two floating diffusions 103 can be provided at positions close to each other. Therefore, according to the present embodiment, since the two floating diffusions 103 are provided at positions close to each other, a length of the wiring electrically connecting the two floating diffusions 103 can be shortened, and parasitic resistance and parasitic capacitance can be reduced. As a result, according to the present embodiment, the imaging apparatus 1 can improve the conversion efficiency.

7. Fifth Embodiment

Figure 13:
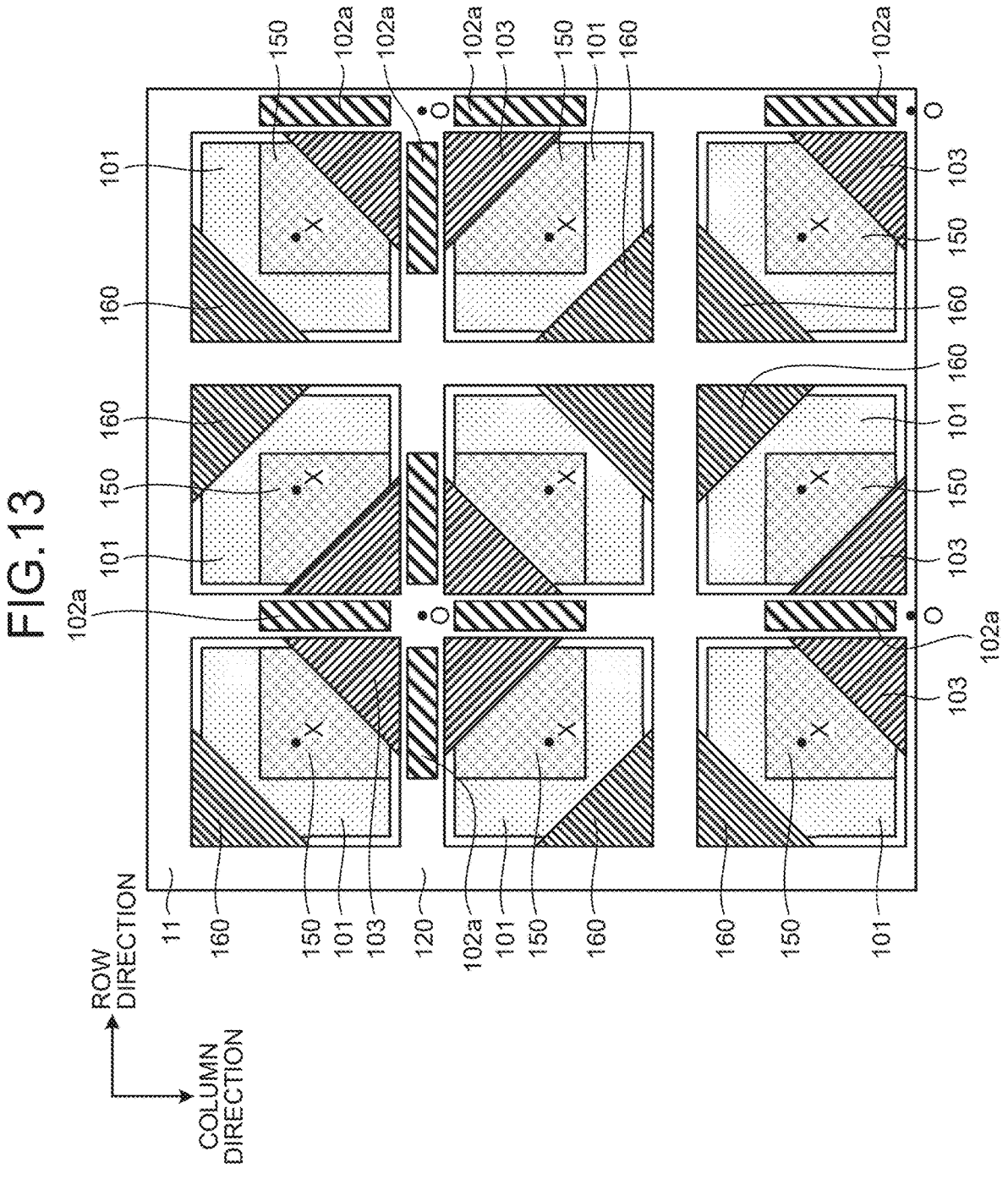
FIG. 13 is a diagram of assistance in explaining a part of a plane of the imaging apparatus 1 according to a fifth embodiment of the present disclosure.

In the fourth embodiment, as depicted in FIG. 2B, an example in which two pixels 12 share one readout circuit 22 has been described. However, in the present disclosure, the method of connection to the readout circuit 22 is not limited to that illustrated in FIG. 2B, and four pixels 12 may share one readout circuit 22 as in a fifth embodiment illustrated in FIG. 2C. In other words, the fifth embodiment is different from the fourth embodiment in that the number of pixels 12 sharing one readout circuit 22 is different. By doing so, according to the fifth embodiment, the transistor area in the readout circuit 22 can be more easily increased. Therefore, noise of the transistor can be suppressed. As a result, deterioration in image quality of the imaging apparatus 1 can be suppressed. Hereinafter, the fifth embodiment of the present disclosure in which four pixels 12 share one readout circuit 22 will be described with reference to FIG. 13. FIG. 13 is a diagram of assistance in explaining a part of a plane of the imaging apparatus 1 according to the present embodiment, and specifically corresponds to the cross section of the imaging apparatus 1 illustrated in FIG. 3. Hereinafter, the same reference signs are given to the same components as those of the first embodiment, and the description thereof will be appropriately omitted.

The present embodiment is the same as the embodiments described above in that the gate 102a is provided between two adjacent pixels 12 as depicted in FIG. 13. Furthermore, the present embodiment is the same as the embodiments described above in that the floating diffusion 103 and the P-type diffusion layer 160 are provided at point-symmetric positions with respect to the center point X of each pixel 12 as depicted in FIG. 13. However, in the present embodiment, as depicted in FIG. 13, the four adjacent pixels 12 are provided rotationally symmetrically with respect to a center point O of the four pixels 12, which is different from the embodiments described above.

As depicted in FIG. 13, in the present embodiment, the four pixels 12 sharing the floating diffusion 103 are provided rotationally symmetrically with respect to the center point O of the four pixels 12. In other words, the four pixels 12 sharing the floating diffusion 103 are arranged in two rows and two columns. Further, for each pixel 12 sharing one readout circuit 22, the floating diffusions 103 of the four pixels 12 adjacent in the row direction and the column direction are provided at positions close to each other.

As described above, in the present embodiment, since the gate 102a is provided in the row direction or the column direction, voltage modulation can be performed in the row direction or the column direction of the floating diffusion 103. Therefore, according to the present embodiment, since the width of the transfer channel can be easily increased, the signal charge can be easily transferred without delay. As a result, according to the present embodiment, the transfer efficiency of the imaging apparatus 1 can be improved, and eventually, deterioration in image quality can be suppressed.

Furthermore, in the present embodiment, since the pixels 12 adjacent in the row direction and the column direction are provided rotationally symmetrically for each shared readout circuit 22, the four floating diffusions 103 can be provided at positions close to each other. Therefore, according to the present embodiment, since the four floating diffusions 103 are provided at positions close to each other, the length of the wiring electrically connecting the four floating diffusions 103 can be shortened, and the parasitic resistance and the parasitic capacitance can be reduced. As a result, according to the present embodiment, the imaging apparatus 1 can improve the conversion efficiency.

8. Sixth Embodiment

<8-1. Planar Configuration>

Figure 14:
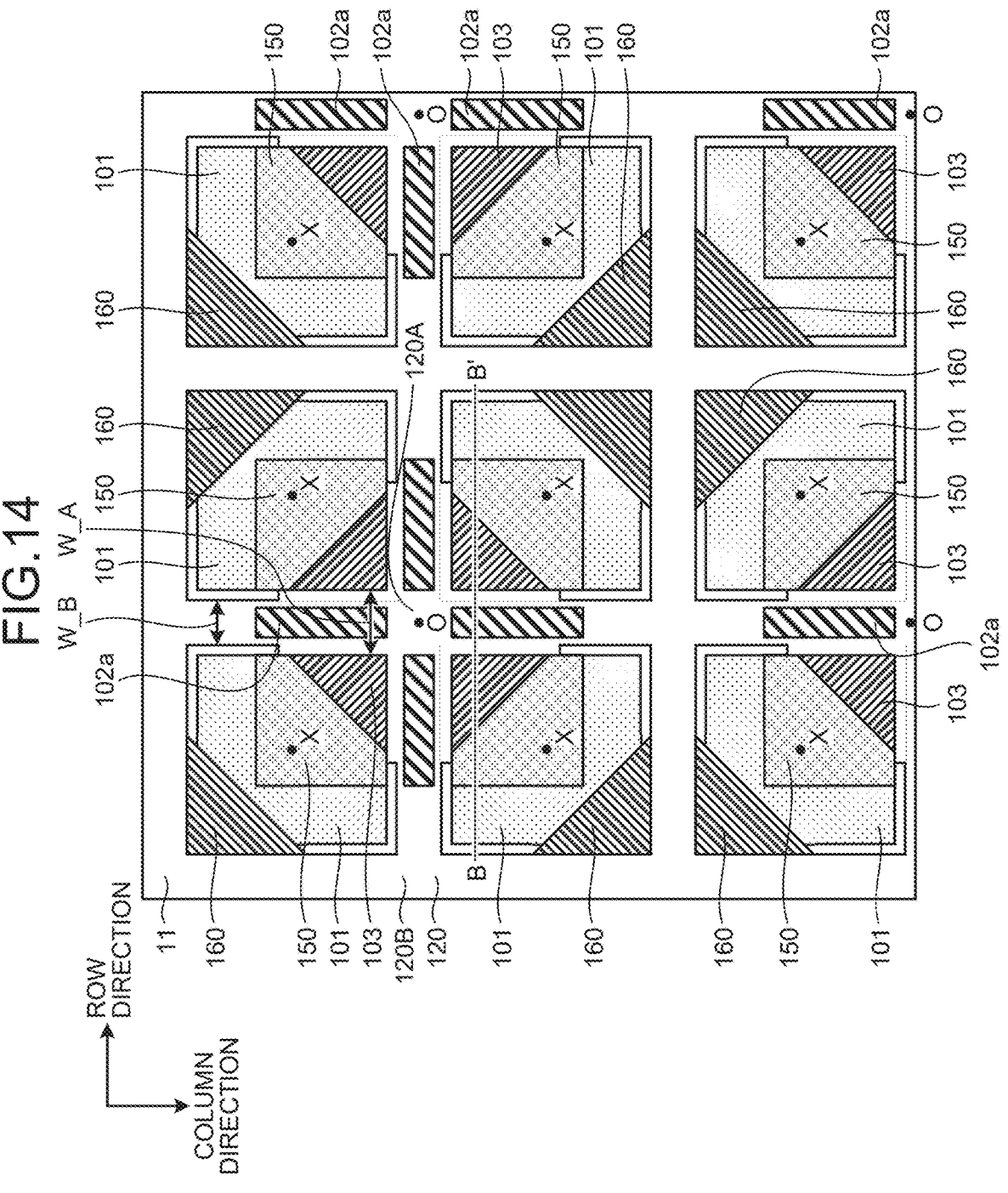
FIG. 14 is a diagram of assistance in explaining a part of a plane of the imaging apparatus 1 according to a sixth embodiment of the present disclosure.

In the fifth embodiment, as depicted in FIG. 13, the example in which the four pixels 12 share one readout circuit 22 has been described. In the present disclosure, the width of the pixel separation section 120 is not limited to that illustrated in FIG. 13. As in a sixth embodiment depicted in FIG. 14, the width of the pixel separation section 120 at the portion where the corners of the four pixels 12 face each other may be wider than the width of the pixel separation section 120 surrounding the four pixels 12. In the present embodiment, for example, the width of the pixel separation section 120 in the portion where the corners of the four pixels 12 face each other is preferably about 1.1 to 2 times the width of the pixel separation section 120 surrounding the four pixels 12. In other words, the sixth embodiment is different from the fifth embodiment in that the portions having different widths of the pixel separation section 120 are provided. Therefore, the sixth embodiment of the present disclosure in which portions having different widths of the pixel separation section 120 are provided will be described with reference to FIG. 14. FIG. 14 is a diagram of assistance in explaining a part of a plane of the imaging apparatus 1 according to the present embodiment. Hereinafter, the same reference signs are given to the same components as those of the first embodiment, and the description thereof will be appropriately omitted.

As depicted in FIG. 14, in the present embodiment, the four pixels 12 are provided rotationally symmetrically with respect to the center point O of the four pixels 12. For each pixel 12 sharing one readout circuit 22, the floating diffusions 103 of the four pixels 12 adjacent in the row direction and the column direction are provided at positions close to each other. The pixel separation section 120 includes a first region 120A that is a portion where corners of the four pixels 12 face each other, and a second region 120B that is a portion surrounding the four pixels 12. The width of the pixel separation section 120 is different between the first region 120A and the second region 120B. Specifically, with respect to the width of the pixel separation section 120, the width of the first region 120A (W_A in the drawing) is wider than the width of the second region 120B (W_B in the drawing). An insulating film such as silicon oxide ($SiO_2$) is provided in the first region 120A and the second region 120B. In addition, the first region 120A is a region where at least the gate 102a and the floating diffusion 103 are close to each other, and the second region 120B is a region other than the first region 120A.

As described above, in the present embodiment, since the gate 102a is provided in the row direction or the column direction, voltage modulation can be performed in the row direction or the column direction of the floating diffusion 103. Therefore, according to the present embodiment, since the width of the transfer channel is easily enlarged, the signal charge is easily transferred. As a result, according to the present embodiment, the transfer efficiency of the imaging apparatus 1 can be improved.

Furthermore, in the present embodiment, since the pixels 12 adjacent in the row direction and the column direction are provided rotationally symmetrically for each shared readout circuit 22, the four floating diffusions 103 can be provided at positions close to each other. Therefore, according to the present embodiment, since the four floating diffusions 103 are provided at positions close to each other, the length of the wiring electrically connecting the four floating diffusions 103 can be shortened, and the parasitic resistance and the parasitic capacitance can be reduced. As a result, according to the present embodiment, the imaging apparatus 1 can improve the conversion efficiency.

Furthermore, in the present embodiment, since the first region 120A is wider than the second region 120B, the insulating film is provided to be thicker in the first region 120A than in the second region 120B. Since a high voltage is applied to the four floating diffusions 103, a high electric field is likely to be generated, and dark current due to the high electric field may be generated. However, according to the present embodiment, since the insulating film of the first region 120A is thicker, generation of the high electric field can be suppressed. As a result, according to the present embodiment, generation of the dark current due to the high electric field can be suppressed, and thus deterioration in image quality can be avoided.

<8-2. Cross-Sectional Configuration>

Figure 15:
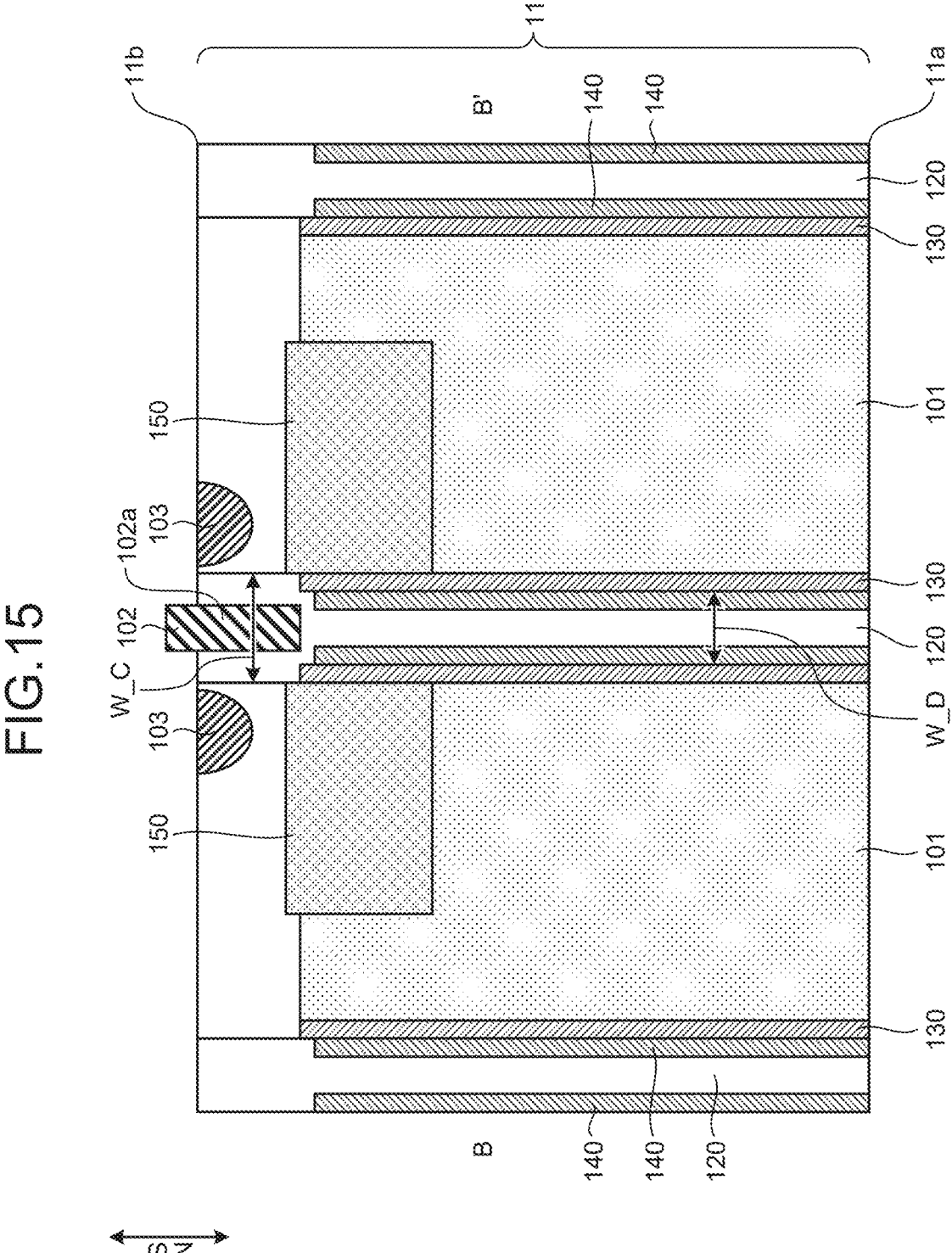
FIG. 15 is a diagram of assistance in explaining a part of a cross section of the imaging apparatus 1 according to the sixth embodiment of the present disclosure.

Next, a cross-sectional configuration of the imaging apparatus 1 according to the sixth embodiment of the present disclosure will be described with reference to FIG. 15. FIG. 15 is a diagram of assistance in explaining a part of a cross section of the imaging apparatus 1 according to the present embodiment, and specifically corresponds to a cross section obtained by cutting the imaging apparatus 1 along line B-B' illustrated in FIG. 14. Hereinafter, the same reference signs are given to the same components as those of the first embodiment, and the description thereof will be appropriately omitted.

As depicted in FIG. 15, the imaging apparatus 1 according to the present embodiment includes the pixel separation section 120 between adjacent pixels 12. Furthermore, the gate 102a of the transfer transistor 102 extends into the pixel separation section 120 in the thickness direction of the semiconductor substrate 11 (thickness direction in the drawing) from the front surface 11b of the semiconductor substrate 11. Furthermore, the width of the pixel separation section 120 is different between the pixels 12 sharing one readout circuit 22 and the pixels 12 sharing another readout circuit 22. Specifically, among the pixels 12 sharing one readout circuit 22, the width of the pixel separation section 120 on the side of the front surface 11b of the semiconductor substrate 11 (W_C in the drawing) is wider than the width on the side of the light incident surface 11a of the semiconductor substrate 11 (W_D in the drawing). Then, in the present embodiment, the width of the pixel separation section 120 between the pixels 12 sharing one readout circuit 22 is wider on the side of the front surface 11b of the semiconductor substrate 11 than on the side of the light incident surface 11a of the semiconductor substrate 11, so that the insulating film can be provided thicker on the front surface 11b.

Since the high voltage is applied to the floating diffusion 103 of the two adjacent pixels 12, the high electric field is likely to be generated, and the dark current due to the high electric field may be generated. However, according to the present embodiment, since a thick insulating film can be formed on the front surface 11b of the semiconductor substrate 11, generation of the high electric field can be suppressed. As a result, according to the present embodiment, generation of the dark current due to the high electric field can be suppressed, and thus deterioration in image quality can be avoided.

9. Seventh Embodiment

Figure 16:
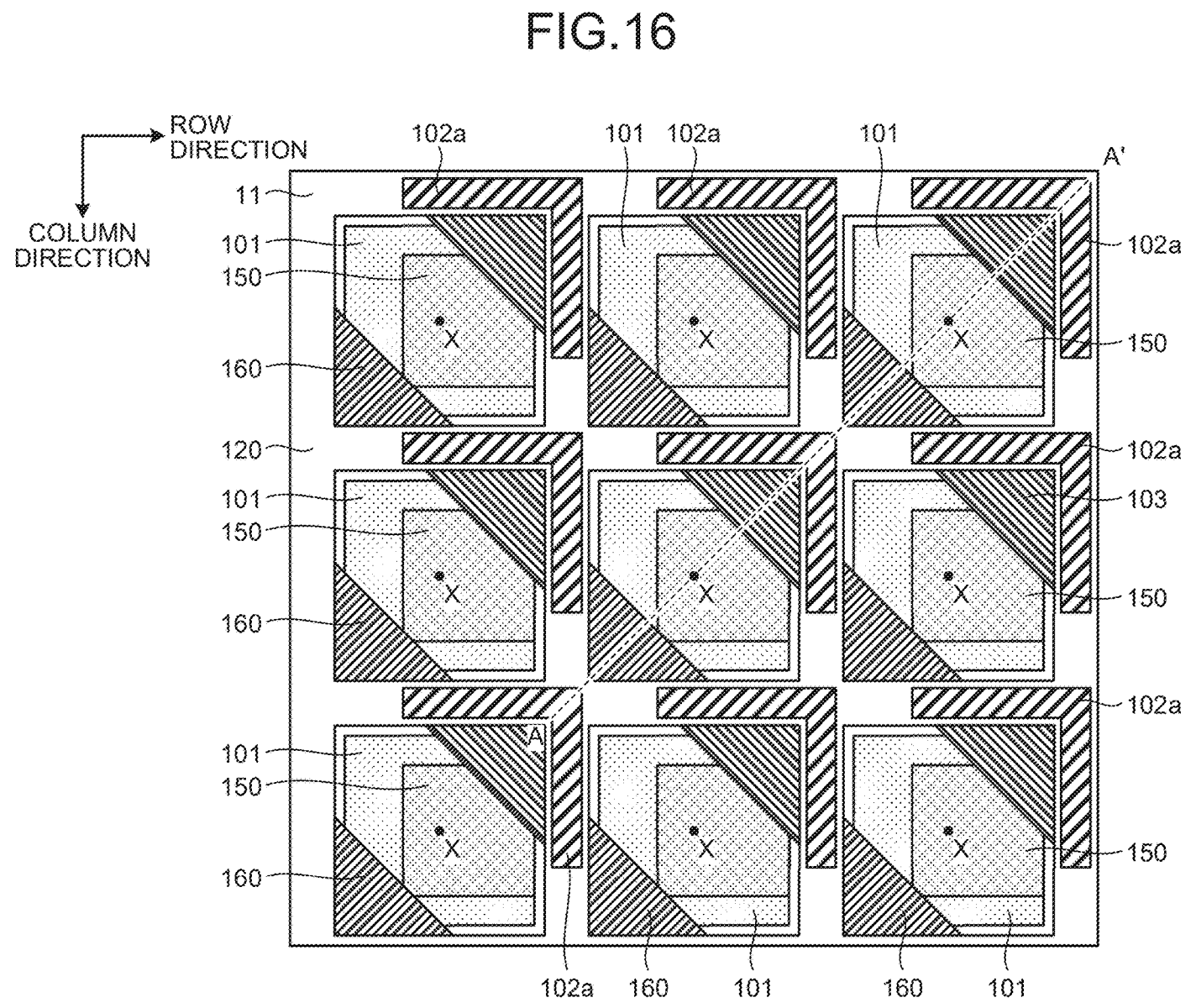
Figure 17:
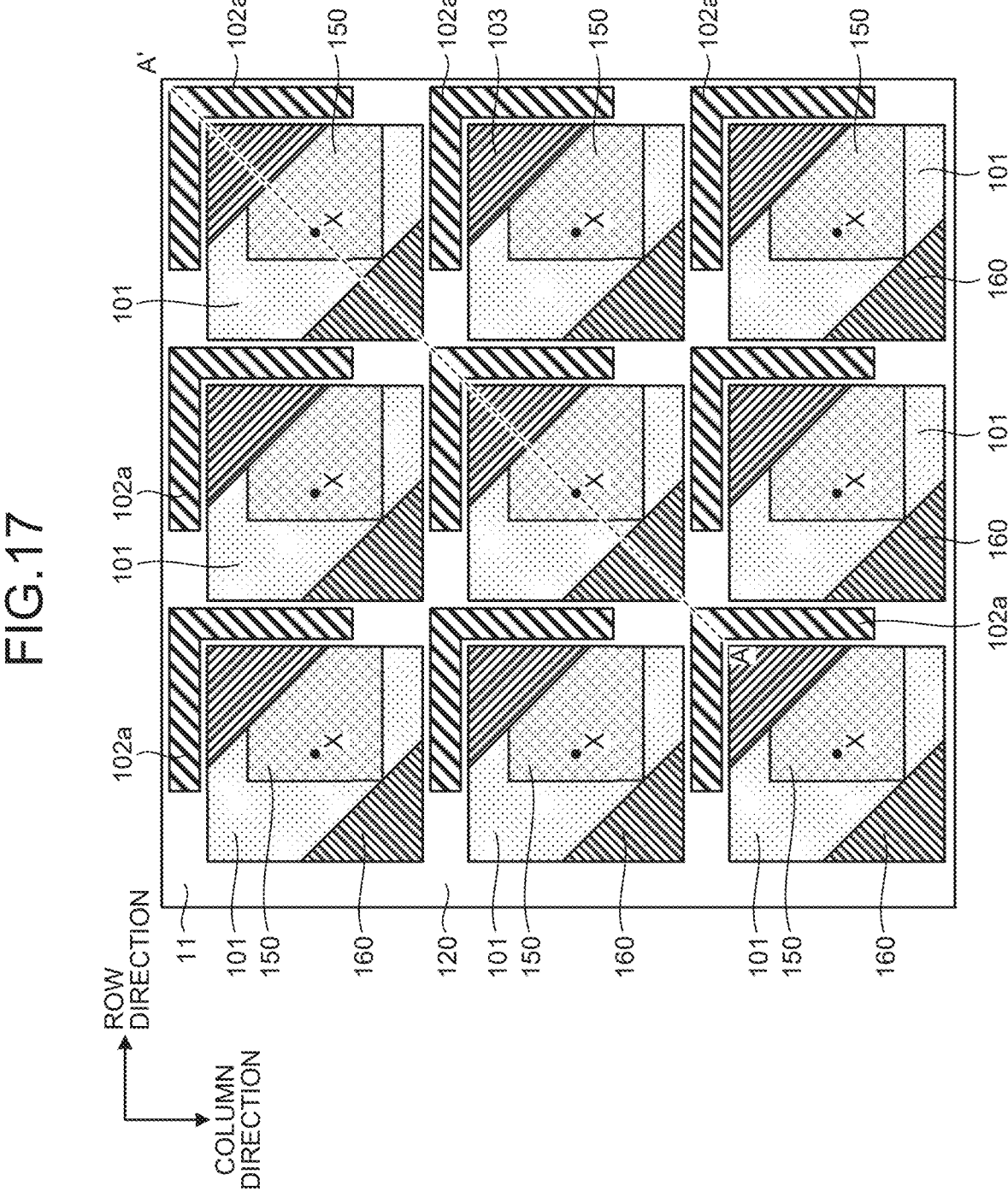
FIG. 17 is a diagram of assistance in explaining a part of a plane of the imaging apparatus 1 according to the modification of the seventh embodiment of the present disclosure.

In the first embodiment described above, the N-type diffusion layer 150 is provided such that one vertex of four vertexes of the N-type diffusion layer 150 having a rectangular shape substantially overlaps one vertex of four vertexes of the photoelectric conversion section 101 when the imaging apparatus 1 is viewed from the front surface 11b of the semiconductor substrate 11. However, the present disclosure is not limited thereto, and the N-type diffusion layer 150 may be provided so as to overlap the floating diffusion 103 in the thickness direction of the semiconductor substrate 11 or located at a close position. Therefore, a modification of the position of the N-type diffusion layer 150 will be described with reference to FIGS. 16 and 17. FIG. 16 is a diagram of assistance in explaining a part of a plane of the imaging apparatus 1 according to the present embodiment, and FIG. 17 is a diagram of assistance in explaining a part of a plane of the imaging apparatus 1 according to the modification of the present embodiment. Note that a cross section of the imaging apparatus 1 taken along line A-A' in FIGS. 16 and 17 corresponds to FIGS. 3 and 8.

In the present embodiment, as depicted in FIG. 16, unlike the first embodiment, the N-type diffusion layer 150 is provided such that one side of four sides of the N-type diffusion layer 150 having the rectangular shape substantially overlaps one side of four sides of the photoelectric conversion section 101 when the imaging apparatus 1 is viewed from the front surface 11b of the semiconductor substrate 11. Furthermore, as in the embodiments described so far, the N-type diffusion layer 150 is provided so as to overlap the floating diffusion 103 in the thickness direction of the semiconductor substrate 11 or located at a close position.

Furthermore, in the modification illustrated in FIG. 16, the photoelectric conversion section 101 is not limited to containing impurities of the first conductivity type (e.g., N type), and may contain impurities having the same second conductivity type (e.g., P type) as the P-type layer 130 at a lower concentration than the P-type layer 130. In this case, P-type impurities may be contained in a region between the photoelectric conversion section 101 and the P-type layer 130 so as to have a concentration gradient in which the concentration of the impurities increase toward the P-type layer 130.

Furthermore, also in the present embodiment, for example, as depicted in FIG. 17, the semiconductor substrate 11 may not include the P-type layer 130 that is a side surface of the pixel separation section 120 and is in contact with a surface on the side of the photoelectric conversion section 101. Alternatively, in the present modification, instead of the P-type layer 130 in the present embodiment, an N-type layer (not illustrated) containing impurities having the same first conductivity type (e.g., N-type) as the photoelectric conversion section 101 at a concentration lower than that of the photoelectric conversion section 101 may be provided so as to be in contact with the side surface of the pixel separation section 120 and the surface on the side of the photoelectric conversion section 101.

10. Method of Manufacturing Imaging Apparatus 1 According to First Embodiment Next, a part of the method of manufacturing the imaging apparatus 1 will be described with reference to FIGS. 18A to 18G. FIGS. 18A to 18G are process cross-sectional views for explaining a part of the manufacturing process of the imaging apparatus 1, and correspond to the cross section of the imaging apparatus 1 taken along line A-A' in FIG. 4.

Figure 18A:
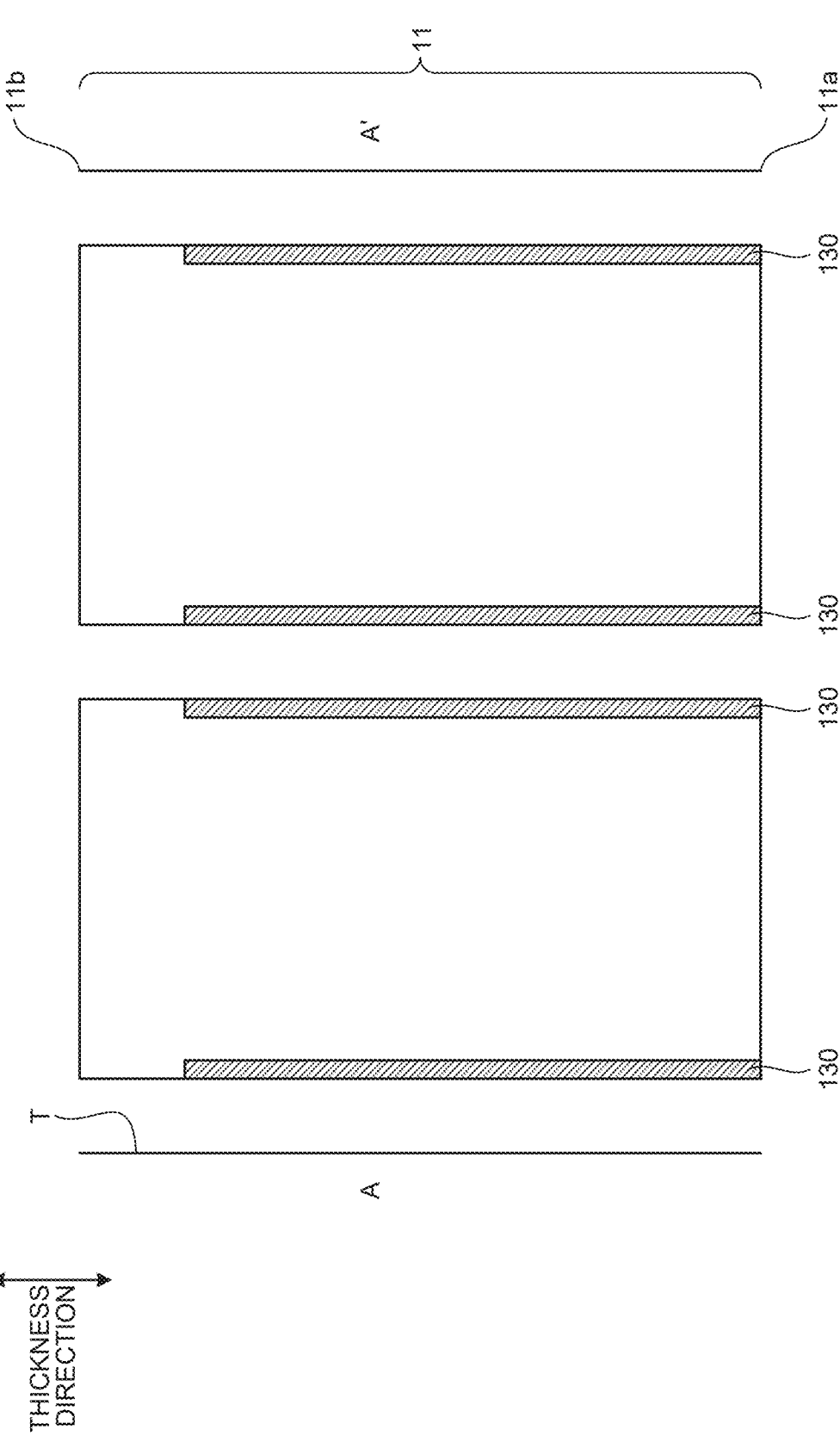
FIG. 18A is an explanatory diagram depicting a part of the method of manufacturing the imaging apparatus 1 according to the first embodiment of the present disclosure.

First, as depicted in FIG. 18A, the semiconductor substrate 11 is selectively etched by using a lithography technique or the like to form a trench (T in the drawing) that will be the pixel separation section 120. Subsequently, the P-type layer 130 is formed on a sidewall of the trench by, for example, a method such as ion implantation. In this step and the following steps, after ion implantation, implanted ion (impurities) may be stabilized (diffusion, activation) by heat treatment or the like.

Figure 18B:
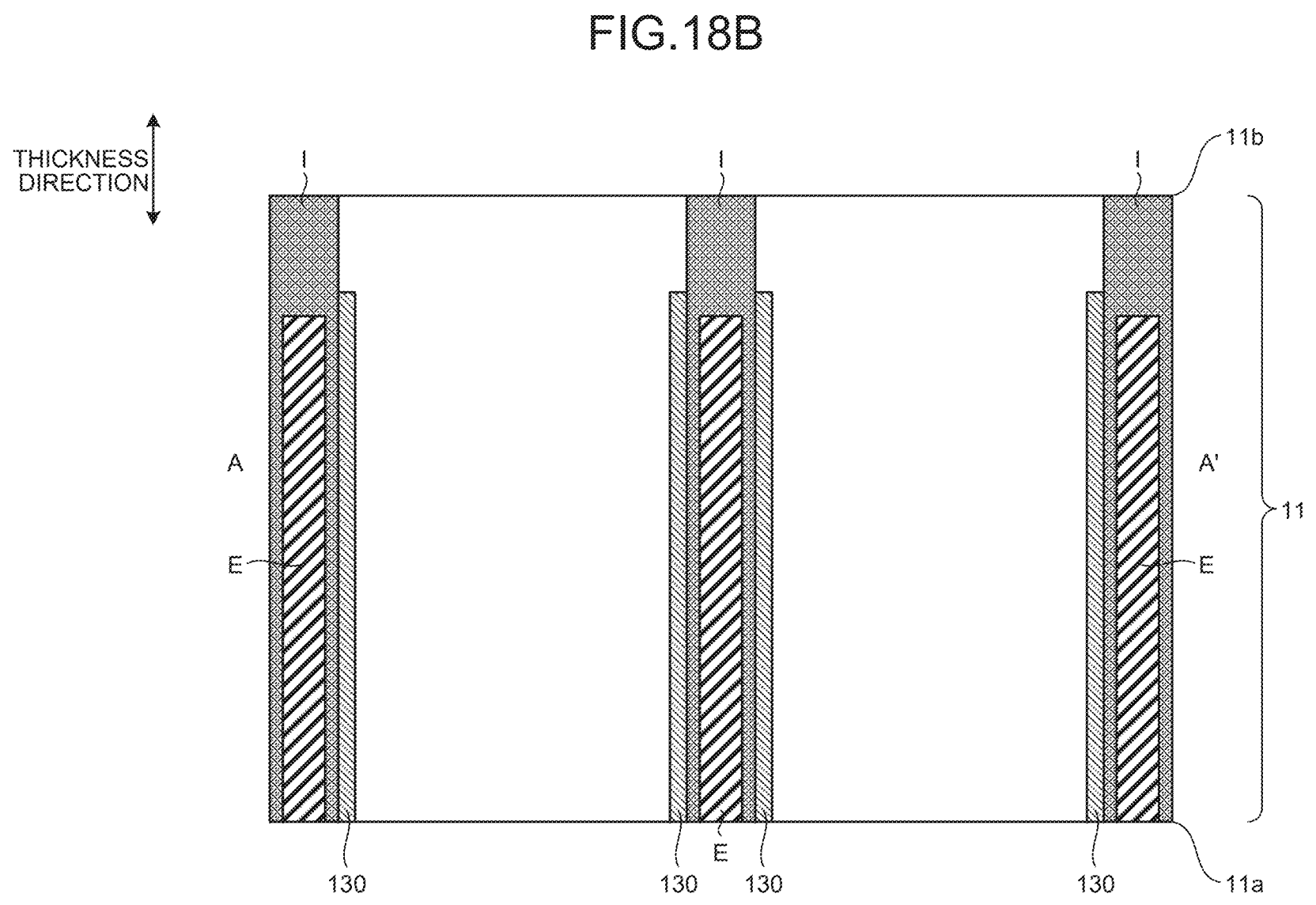

Next, as depicted in FIG. 18B, an insulating film (I in the drawing) such as silicon oxide (SiO$_2$) is formed on a sidewall of the trench. For example, annealing under an oxygen-rich condition may be used for forming the insulating film. Subsequently, an electrode material (E) such as polycrystalline silicon (Poly-Si) containing impurities is embedded inside the trench by using, for example, a chemical vapor deposition (CVD) method. Subsequently, an upper portion of the polycrystalline silicon formed inside the trench is selectively removed by using, for example, the lithography technique, and thereafter, an insulating film such as silicon oxide (SiO$_2$) is embedded in a portion from which polycrystalline silicon has been removed. For embedding the insulating film, the CVD method, a sputtering method, or the like may be used. The present embodiment is not limited to the formation of the P-type layer 130 by ion implantation as described above. After a layer having P-type impurities is deposited in the trench, heat treatment may be performed to diffuse the impurities from the layer to form the P-type layer 130 (solid-phase diffusion).

Figure 18C:
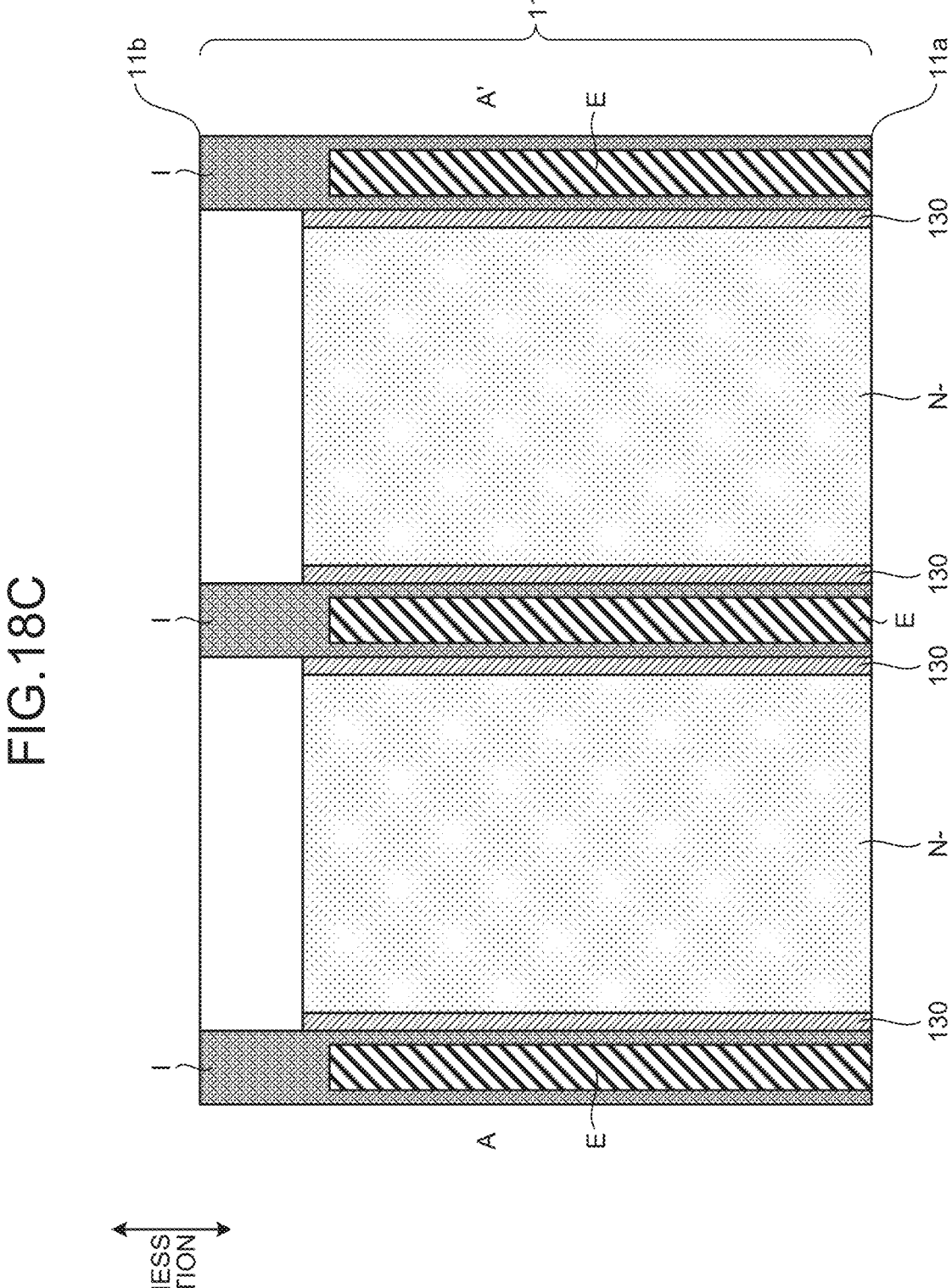
FIG. 18C is a diagram of assistance in explaining a part of the method of manufacturing the imaging apparatus 1 according to the first embodiment of the present disclosure subsequent to FIG. 18B.

Next, as depicted in FIG. 18C, an N– diffusion region (N–) configuring the photoelectric conversion section 101 is formed in a region biased to the side of the light incident surface 11a in the semiconductor substrate 11. The N– diffusion region is selectively formed, for example, by a method such as ion implantation so as to implant, with predetermined energy, N-type impurities from the front surface 11b of the semiconductor substrate 11.

Figure 18D:
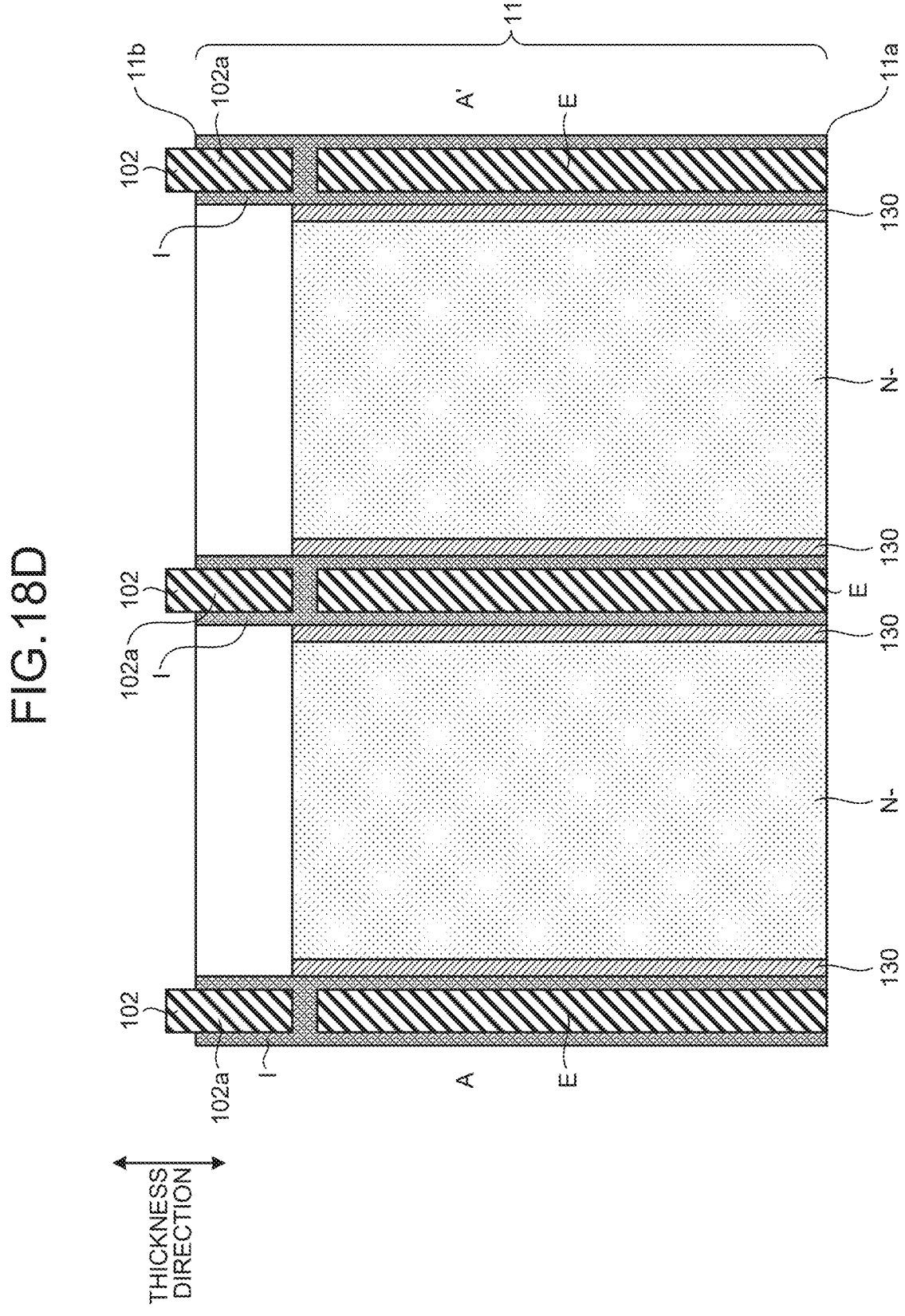
FIG. 18D is a diagram of assistance in explaining a part of the method of manufacturing the imaging apparatus 1 according to the first embodiment of the present disclosure subsequent to FIG. 18C.

Next, as depicted in FIG. 18D, a part of the insulating film in the trench is removed from the front surface 11b of the semiconductor substrate 11 by using, for example, the lithography technique. At that time, the insulating film may remain on the sidewall of the trench. Subsequently, a conductive material is deposited on the surface of the semiconductor substrate 11 from which a part of the insulating film in the trench has been removed, and the formed conductive film is processed to form the gate 102a that will be the transfer transistor 102. As a material of the gate 102a, for example, a conductive material such as polycrystalline silicon (Poly-Si) may be used. In addition, for processing the conductive film, for example, the lithography technique or a technique such as lift-off may be used.

Figure 18E:
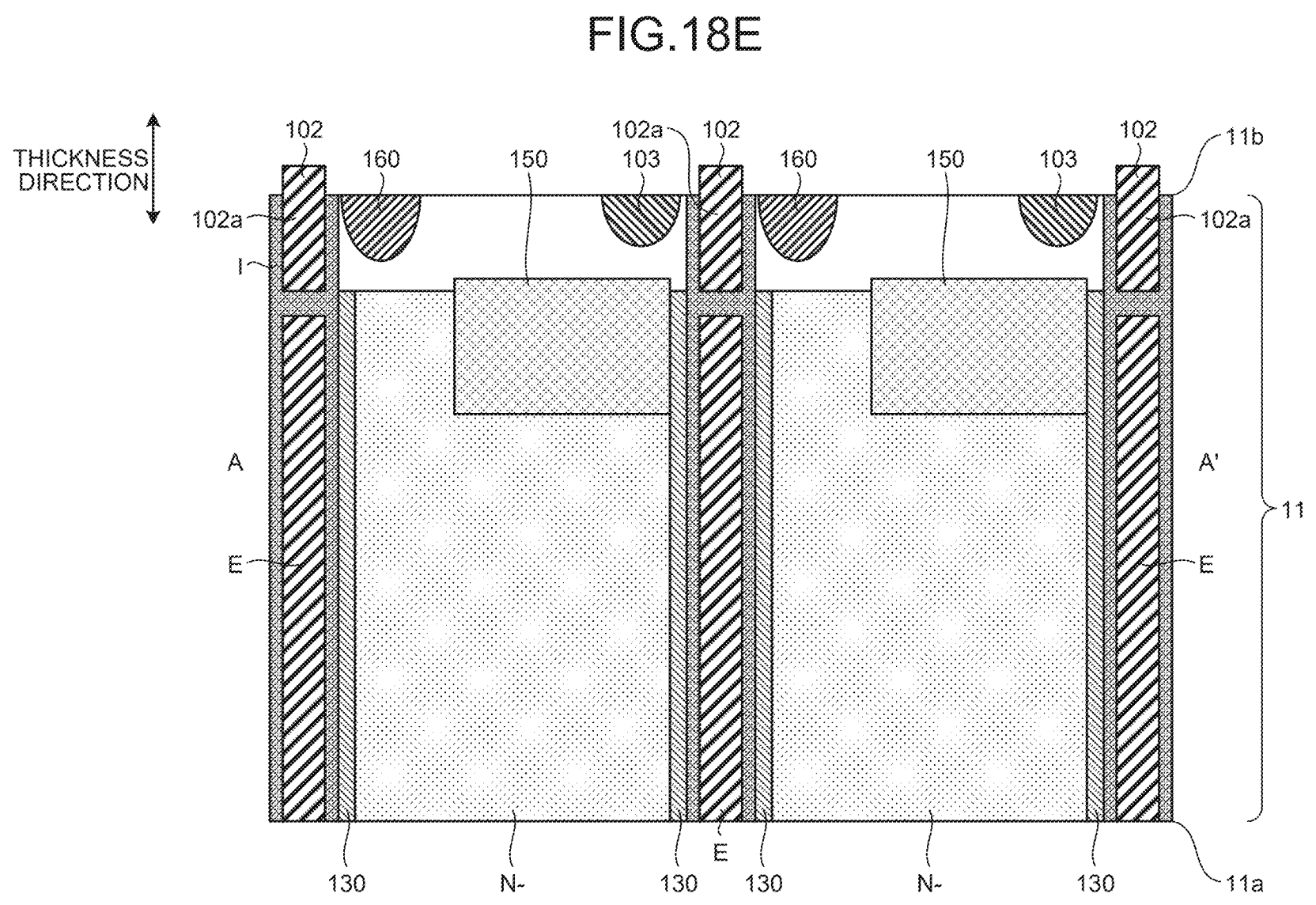

Next, as depicted in FIG. 18E, a method such as ion implantation is used for forming the N-type diffusion layer 150 that serves as a source of the transfer transistor 102 and contains N-type impurities at a higher concentration than the N– diffusion region (N–) configuring the photoelectric conversion section 101, the floating diffusion 103 containing N-type impurities at a higher concentration than the N-type diffusion layer 150, and the P-type diffusion layer 160.

Figure 18F:
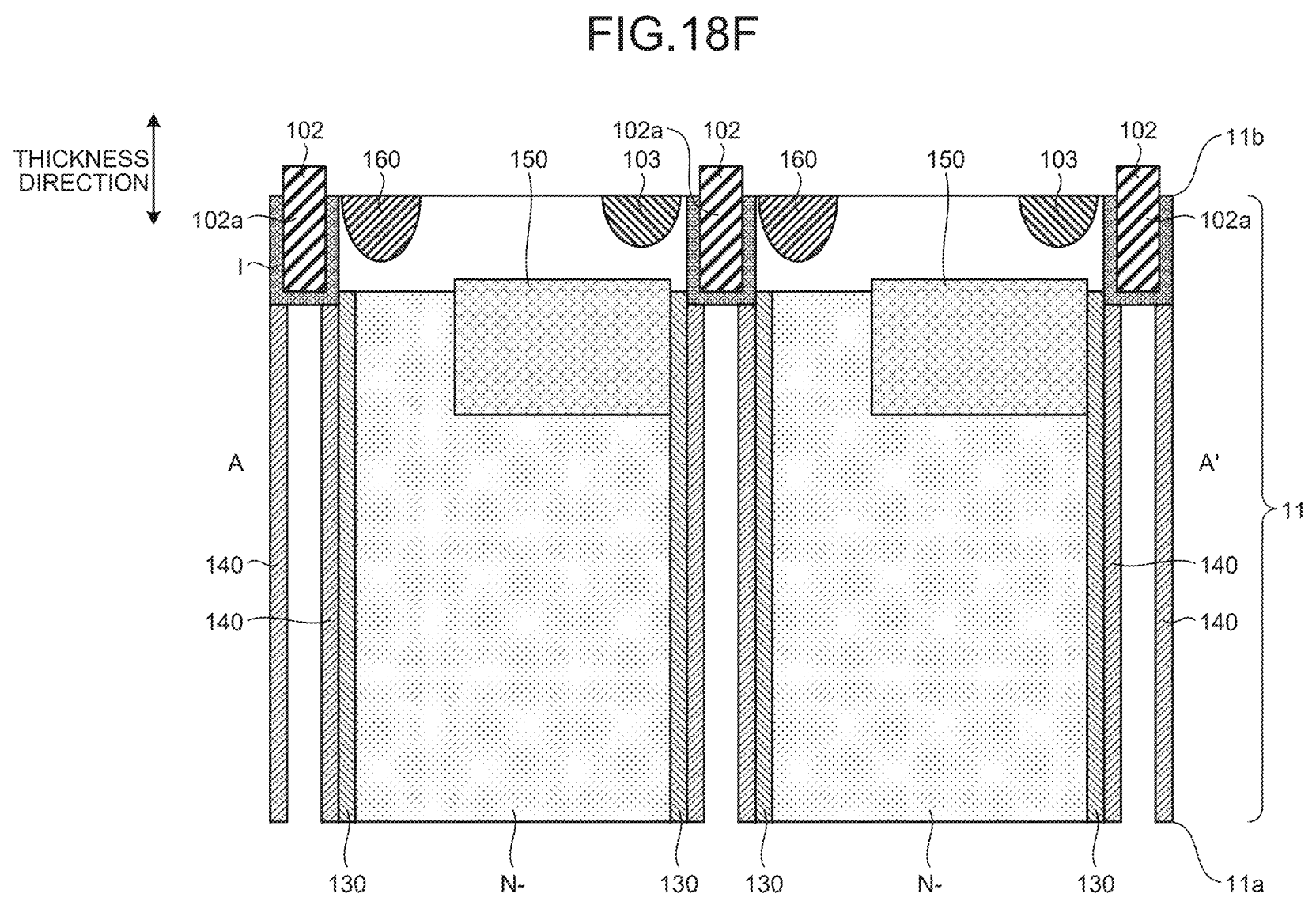

Next, as depicted in FIG. 18F, for example, the lithography technique is used to remove polycrystalline silicon formed in the trench and the insulating film covering the trench sidewall from the light incident surface 11a of the semiconductor substrate 11 while leaving the gate 102a formed on the side of the front surface 11b of the semiconductor substrate 11 and the insulating film covering the gate. Wet etching or the like may be used to remove the polycrystalline silicon and the insulating film. Subsequently, the fixed charge film 140 is formed on the sidewall in the trench exposed by removing the polycrystalline silicon and the insulating film. As a material of the fixed charge film 140, for example, hafnium oxide (HfO$_2$), zirconium oxide (ZrO$_2$), aluminum oxide (Al$_2$O$_3$), titanium oxide (TiO$_2$), or tantalum oxide (Ta$_2$O$_5$) may be used.

Figure 18G:
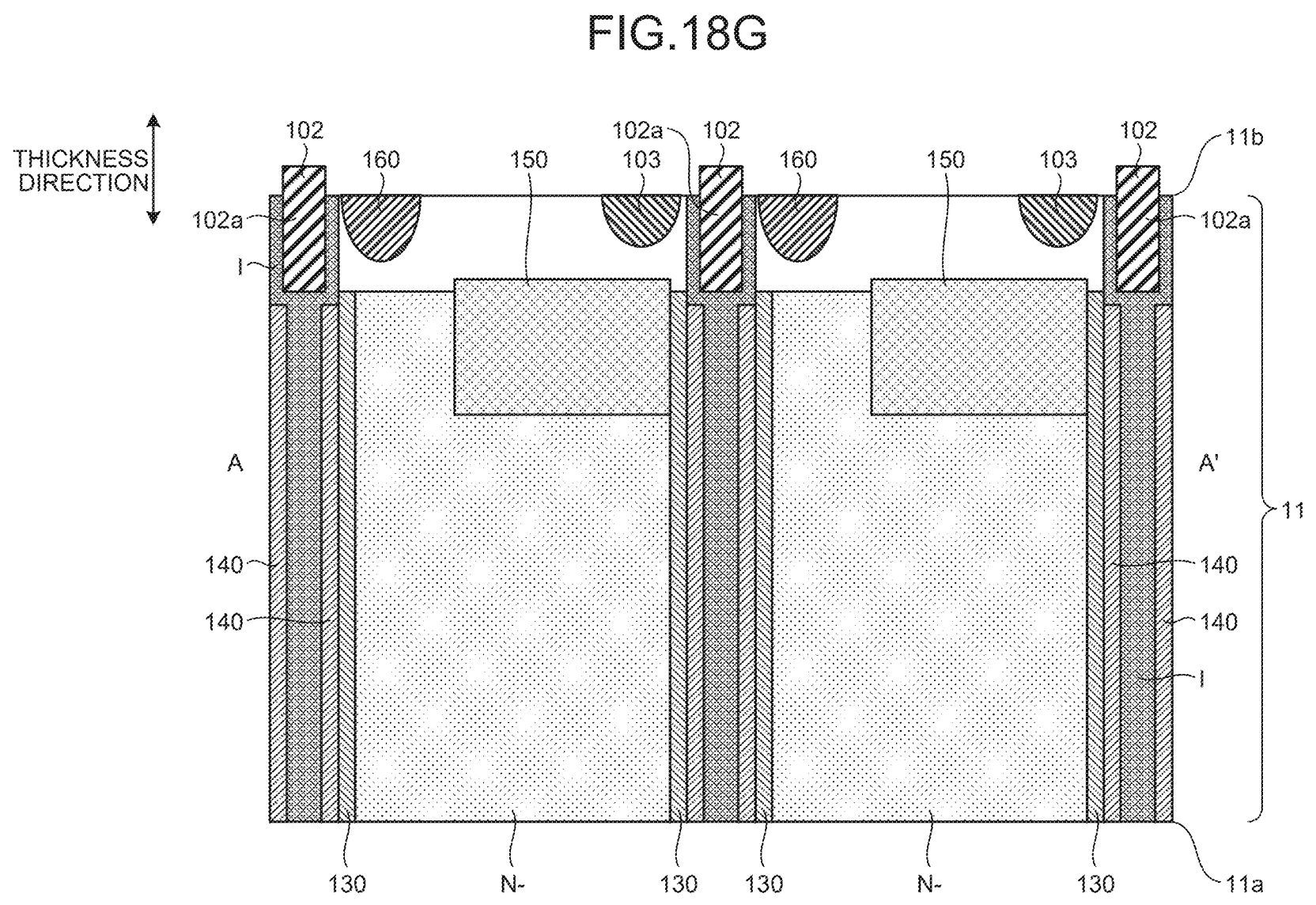

Finally, as depicted in FIG. 18G, an insulating film such as silicon oxide (SiO$_2$) is embedded in the trench in which the fixed charge film 140 is formed on the side wall from the light incident surface 11a of the semiconductor substrate 11. In this manner, the pixel separation section 120 is formed.

As depicted in FIG. 5, in the modification of the present embodiment, when the electrode 102b provided for applying the negative potential is provided, the step of removing the electrode material formed from the light incident surface 11a of the semiconductor substrate 11 may be omitted.

Furthermore, as depicted in FIG. 6, in the modification of the present embodiment, when the electrode 102b provided for applying the negative potential is provided, and the material of the electrode 102b is a metal material such as tungsten (W), the metal material may be embedded after the electrode material formed from the light incident surface 11a of the semiconductor substrate 11 is removed.

Furthermore, as depicted in FIG. 7, when the electrode 102c provided so as to penetrate the pixel separation section 120 is provided in the modification of the present embodiment, the electrode may be integrally formed when a conductive material such as polycrystalline silicon (Poly-Si) is formed from the front surface 11b of the semiconductor substrate 11.

As described above, the configuration according to the embodiment and the modification of the present disclosure can be easily formed by methods, materials, and the like used for manufacturing a general semiconductor device.

11. Eighth Embodiment

<11-1. Schematic Configuration of Imaging Apparatus>

Figure 19:
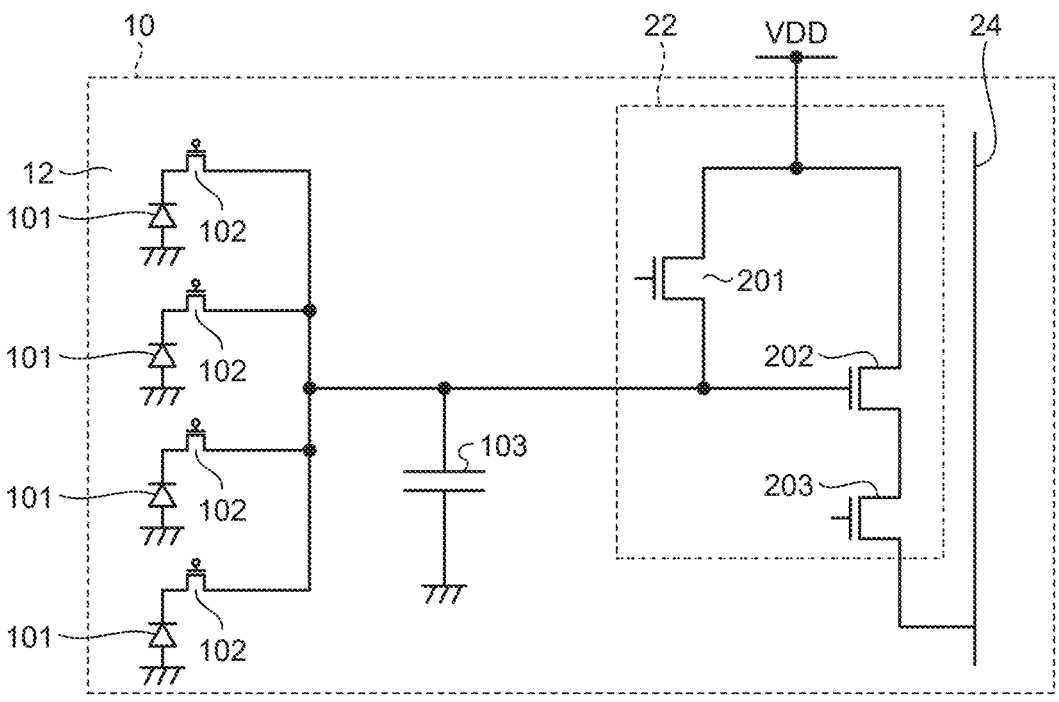
FIG. 19 is a diagram of assistance in explaining an example of the pixel and the readout circuit.
Figure 20:
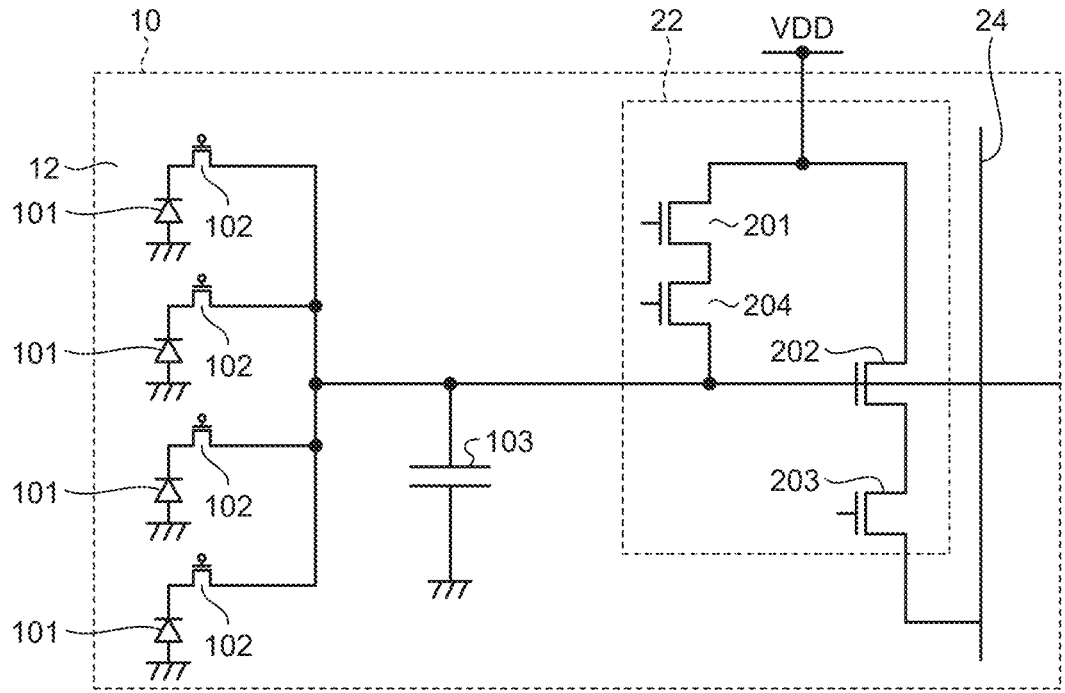
FIG. 20 is a diagram of assistance in explaining an example of the pixel and the readout circuit.

In the embodiments of the present disclosure described above, the imaging apparatus 1 has been described as having the three-dimensional structure formed by bonding three substrates (the first substrate 10, the second substrate 20, and the third substrate 30). However, in the present disclosure, the imaging apparatus 1 is not limited to the three-dimensional structure. In the present disclosure, for example, the imaging apparatus 1 may have a three-dimensional structure formed by bonding two substrates. Therefore, a schematic configuration of the imaging apparatus 1 having the three-dimensional structure formed by bonding two substrates will be described with reference to FIGS. 19 and 20. FIGS. 19 and 20 are diagrams of assistance in explaining an example of the pixel and the readout circuit.

In the embodiment described so far, the pixel 12 and the readout circuit 22 are provided over the first substrate 10 and the second substrate 20 as depicted in FIGS. 2A to 2D. On the other hand, in the present embodiment, as depicted in FIGS. 19 and 20, the pixel 12 and the readout circuit 22 are provided on one first substrate 10. In other words, in the present embodiment, the pixel 12 and the readout circuit 22 are provided on one substrate (first substrate 10).

Specifically, as depicted in FIG. 19, the pixel 12 includes four pairs including the photoelectric conversion section 101 and the transfer transistor 102, and the readout circuit 22 includes the reset transistor 201, the amplification transistor 202, and the selection transistor 203. Note that the four photoelectric conversion sections 101 illustrated in FIG. 19 share the floating diffusion 103. Furthermore, in the example in FIG. 19, any one of the reset transistor 201, the amplification transistor 202, and the selection transistor 203 may include two transistors. For example, since the channel area is increased by configuring the amplification transistor 202 with two transistors, noise of the imaging apparatus 1 can be reduced.

Furthermore, as depicted in FIG. 20, the pixel 12 may include four pairs including the photoelectric conversion section 101 and the transfer transistor 102, and the readout circuit 22 may include the reset transistor 201, the amplification transistor 202, the selection transistor 203, and the conversion efficiency switching transistor 204. Note that the four photoelectric conversion sections 101 illustrated in FIG. 20 share the floating diffusion 103. Furthermore, in the example in FIG. 20, each of the reset transistor 201, the amplification transistor 202, the selection transistor 203, and the conversion efficiency switching transistor 204 may include one transistor.

<11-2. Cross-Sectional Configuration>

Figure 21:
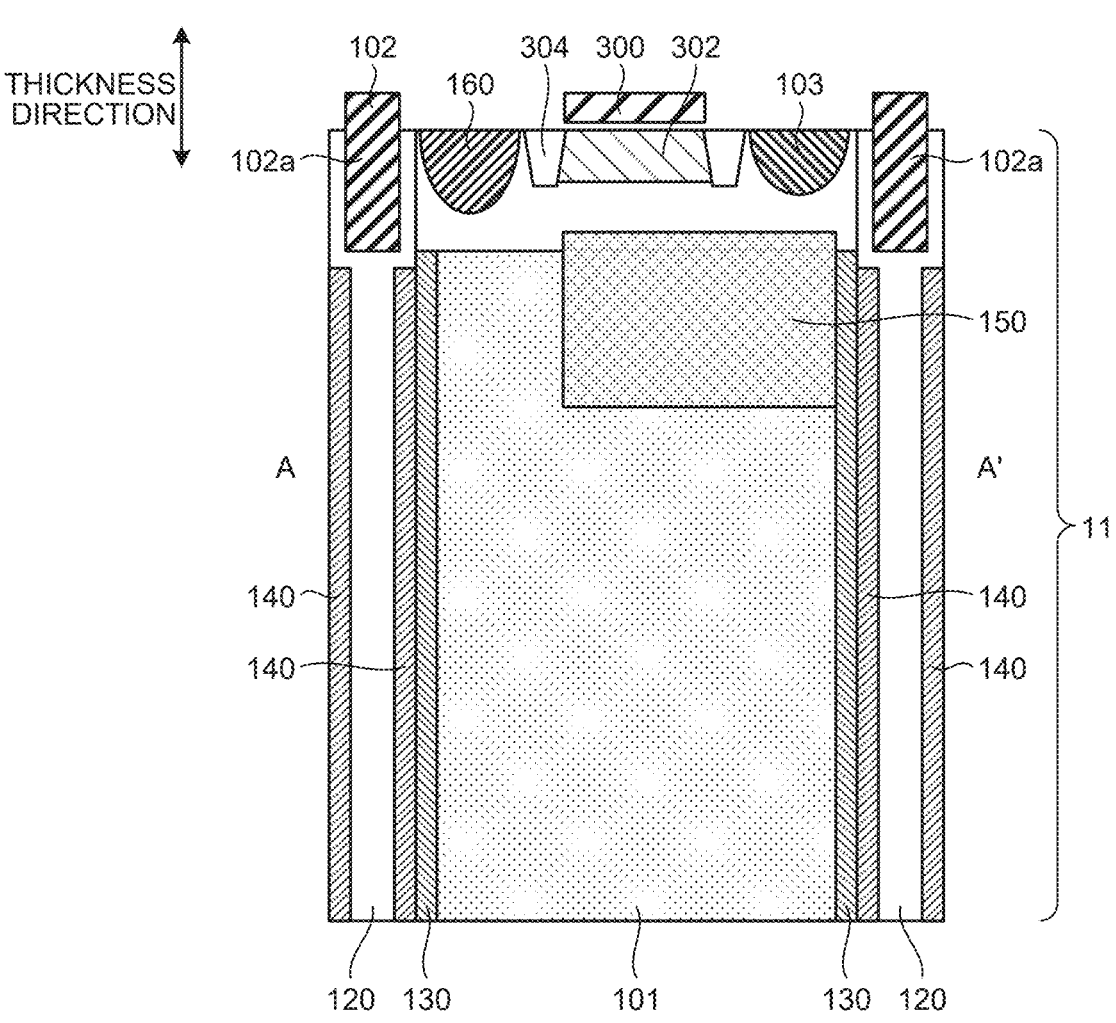
FIG. 21 is a diagram of assistance in explaining a part of a cross section of the imaging apparatus 1 according to an eighth embodiment of the present disclosure.

Next, a cross-sectional configuration of the imaging apparatus 1 according to the eighth embodiment of the present disclosure will be described with reference to FIG. 21. FIG. 21 is a diagram of assistance in explaining a part of a cross section of the imaging apparatus 1 according to the present embodiment, and specifically corresponds to a cross section obtained by cutting the imaging apparatus 1 along line A-A' illustrated in FIG. 22.

As depicted in FIG. 21, similarly to the embodiments described above, the imaging apparatus 1 according to the present embodiment includes the semiconductor substrate 11 and the pixel separation section 120 provided on the semiconductor substrate 11. In addition, the semiconductor substrate 11 includes the photoelectric conversion section 101, the transfer transistor 102, and the floating diffusion 103. Specifically, as depicted in FIG. 21, the present embodiment includes a pixel transistor including a gate 300 provided on the front surface 11b of the semiconductor substrate 11 and a P-type diffusion layer 302 provided on the front surface 11*b* in the semiconductor substrate 11. The pixel transistor can be any one of the reset transistor 201, the amplification transistor 202, the selection transistor 203, and the conversion efficiency switching transistor 204 described above. Furthermore, the pixel transistor is electrically separated from the floating diffusion 103 and the P-type diffusion layer 160 by shallow trench isolation (STI) 304 provided on the side of the front surface 11*b* in the semiconductor substrate 11.

<11-3. Planar Configuration>

Figure 22:
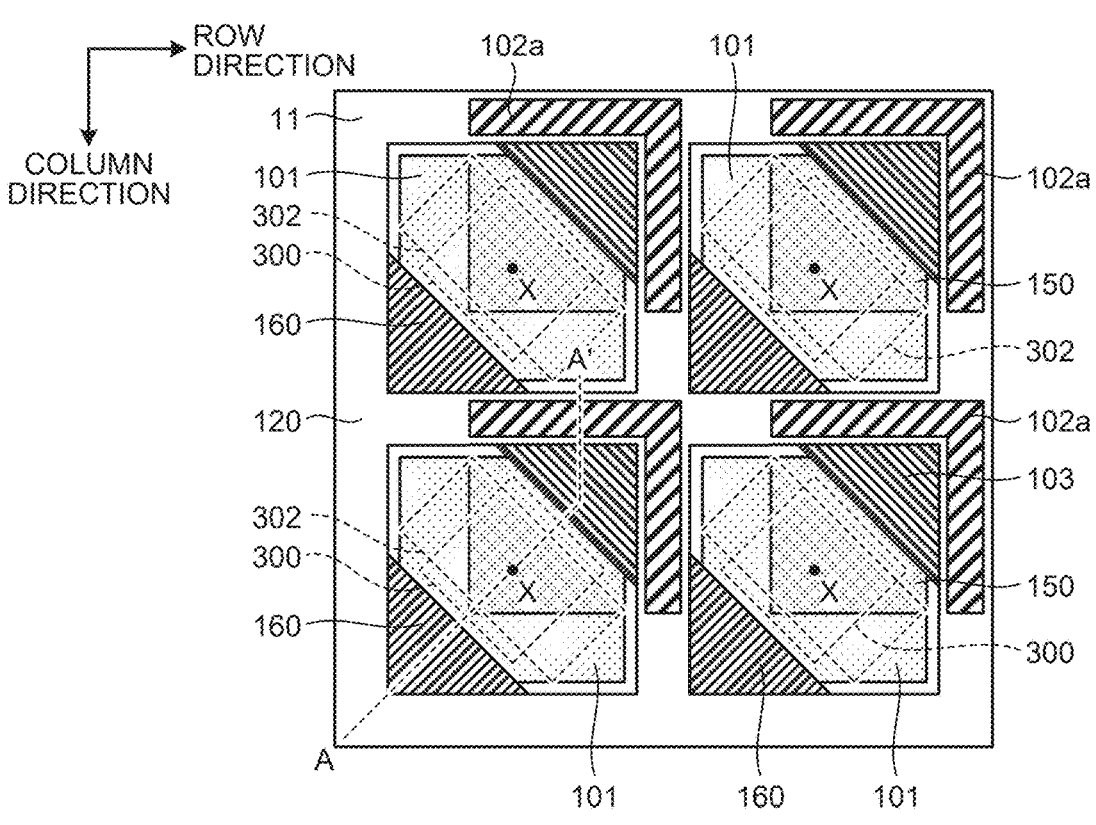
FIG. 22 is a diagram of assistance in explaining a part of a plane of the imaging apparatus 1 according to the eighth embodiment of the present disclosure.

A planar configuration of the imaging apparatus 1 according to the present embodiment will be described with reference to FIG. 22. FIG. 22 is a diagram of assistance in explaining a part of a plane of the imaging apparatus 1 according to the present embodiment, and specifically corresponds to a cross section of the imaging apparatus 1 illustrated in FIG. 22. Note that, in FIG. 22, the gate 300 and the P-type diffusion layer 302 configuring the pixel transistor are indicated by broken lines for clarity.

As depicted in FIG. 21, in the present embodiment, a plurality of pixels 12 adjacent to each other is separated by the pixel separation section 120, and the pixel transistor is provided for each pixel 12. Specifically, the gate 300 and the P-type diffusion layer 302 of the pixel transistor are provided on the photoelectric conversion section 101 between the floating diffusion 103 and the P-type diffusion layer 160. Note that, in the present embodiment, since the readout circuit 22 is provided so as to be shared by the four pixels 12, each of the four pixel transistors illustrated in FIG. 22 can be the reset transistor 201, the amplification transistor 202, and the selection transistor 203 (in this case, one of the reset transistor 201, the amplification transistor 202, and the selection transistor 203 includes two transistors). Alternatively, in the present embodiment, each of the four pixel transistors illustrated in FIG. 22 can be the reset transistor 201, the amplification transistor 202, the selection transistor 203, and the conversion efficiency switching transistor 204.

As described above, in the present embodiment, by providing the pixel transistors configuring the readout circuit 22 on the semiconductor substrate 11, the three-dimensional structure of the imaging apparatus 1 can be made compact and simple.

<11-4. First Modification>

In the present embodiment, an arrangement and the like of a gate electrode 120*a* and the pixel 12 can be modified as follows. Therefore, modifications such as the arrangement of the gate electrode 120*a* and the pixel 12 will be described with reference to FIGS. 23 to 26. FIGS. 23 to 26 are diagrams of assistance in explaining a part of a plane of the imaging apparatus 1 according to the modifications of the present embodiment, and a cross section of the imaging apparatus 1 taken along line A-A' illustrated in the drawings corresponds to FIG. 20.

Figure 23:
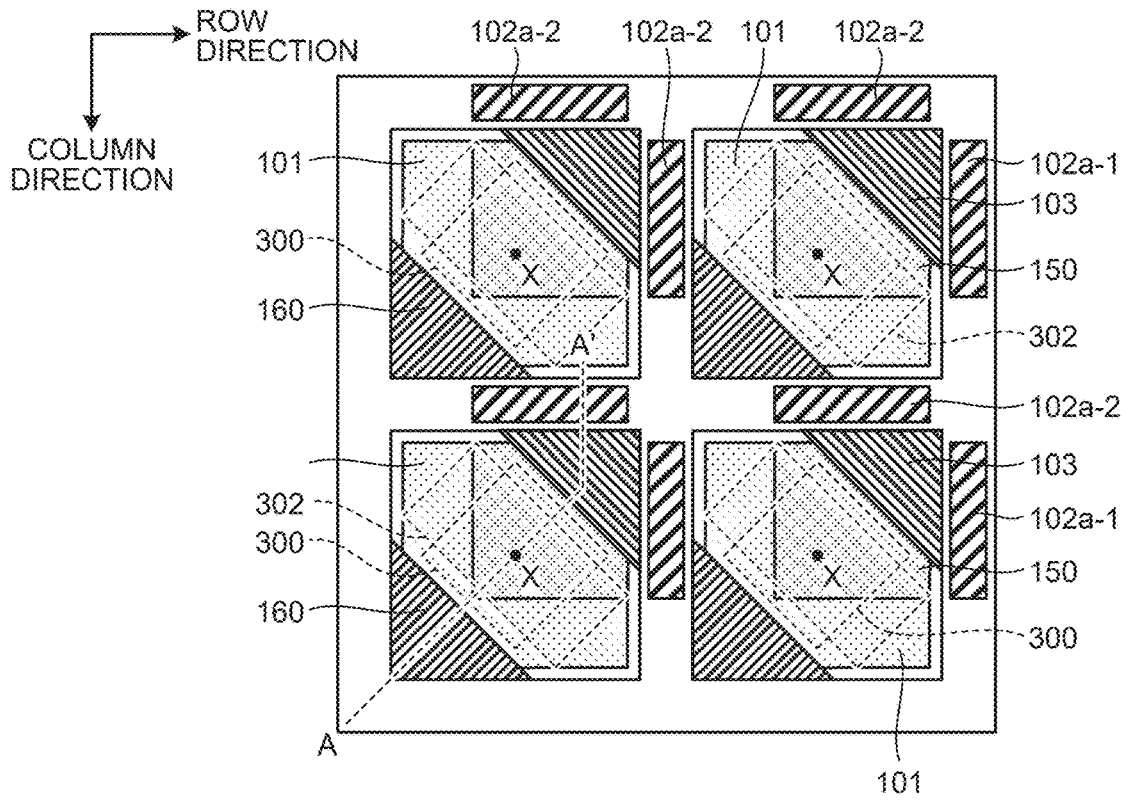
FIG. 23 is a diagram of assistance in explaining a part of a plane of the imaging apparatus 1 according to a modification of the eighth embodiment of the present disclosure.

In the present embodiment, when the imaging apparatus 1 is viewed from the front surface 11*b* of the semiconductor substrate 11, the number of gates 102*a* of the transfer transistor 102 is not limited to one, and a plurality of gates 102*a* may be provided. As depicted in FIG. 23, in the present modification, the transfer transistor 102 has two gates, a gate 102*a*-1 and a gate 102*a*-2.

Figure 24:
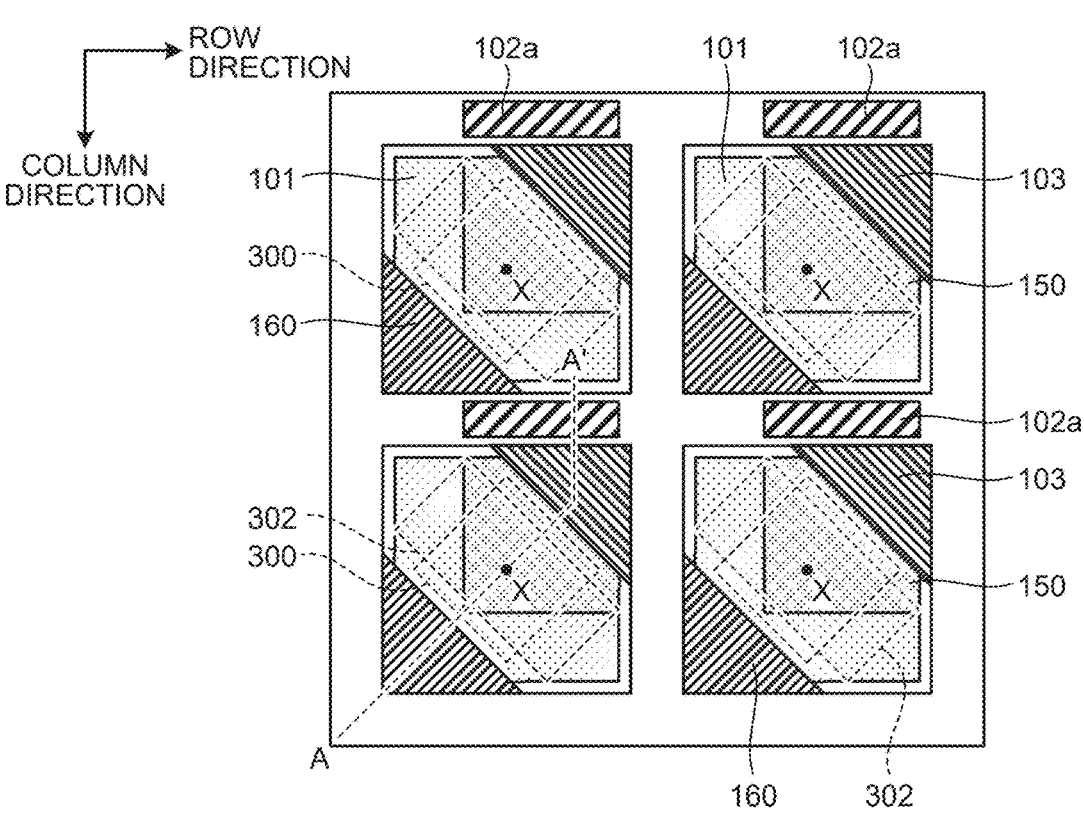
FIG. 24 is a diagram of assistance in explaining a part of a plane of the imaging apparatus 1 according to a modification of the eighth embodiment of the present disclosure.

Furthermore, in the present embodiment, when the imaging apparatus 1 is viewed from the front surface 11*b* of the semiconductor substrate 11, the arrangement of the gates 102*a* of the transfer transistor 102 is not limited to two sides in the matrix direction, and the gates 102*a* may be provided along a single direction. As depicted in FIG. 24, in the present modification, the transfer transistor 102 includes the gates 102*a* formed along the row direction. The gate 102*a* is provided between the pixels 12 adjacent in the column direction.

Figure 25:
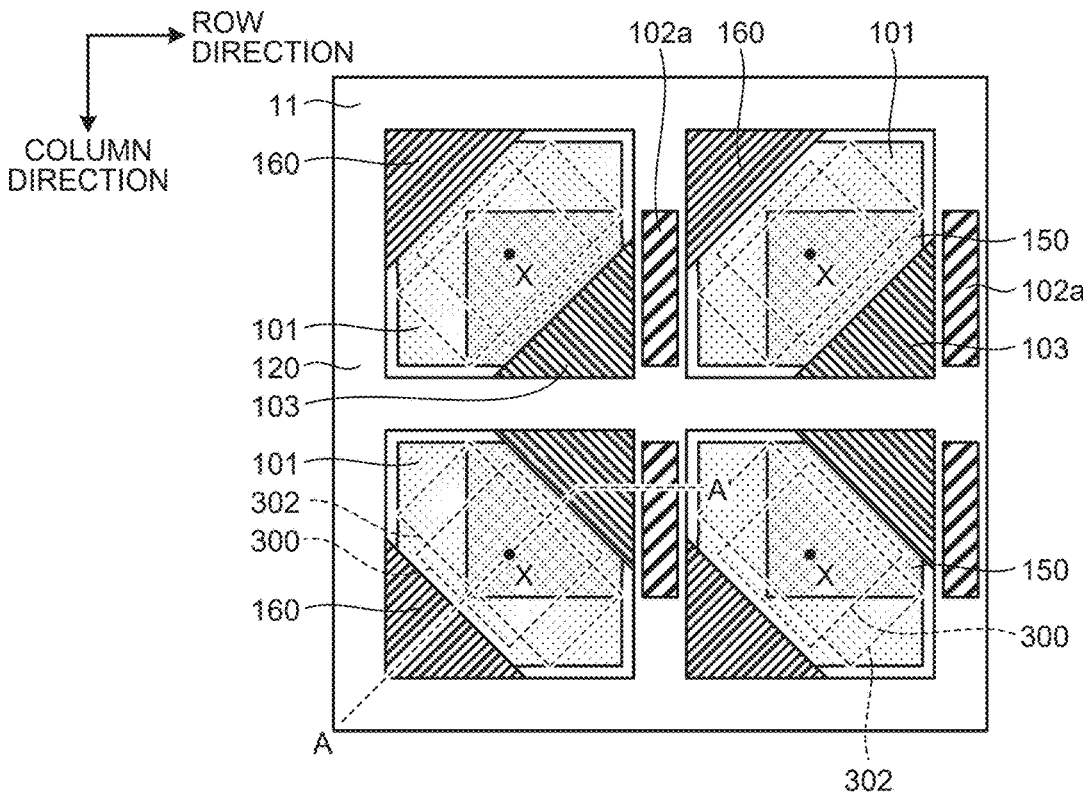
FIG. 25 is a diagram of assistance in explaining a part of a plane of the imaging apparatus 1 according to a modification of the eighth embodiment of the present disclosure.

Furthermore, in the present embodiment, the arrangement of the gate electrode 120*a* and the pixel 12 can be modified. In the present modification, as depicted in FIG. 25, the gate 102*a* of the transfer transistor 102 is provided between two pixels 12 adjacent in the row direction. Furthermore, the two pixels 12 adjacent in the column direction are provided in line symmetry with the pixel separation section 120, as an axis, provided between the two pixels 12 adjacent in the column direction and extending in the row direction. In other words, in the present modification, the floating diffusions 103 of the two pixels 12 adjacent in the column direction are provided at positions close to each other.

Figure 26:
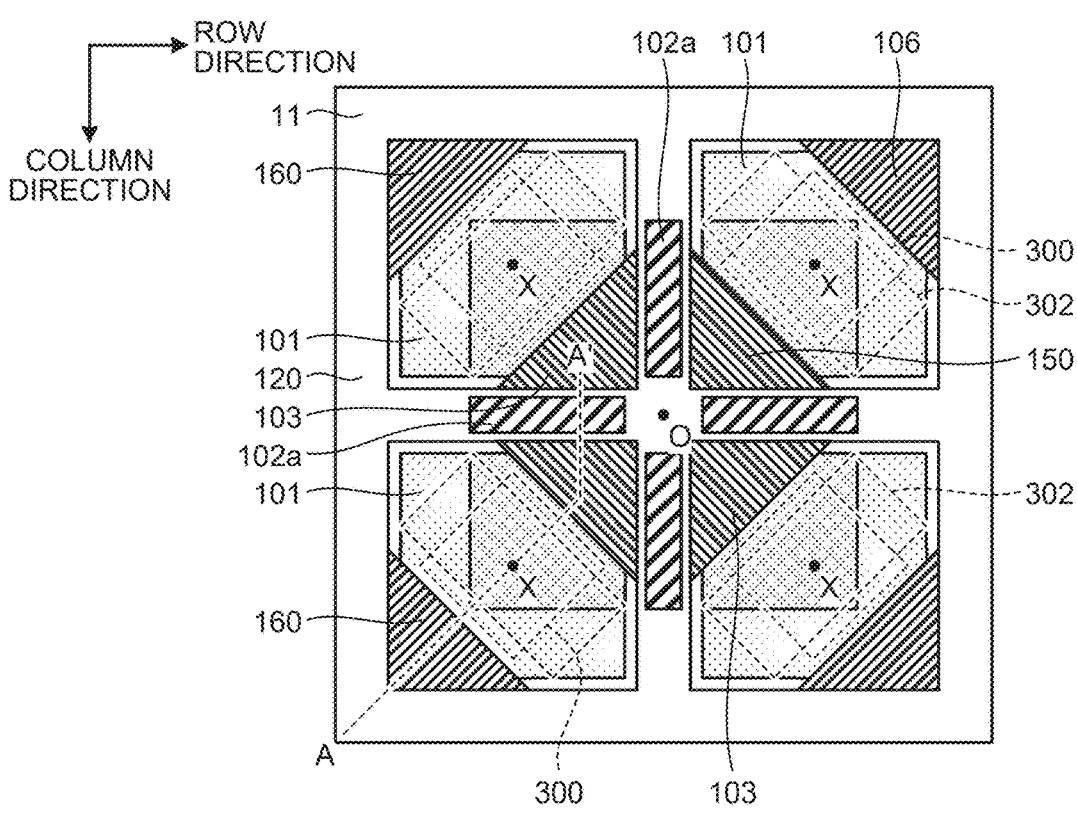
FIG. 26 is a diagram of assistance in explaining a part of a plane of the imaging apparatus 1 according to a modification of the eighth embodiment of the present disclosure.

Furthermore, in the present embodiment, the four pixels 12 sharing one readout circuit 22 may be provided rotationally symmetrically with respect to the center point O of the entire four pixels 12. Specifically, in the present modification, as depicted in FIG. 26, the gate 102*a* having rectangular shape is provided between two adjacent pixels 12, and the four adjacent pixels 12 are provided rotationally symmetrically with respect to the center points O of the four pixels 12. In other words, in the present modification, the floating diffusions 103 of the four pixels 12 are provided at positions close to each other.

<11-5. Second Modification>

Furthermore, in the present embodiment, the pixel transistor provided on the pixel 12 can be modified as follows. Therefore, modifications of the pixel transistor will be described with reference to FIGS. 27 to 32. FIGS. 27 to 32 are diagrams of assistance in explaining a part of a plane of the imaging apparatus 1 according to the modifications of the present embodiment, and a cross section of the imaging apparatus 1 taken along line A-A' illustrated in the drawings corresponds to FIG. 20.

Figure 27:
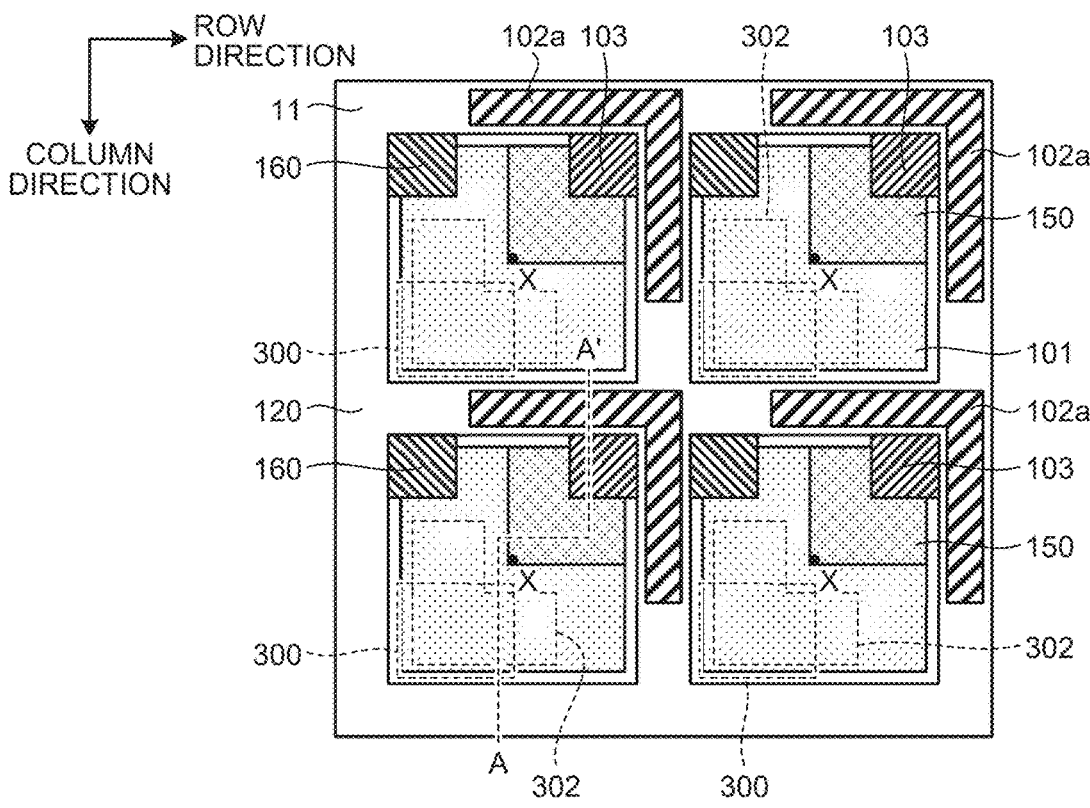
FIG. 27 is a diagram of assistance in explaining a part of a plane of the imaging apparatus 1 according to a modification of the eighth embodiment of the present disclosure.

In the present modification, as depicted in FIG. 27, when the imaging apparatus 1 is viewed from the front surface 11*b* of the semiconductor substrate 11, the pixel transistor is provided at a position having a point-target relationship with the floating diffusion 103 having a rectangular shape with the center X of the pixel 12 as a center point. Furthermore, the pixel transistor includes the P-type diffusion layer 302 having an L-shape provided on the photoelectric conversion section 101, and the gate 300 provided on a portion where a region extending in the row direction of the P-type diffusion layer 302 and a region extending in the column direction are connected. Furthermore, in the present modification, the P-type diffusion layer 160 has a rectangular shape similarly to the floating diffusion 103. Furthermore, the P-type diffusion layer 160 is provided at a position adjacent to a side close to the floating diffusion 103 and away from the floating diffusion 103 among two sides extending in the row direction of the photoelectric conversion section 101.

As described above, in the example depicted in FIG. 27, a degree of freedom of layout on the substrate 11 can be improved by deforming the shape of the pixel transistor.

Figure 28:
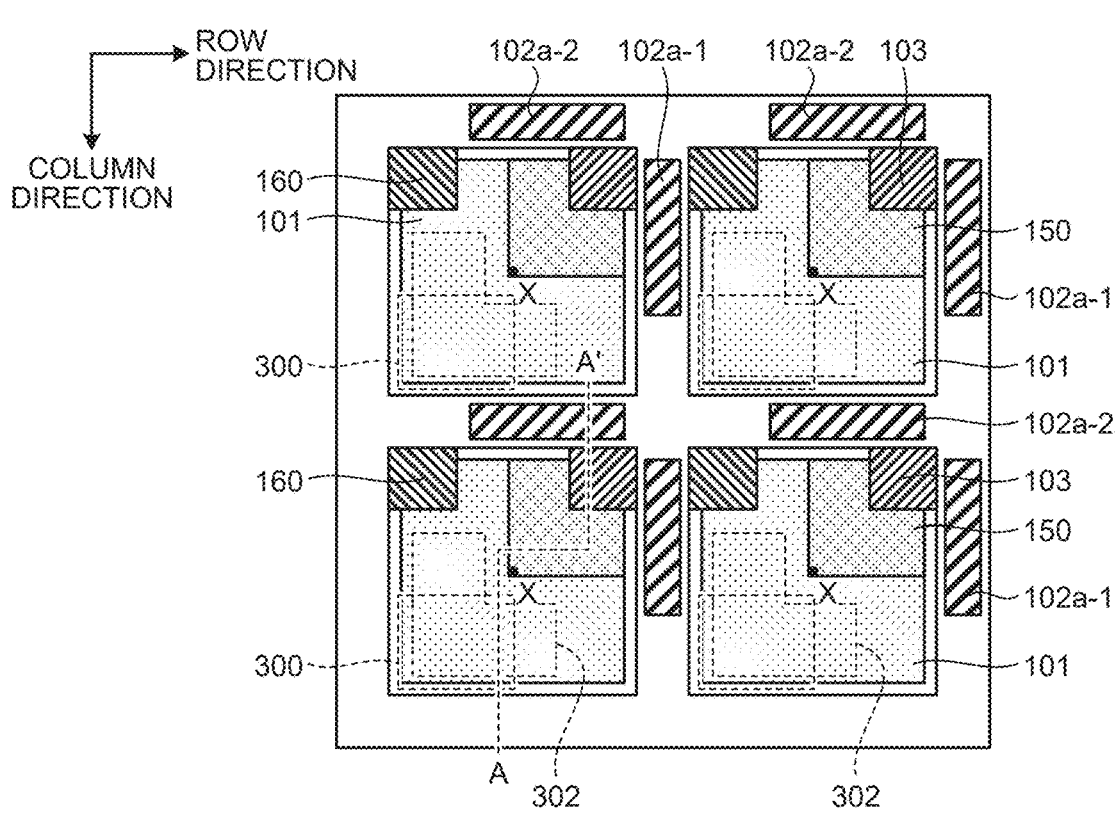
FIG. 28 is a diagram of assistance in explaining a part of a plane of the imaging apparatus 1 according to a modification of the eighth embodiment of the present disclosure.

Furthermore, also in the present modification illustrated in FIG. 27, when the imaging apparatus 1 is viewed from the front surface 11*b* of the semiconductor substrate 11, the number of gates 102*a* of the transfer transistor 102 is not limited to one, and a plurality of gates 102*a* may be provided. For example, as depicted in FIG. 28, in the present modification, the transfer transistor 102 may have two gates, the gate 102*a*-1 and the gate 102*a*-2.

Figure 29:
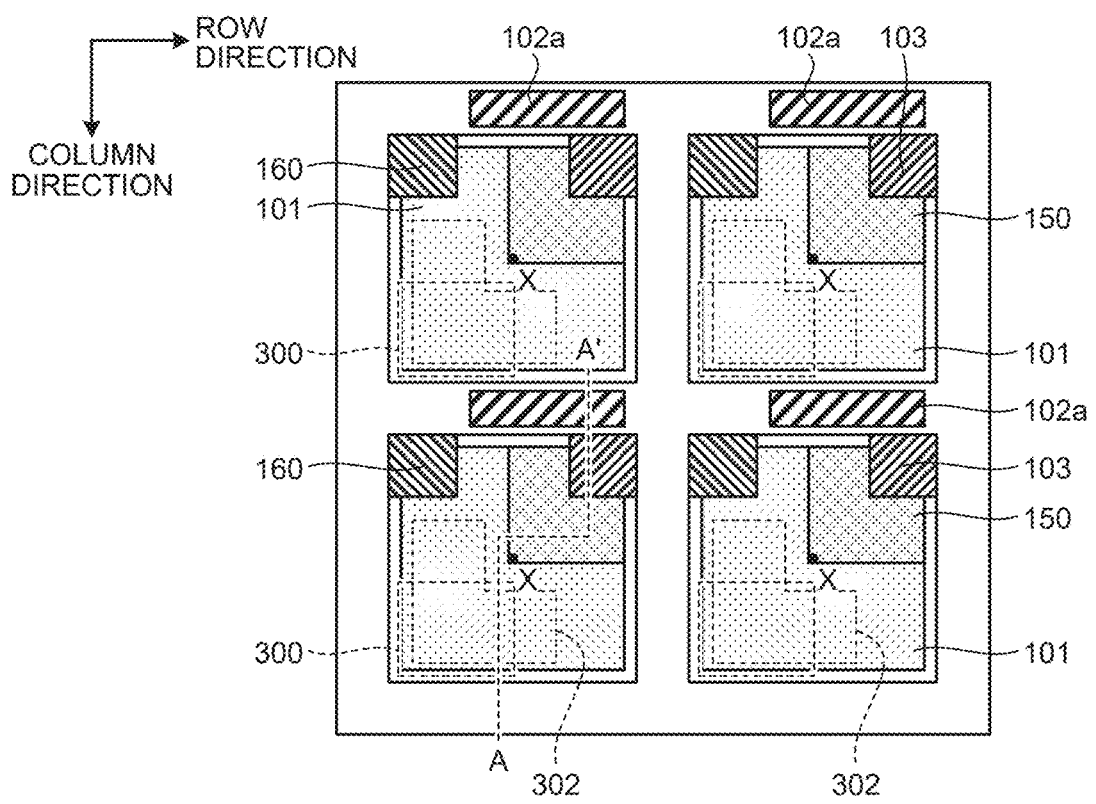
FIG. 29 is a diagram of assistance in explaining a part of a plane of the imaging apparatus 1 according to a modification of the eighth embodiment of the present disclosure.

Furthermore, also in the present modification depicted in FIG. 27, when the imaging apparatus 1 is viewed from the front surface 11*b* of the semiconductor substrate 11, the arrangement of the gate 102*a* of the transfer transistor 102 is not limited to two sides in the matrix direction, and the gates 102*a* may be provided along a single direction. For example, as depicted in FIG. 29, in the present modification, the transfer transistors 102 may have the gates 102*a* formed along the row direction. Then, the gate 102*a* is provided between the pixels 12 adjacent in the column direction.

Figure 30:
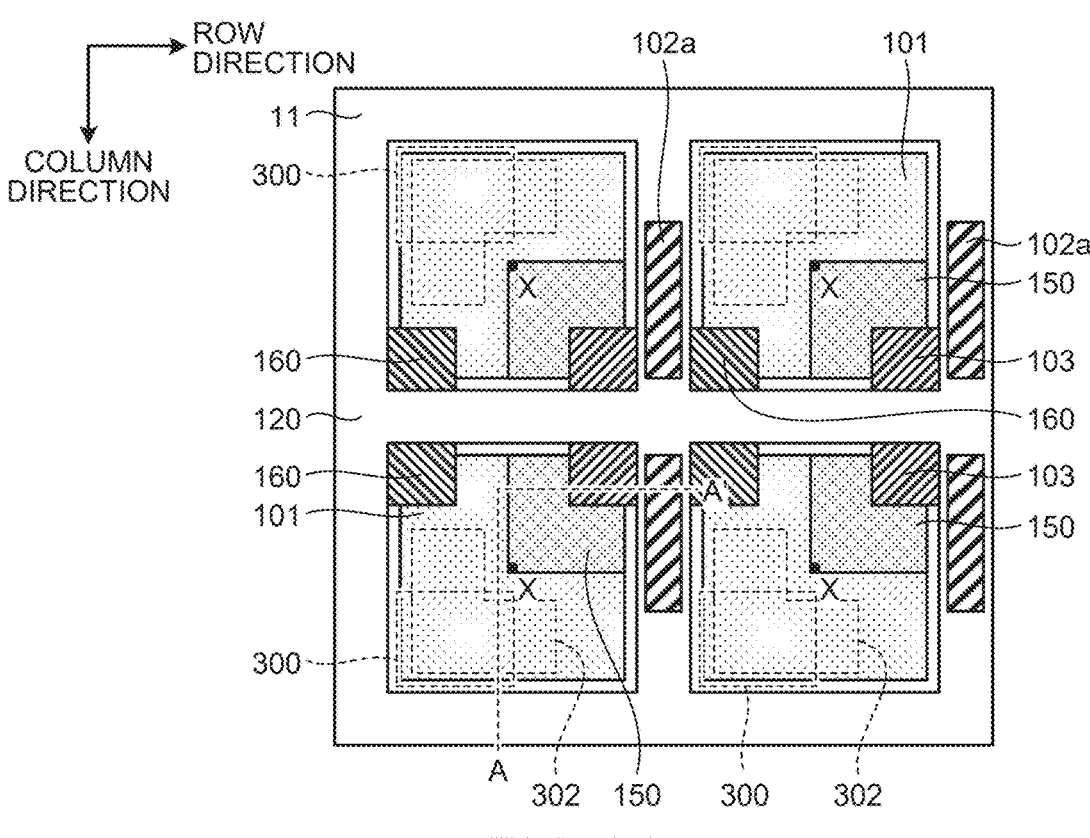
FIG. 30 is a diagram of assistance in explaining a part of a plane of the imaging apparatus 1 according to a modification of the eighth embodiment of the present disclosure.

Furthermore, also in the present modification illustrated in FIG. 27, the arrangement of the gate electrode 120*a* and the pixel 12 can be modified. For example, in the present modification, as depicted in FIG. 30, the gate 102*a* of the transfer transistor 102 is provided between two pixels 12 adjacent in the row direction. Furthermore, the two pixels 12 adjacent in the column direction are provided in line symmetry with the pixel separation section 120, as an axis, provided between the two pixels 12 adjacent in the column direction and extending in the row direction. In other words, in the present modification, the floating diffusions 103 of the two pixels 12 adjacent in the column direction will be provided at positions close to each other.

Figure 31:
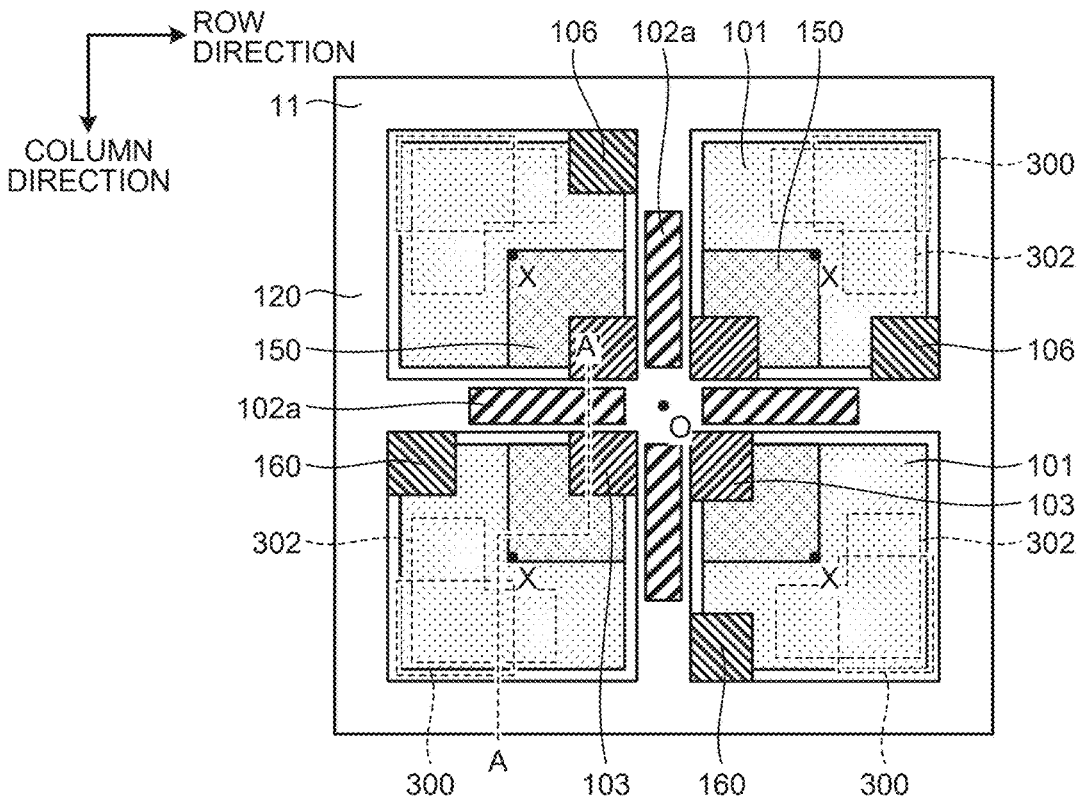
FIG. 31 is a diagram of assistance in explaining a part of a plane of the imaging apparatus 1 according to a modification of the eighth embodiment of the present disclosure.

Furthermore, also in the present modification depicted in FIG. 27, the four pixels 12 sharing one readout circuit 22 may be provided rotationally symmetrically with respect to the center point O of the four pixels 12. For example, in the present modification, as depicted in FIG. 31, the gate 102*a* having a rectangular shape is provided between two adjacent pixels 12, and four adjacent pixels 12 are provided rotationally symmetrically with respect to the center points O of the four pixels 12. In other words, in the present modification, the floating diffusions 103 of the four pixels 12 will be provided at positions close to each other.

Figure 32:
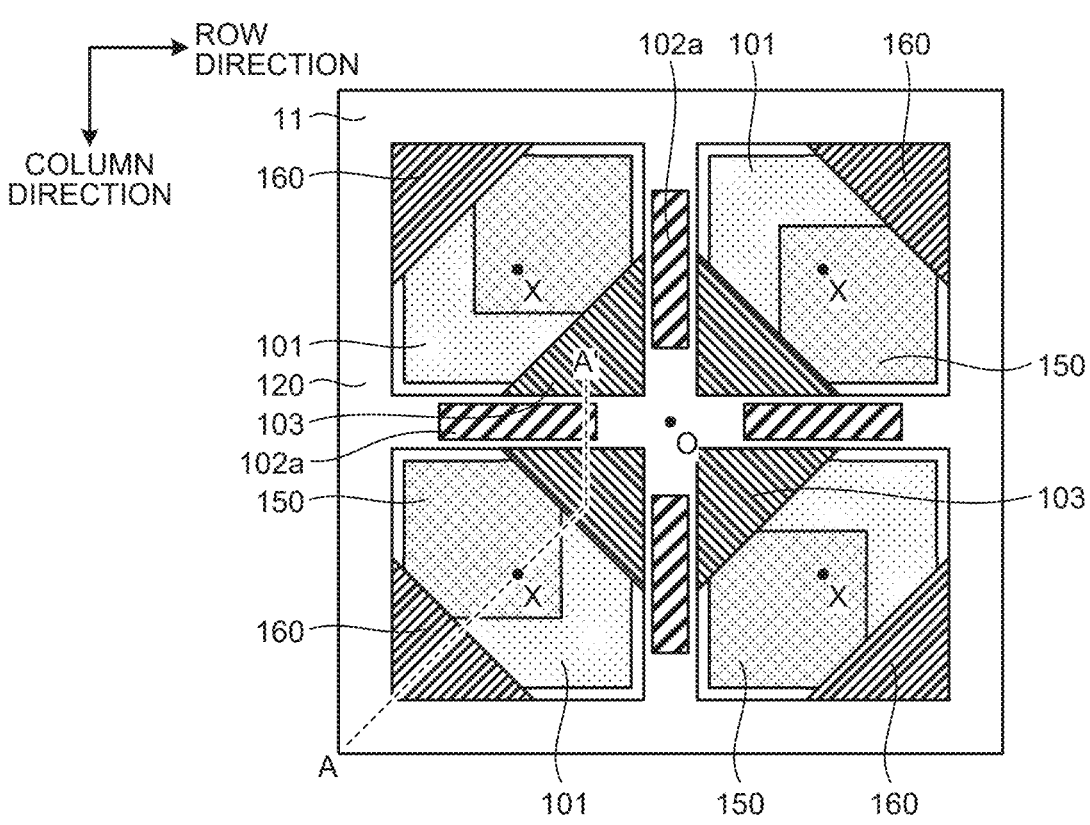
FIG. 32 is a diagram of assistance in explaining a part of a plane of the imaging apparatus 1 according to a modification of the eighth embodiment of the present disclosure.

Furthermore, for example, in the present modification, similarly to FIG. 31, the gate 102*a* having a rectangular shape is provided between two adjacent pixels 12, and four adjacent pixels 12 are provided rotationally symmetrically with respect to the center point O of the four pixels 12, as depicted in FIG. 32. Furthermore, in FIG. 32, the N-type diffusion layers 150 are provided along the corresponding gates 102*a* for each pixel 12. Furthermore, in FIG. 32, each of the N-type diffusion layers 150 is arranged at a position as far as possible from the N-type diffusion layer 150 of the adjacent pixel 12. In other words, in the example illustrated in FIG. 32, the N-type diffusion layer 150 may be provided at different positions for each pixel 12.

12. Summary

As described above, according to each embodiment of the present disclosure, since the gate 102*a* of the transfer transistor 102 is provided to extend into the pixel separation section 120, even when the imaging apparatus 1 is downsized, it is possible to suppress deterioration in image quality while improving transfer efficiency.

In the embodiments of the present disclosure described above, the case where the present disclosure is applied to a back-illuminated CMOS image sensor structure has been described. However, the embodiments of the present disclosure is not limited thereto, and may be applied to other structures.

Furthermore, in the embodiments of the present disclosure described above, the semiconductor substrate 11 is not necessarily a silicon substrate, and may be another substrate (e.g., silicon on insulator (SOI) substrate or SiGe substrate)

In addition, the semiconductor substrate 11 may have a semiconductor structure or the like formed on the above various substrates.

Furthermore, the imaging apparatus 1 according to the embodiments of the present disclosure can be manufactured by using methods, apparatuses, and conditions used for manufacturing a general semiconductor device. In other words, the imaging apparatus 1 according to the present embodiments can be manufactured using an existing semiconductor device manufacturing process.

Examples of the above-described method include a physical vapor deposition (PVD) method, a chemical vapor deposition (CVD) method, and an atomic layer deposition (ALD) method. Examples of the PVD method include a vacuum vapor deposition method, an electron beam (EB) vapor deposition method, various sputtering methods (magnetron sputtering method, radio frequency (RF)-direct current (DC) coupled bias sputtering method, electron cyclotron resonance (ECR) sputtering method, counter target sputtering method, high frequency sputtering method, and the like), an ion plating method, a laser ablation method, a molecular beam epitaxy (MBE) method, and a laser transfer method. Examples of the CVD method include a plasma CVD method, a thermal CVD method, an organic metal (MO) CVD method, and a photo CVD method. Further, other methods include an electrolytic plating method, an electroless plating method, and a spin coating method, an immersion method; a cast method, a micro-contact printing method, a drop cast method; various printing methods such as a screen printing method, an inkjet printing method, an offset printing method, a gravure printing method, and a flexographic printing method; a stamping method, a spray method; and various coating methods such as an air doctor coater method, a blade coater method, a rod coater method, a knife coater method, a squeeze coater method, a reverse roll coater method, a transfer roll coater method, a gravure coater method, a kiss coater method, a cast coater method, a spray coater method, a slit orifice coater method, and a calendar coater method. Furthermore, examples of the patterning method include chemical etching such as shadow mask, laser transfer, and photolithography, and physical etching using ultraviolet rays, laser, or the like. In addition, examples of the planarization technique include a chemical mechanical polishing (CMP) method, a laser planarization method, and a reflow method.

13. Application Examples

<13-1. Application to Camera>

Figure 33:
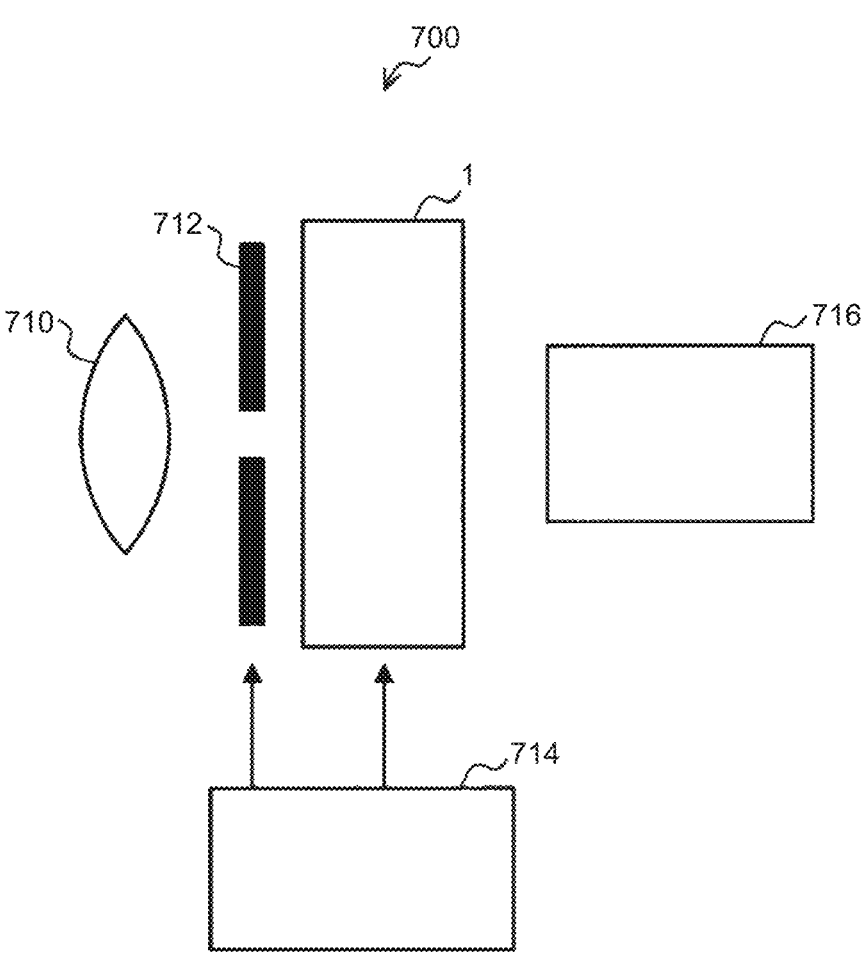
FIG. 33 is a diagram of assistance in explaining an example of a schematic functional configuration of a camera.

The technology according to the present disclosure (present technology) can be further applied to various products. For example, the technology according to the present disclosure may be applied to a camera. Therefore, a configuration example of a camera 700 as an electronic apparatus to which the present technology is applied will be described with reference to FIG. 33. FIG. 33 is a diagram of assistance in explaining an example of a schematic functional configuration of the camera 700 to which the technology according to the present disclosure (the present technology) can be applied.

As depicted in FIG. 33, the camera 700 includes the imaging apparatus 1, an optical lens 710, a shutter mechanism 712, a drive circuit unit 714, and a signal processing circuit unit 716. The optical lens 710 forms an image of image light (incident light) from a subject on an imaging surface of the imaging apparatus 1. As a result, the signal charge is accumulated in the imaging element 100 of the imaging apparatus 1 for a certain period. The shutter mechanism 712 opens and closes to control a light irradiation period and a light shielding period for the imaging apparatus 1. The drive circuit unit 714 supplies a drive signal for controlling a signal transfer operation of the imaging apparatus 1, a shutter operation of the shutter mechanism 712, and the like to the imaging apparatus 1 and the shutter mechanism 712. In other words, the imaging apparatus 1 performs signal transfer based on the drive signal (timing signal) supplied from the drive circuit unit 714. The signal processing circuit unit 716 performs various types of signal processing. For example, the signal processing circuit unit 716 outputs a video signal subjected to signal processing to, for example, a storage medium (not illustrated) such as a memory, or to a display section (not illustrated).

<13-2. Application to Smartphone>

Figure 34:
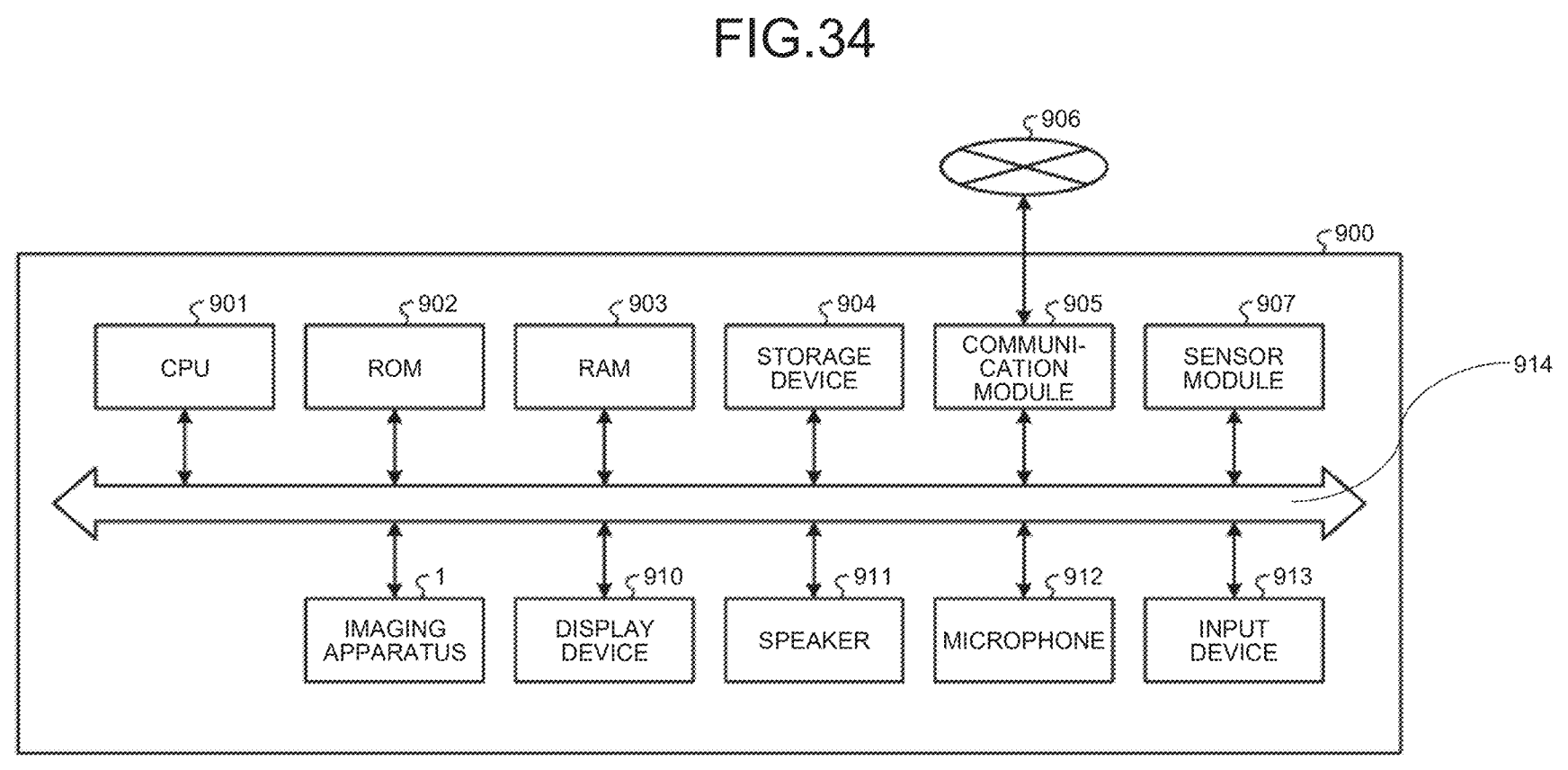

The technology according to the present disclosure (present technology) can be further applied to various products. For example, the technology according to the present disclosure may be applied to a smartphone. Therefore, a configuration example of a smartphone 900 as an electronic apparatus to which the present technology is applied will be described with reference to FIG. 34. FIG. 34 is a block diagram depicting an example of schematic configuration of the smartphone 900 to which the technology according to the present disclosure (the present technology) can be applied.

As depicted in FIG. 34, the smartphone 900 includes a central processing unit (CPU) 901, a read only memory (ROM) 902, and a random access memory (RAM) 903. In addition, the smartphone 900 includes a storage device 904, a communication module 905, and a sensor module 907. Furthermore, the smartphone 900 includes the imaging apparatus 1, a display device 910, a speaker 911, a microphone 912, an input device 913, and a bus 914. Furthermore, the smartphone 900 may include a processing circuit such as a digital signal processor (DSP) instead of or in addition to the CPU 901.

The CPU 901 functions as an arithmetic processing device and a control device, and controls the overall operation in the smartphone 900 or a part thereof according to various programs recorded in the ROM 902, the RAM 903, the storage device 904, and the like. The ROM 902 stores programs, operation parameters, and the like used by the CPU 901. The RAM 903 primarily stores programs used in the execution of the CPU 901, parameters that appropriately change in the execution, and the like. The CPU 901, the ROM 902, and the RAM 903 are connected to one another by the bus 914. In addition, the storage device 904 is a device for data storage configured as an example of a storage unit of the smartphone 900. The storage device 904 includes, for example, a magnetic storage device such as a hard disk drive (HDD), a semiconductor storage device, and an optical storage device. The storage device 904 stores programs and various data executed by the CPU 901, various data acquired from the outside, and the like.

The communication module 905 is a communication interface including, for example, a communication device for connecting to the communication network 906. The communication module 905 can be, for example, a communication card for wired or wireless local area network (LAN), Bluetooth (registered trademark), wireless USB (WUSB), or the like. Furthermore, the communication module 905 may be a router for optical communication, a router for asymmetric digital subscriber line (ADSL), a modem for various types of communication, or the like. The communication module 905 transmits and receives signals and the like to and from the Internet and other communication devices using a predetermined protocol such as transmission control protocol (TCP)/Internet protocol (IP). Furthermore, the communication network 906 connected to the communication module 905 is a network connected in a wired or wireless manner, and is, for example, the Internet, a home LAN, infrared communication, or satellite communication.

The sensor module 907 includes, for example, various sensors such as a motion sensor (e.g., acceleration sensor, gyro sensor, and geomagnetic sensor), a biological information sensor (e.g., pulse sensor, blood pressure sensor, and fingerprint sensor), or a position sensor (e.g., global navigation satellite system (GNSS) receiver).

The imaging apparatus 1 is provided on the surface of the smartphone 900, and can image an object or the like located on the back side or the front side of the smartphone 900. Specifically, the imaging apparatus 1 can include an imaging element (not illustrated) such as a complementary MOS (CMOS) image sensor to which the technology according to the present disclosure (present technology) can be applied, and a signal processing circuit (not illustrated) that performs imaging signal processing on a signal photoelectrically converted by the imaging element. Furthermore, the imaging apparatus 1 may further include an optical system mechanism (not illustrated) including an imaging lens, a zoom lens, a focus lens, and the like, and a drive system mechanism (not illustrated) that controls the operation of the optical system mechanism. Then, the imaging element collects incident light from an object as an optical image, and the signal processing circuit photoelectrically converts the formed optical image in units of pixels, reads a signal of each pixel as an imaging signal, and performs image processing to acquire a captured image.

The display device 910 is provided on the surface of the smartphone 900, and can be, for example, a display device such as a liquid crystal display (LCD) or an organic electro luminescence (EL) display. The display device 910 can display an operation screen, the captured image acquired by the above-described imaging apparatus 1, and the like.

The speaker 911 can output, for example, a call voice, a voice accompanying video content displayed by the display device 910 described above, and the like to the user.

The microphone 912 can collect, for example, a call voice of the user, a voice including a command to activate a function of the smartphone 900, and a voice in a surrounding environment of the smartphone 900.

The input device 913 is a device operated by the user, such as a button, a keyboard, a touch panel, or a mouse. The input device 913 includes an input control circuit that generates an input signal based on information input by the user and outputs the input signal to the CPU 901. By operating the input device 913, the user can input various data to the smartphone 900 and give an instruction on the processing operation.

The configuration example of the smartphone 900 has been described above. Each of the above-described components may be configured using a general-purpose member, or may be configured by hardware specialized for the function of each component. This configuration can be appropriately changed according to a technical level at the time of implementation.

<13-3. Application to Mobile Body>

The technology according to the present disclosure (present technology) can be applied to various products. For example, the technology according to the present disclosure may be realized as, for example, an apparatus mounted on any type of mobile body such as an automobile, an electric vehicle, a hybrid electric vehicle, a motorcycle, a bicycle, a personal mobility, an airplane, a drone, a ship, and a robot.

Figure 35:
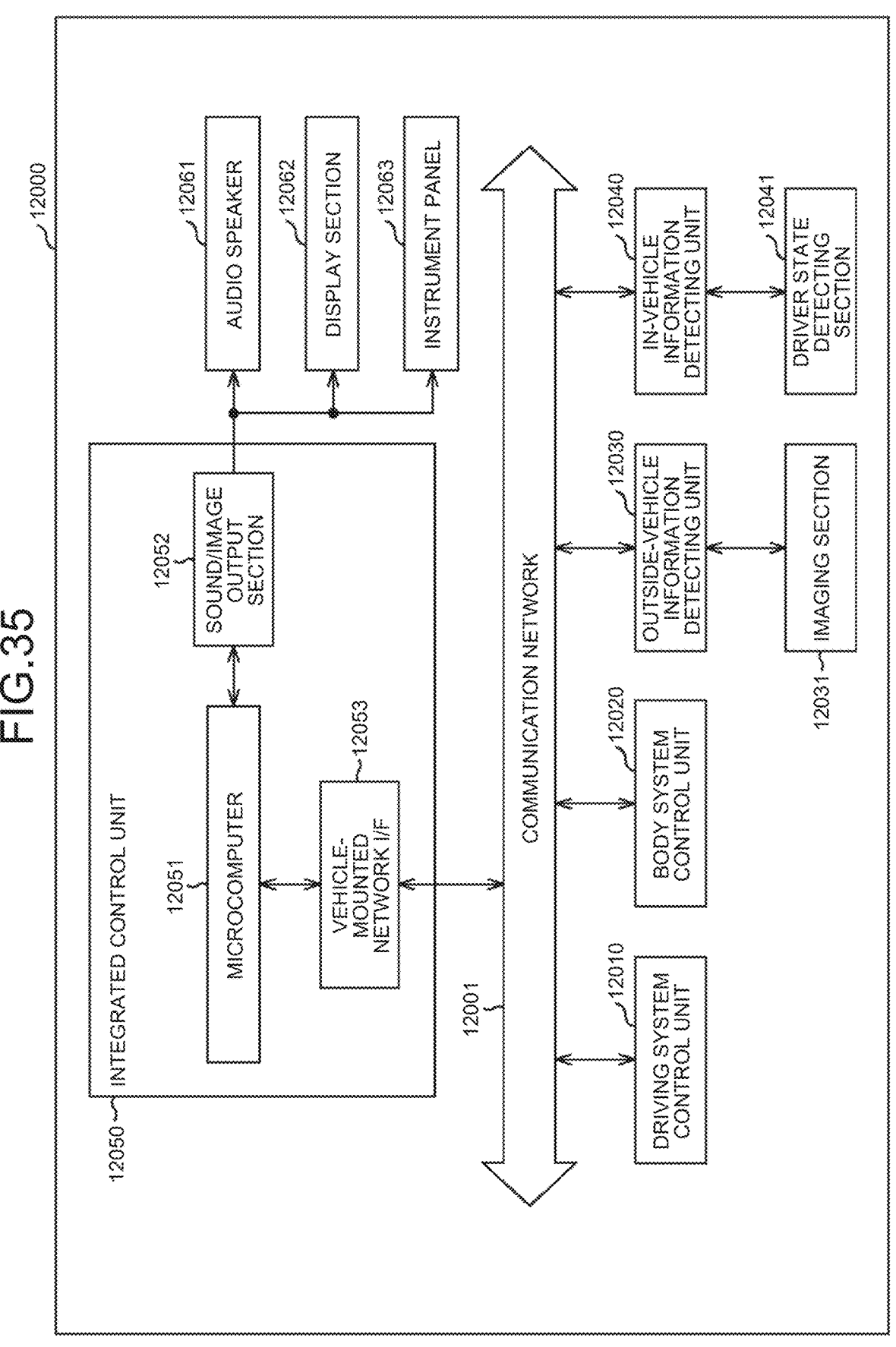
FIG. 35 is a block diagram depicting an example of schematic configuration of a vehicle control system.

FIG. 35 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 35, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 35, an audio speaker 12061, a display section 12062, and an instrument panel 12063 are illustrated as the output device. The display section 12062 may, for example, include at least one of an on-board display and a head-up display.

Figure 36:
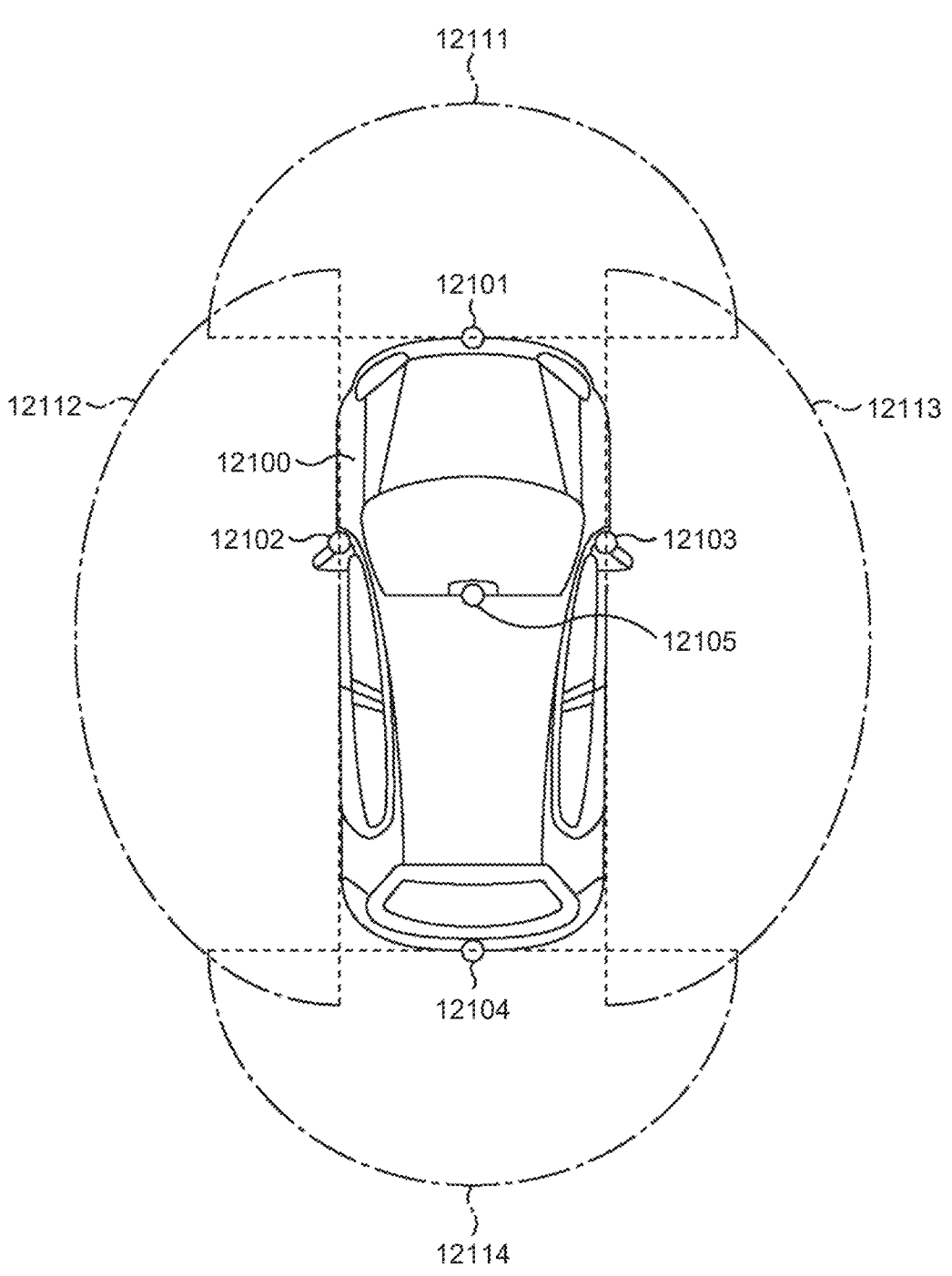
FIG. 36 is a diagram of assistance in explaining an example of installation positions of an outside-vehicle information detecting section and an imaging section.

FIG. 36 is a diagram depicting an example of the installation position of the imaging section 12031.

In FIG. 36, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of a vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100.

The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 36 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to the present disclosure can be applied has been described above. The technology according to the present disclosure can be applied to the imaging section 12031 among the configurations described above. Specifically, the imaging apparatus 1 in FIG. 1 can be applied to the imaging section 12031. By applying the technology according to the present disclosure to the imaging section 12031, a more easily viewable captured image can be obtained. As a result, driver's fatigue can be reduced.

14. Supplement

Although the preferred embodiments of the present disclosure have been described in detail with reference to the accompanying drawings, the technical scope of the present disclosure is not limited to these examples. It is obvious that a person having ordinary knowledge in the technical field of the present disclosure can conceive various changes or modifications within the scope of the technical idea described in the claims, and it is naturally understood that these also belong to the technical scope of the present disclosure.

Furthermore, the effects described in the present specification are merely illustrative or exemplary, and are not restrictive. In other words, the technology according to the present disclosure can exhibit other effects obvious to those skilled in the art from the description of the present specification in addition to or instead of the above results.

The present technology can also have the following configurations.

(1) An imaging apparatus comprising:
   a first semiconductor substrate;
   a plurality of pixels arranged along a row direction and a column direction on the first semiconductor substrate, the plurality of pixels being adjacent to each other; and
   a pixel separation section that partitions the first semiconductor substrate into a plurality of pixel regions in which the pixels are respectively arranged, wherein
   each of the plurality of pixels includes
   a photoelectric conversion section that is located in one of the pixel regions partitioned by the pixel separation section and generates a charge according to incident light, a floating diffusion that holds the charge generated by the photoelectric conversion section, and a transfer transistor that transfers the charge from the photoelectric conversion section to the floating diffusion, and the transfer transistor has a gate electrode that extends into the pixel separation section, along a thickness direction of the first semiconductor substrate, from a second surface of the first semiconductor substrate located on an opposite side to a first surface that is a light incident surface of the first semiconductor substrate.

(2) The imaging apparatus according to (1), wherein
the gate electrode of the transfer transistor extends into the pixel separation section adjacent to the floating diffusion.

(3) The imaging apparatus according to (2), wherein
the gate electrode extends from the second surface to a midway of the first semiconductor substrate along the thickness direction of the first semiconductor substrate.

(4) The imaging apparatus according to (3), wherein
the gate electrode penetrates from the second surface to the first surface along the thickness direction of the first semiconductor substrate.

(5) The imaging apparatus according to (1), wherein
the transfer transistor includes a channel generated between the photoelectric conversion section and the floating diffusion along the thickness direction of the first semiconductor substrate.

(6) The imaging apparatus according to (1), wherein
the floating diffusion contains an impurity of a first conductivity type, and
each of the pixels includes
a diffusion region provided at a position having a point symmetrical relationship with the floating diffusion with respect to a center point of the pixel when viewed from above the second surface, and containing an impurity of a second conductivity type different from the first conductivity type.

(7) The imaging apparatus according to any one of (1) to (6), further comprising
a second semiconductor substrate facing the second surface, wherein
the second semiconductor substrate includes
a reset transistor that resets a potential of the floating diffusion to a predetermined potential,
an amplification transistor that generates a voltage signal corresponding to the charge held in the floating diffusion, and
a selection transistor that controls an output timing of the voltage signal from the amplification transistor.

(8) The imaging apparatus according to (7), wherein
the second semiconductor substrate includes the reset transistor, the amplification transistor, and the selection transistor for each of the pixels.

(9) The imaging apparatus according to (7), wherein
the floating diffusion is shared by two or more of the pixels, and
the second semiconductor substrate includes the reset transistor, the amplification transistor, and the selection transistor for every the two or more of the pixels sharing the floating diffusion.

(10) The imaging apparatus according to (9), wherein
the floating diffusion is shared by four of the pixels.

(11) The imaging apparatus according to any one of (7) to (10), comprising
a third semiconductor substrate located on a surface of the second semiconductor substrate opposite to the light incident surface, in which
the third semiconductor substrate includes a logic circuit that processes the voltage signal output from the second semiconductor substrate.

(12) The imaging apparatus according to any one of (7) to (10), wherein
the first semiconductor substrate and the second semiconductor substrate are electrically connected via a connecting section.

(13) The imaging apparatus according to (12), wherein
the floating diffusion and the amplification transistor are electrically connected via the connecting section.

(14) The imaging apparatus according to (12) or (13), wherein
the second semiconductor substrate and the third semiconductor substrate are electrically connected via a connecting section.

(15) The imaging apparatus according to any one of (1) to (6), wherein
the first semiconductor substrate includes
a reset transistor that resets a potential of the floating diffusion to a predetermined potential,
an amplification transistor that generates a voltage signal corresponding to the charge held in the floating diffusion, and
a selection transistor that controls an output timing of the voltage signal from the amplification transistor.

(16) The imaging apparatus according to (15), wherein
the floating diffusion is shared by the four pixels, and
the first semiconductor substrate includes the reset transistor, the amplification transistor, and the selection transistor every the four pixels sharing the floating diffusion.

(17) The imaging apparatus according to (1), wherein
the gate electrode of the transfer transistor has a substantially L-shape when viewed from above the second surface.

(18) The imaging apparatus according to (1), wherein
the gate electrode of the transfer transistor is located between the pixels adjacent in the column direction.

(19) The imaging apparatus according to (1), wherein
the gate electrode of the transfer transistor is located between the pixels adjacent in the row direction.

(20) The imaging apparatus according to (1), wherein
the transfer transistor of each of the pixels has a plurality of the gate electrodes,
one of the plurality of gate electrodes is located between the pixels adjacent in the column direction, and
another one of the plurality of gate electrodes is located between the pixels adjacent in the row direction.

(21) The imaging apparatus according to (10), wherein
the four of the pixels sharing the floating diffusion are arranged in two rows and two columns, and
the gate electrode of the transfer transistor of each of the four of the pixels sharing the floating diffusion is located between the pixels adjacent among the four of the pixels.

(22) The imaging apparatus according to (21), wherein
a width of the pixel separation section in a portion where corners of the four of the pixels arranged in the two rows and the two columns face each other is wider than a width of the pixel separation section surrounding the four of the pixels.

(23) The imaging apparatus according to (22), wherein
a width of the pixel separation section located between
the adjacent pixels in a cross section when the
imaging apparatus is cut along the thickness direc-
tion of the first semiconductor substrate is
wider on the side of the second surface compared with
the side of the first surface.

(24) The imaging apparatus according to (1), wherein the
pixel separation section includes an insulating layer in
the pixel separation section.

(25) The imaging apparatus according to (24), wherein
the pixel separation section further includes a conduc-
tive material in the pixel separation section, and
the conductive material extends from a side of the first
surface in the thickness direction of the first semi-
conductor substrate.

(26) The imaging apparatus according to (25), wherein the
conductive material includes polysilicon.

(27) The imaging apparatus according to (25), wherein the
conductive material contains tungsten.

(28) An electronic apparatus comprising an imaging appa-
ratus including a first semiconductor substrate, a plu-
rality of pixels arranged along a row direction and a
column direction on the first semiconductor substrate,
the plurality of pixels being adjacent to each other, and
a pixel separation section that partitions the first semi-
conductor substrate into a plurality of pixel regions in
which the pixels are respectively arranged, wherein
each of the plurality of pixels includes
a photoelectric conversion section that is located in one
of the pixel regions partitioned by the pixel separa-
tion section and generates a charge according to
incident light,
a floating diffusion that holds the charge generated by
the photoelectric conversion section, and
a transfer transistor that transfers the charge from the
photoelectric conversion section to the floating dif-
fusion, and
the transfer transistor has a gate electrode that extends
in the pixel separation section, along a thickness
direction of the first semiconductor substrate, from a
second surface of the first semiconductor substrate
located on an opposite side to a first surface that is a
light incident surface of the first semiconductor
substrate.

REFERENCE SIGNS LIST

1 IMAGING APPARATUS
10 FIRST SUBSTRATE
11, 21, 31 SEMICONDUCTOR SUBSTRATE
11a LIGHT INCIDENT SURFACE
11b SURFACE
12 PIXEL
13 PIXEL REGION
20 SECOND SUBSTRATE
22 READOUT CIRCUIT
23 PIXEL DRIVE LINE
24 VERTICAL SIGNAL LINE
30 THIRD SUBSTRATE
32 LOGIC CIRCUIT
33 VERTICAL DRIVE CIRCUIT
34 COLUMN SIGNAL PROCESSING CIRCUIT
35 HORIZONTAL DRIVE CIRCUIT
36 SYSTEM CONTROL CIRCUIT
100 IMAGING ELEMENT
101 PHOTOELECTRIC CONVERSION SECTION

102 TRANSFER TRANSISTOR
102a, 102a-1, 102a-2, 300 GATE
102b, 102c ELECTRODE
103 FLOATING DIFFUSION
110 CONNECTING SECTION
120 PIXEL SEPARATION SECTION
120a GATE ELECTRODE
120A FIRST REGION
120B SECOND REGION
130 P-TYPE LAYER
140 FIXED CHARGE FILM
150 N-TYPE DIFFUSION LAYER
160, 302 P-TYPE DIFFUSION LAYER
201 RESET TRANSISTOR
202 AMPLIFICATION TRANSISTOR
203 SELECTION TRANSISTOR
204 CONVERSION EFFICIENCY SWITCHING
TRANSISTOR
304 STI
700 CAMERA
710 OPTICAL LENS
712 SHUTTER MECHANISM
714 DRIVE CIRCUIT UNIT
716 SIGNAL PROCESSING CIRCUIT UNIT
900 SMARTPHONE
901 CPU
902 ROM
903 RAM
904 STORAGE DEVICE
905 COMMUNICATION MODULE
906 COMMUNICATION NETWORK
907 SENSOR MODULE
910 DISPLAY DEVICE
911 SPEAKER
912 MICROPHONE
913 INPUT DEVICE
914 BUS
12000 VEHICLE CONTROL SYSTEM
12001 COMMUNICATION NETWORK
12010 DRIVING SYSTEM CONTROL UNIT
12020 BODY SYSTEM CONTROL UNIT
12030 OUTSIDE-VEHICLE INFORMATION DETECT-
ING UNIT
12031 IMAGING SECTION
12040 IN-VEHICLE INFORMATION DETECTING
UNIT
12041 DRIVER STATE DETECTING SECTION
12050 INTEGRATED CONTROL UNIT
12051 MICROCOMPUTER
12052 SOUND/IMAGE OUTPUT SECTION
12053 VEHICLE-MOUNTED NETWORK I/F
12061 AUDIO SPEAKER
12062 DISPLAY SECTION
12063 INSTRUMENT PANEL
12100 VEHICLE
12101, 12102, 12103, 12104, 12105 IMAGING SEC-
TION
12111, 12112, 12113, 12114 IMAGING RANGE

What is claimed is:

1. An imaging apparatus, comprising:
a first semiconductor substrate;
a plurality of pixels arranged along a row direction and a
column direction on the first semiconductor substrate,
the plurality of pixels being adjacent to each other, and
a pixel separation section that partitions the first semi-
conductor substrate into a plurality of pixel regions in
which the pixels are respectively arranged, wherein each of the plurality of pixels includes a photoelectric conversion section that is located in one of the pixel regions partitioned by the pixel separation section and generates a charge according to incident light, a floating diffusion that holds the charge generated by the photoelectric conversion section, and a transfer transistor that transfers the charge from the photoelectric conversion section to the floating diffusion, and the transfer transistor has a gate electrode that extends into the pixel separation section, along a thickness direction of the first semiconductor substrate, from a second surface of the first semiconductor substrate located on an opposite side to a first surface that is a light incident surface of the first semiconductor substrate.

2. The imaging apparatus according to claim 1, wherein the gate electrode of the transfer transistor extends into the pixel separation section adjacent to the floating diffusion.

3. The imaging apparatus according to claim 2, wherein the gate electrode extends from the second surface to a midway of the first semiconductor substrate along the thickness direction of the first semiconductor substrate.

4. The imaging apparatus according to claim 1, wherein the floating diffusion contains an impurity of a first conductivity type, and each of the pixels includes a diffusion region provided at a position having a point symmetrical relationship with the floating diffusion with respect to a center point of the pixel when viewed from above the second surface, and containing an impurity of a second conductivity type different from the first conductivity type.

5. The imaging apparatus according to claim 1, further comprising a second semiconductor substrate facing the second surface, wherein the second semiconductor substrate includes a reset transistor that resets a potential of the floating diffusion to a predetermined potential, an amplification transistor that generates a voltage signal corresponding to the charge held in the floating diffusion, and a selection transistor that controls an output timing of the voltage signal from the amplification transistor.

6. The imaging apparatus according to claim 5, wherein the second semiconductor substrate includes the reset transistor, the amplification transistor, and the selection transistor for each of the pixels.

7. The imaging apparatus according to claim 5, wherein the floating diffusion is shared by two or more of the pixels, and the second semiconductor substrate includes the reset transistor, the amplification transistor, and the selection transistor for every the two or more of the pixels sharing the floating diffusion.

8. The imaging apparatus according to claim 7, wherein the floating diffusion is shared by four of the pixels.

9. The imaging apparatus according to claim 5, wherein the first semiconductor substrate and the second semiconductor substrate are electrically connected via a connecting section.

10. The imaging apparatus according to claim 9, wherein the floating diffusion and the amplification transistor are electrically connected via the connecting section.

11. The imaging apparatus according to claim 1, wherein the gate electrode of the transfer transistor has a substantially L-shape when viewed from above the second surface.

12. The imaging apparatus according to claim 1, wherein the gate electrode of the transfer transistor is located between the pixels adjacent in the column direction.

13. The imaging apparatus according to claim 1, wherein the gate electrode of the transfer transistor is located between the pixels adjacent in the row direction.

14. The imaging apparatus according to claim 1, wherein the transfer transistor of each of the pixels has a plurality of the gate electrodes, one of the plurality of gate electrodes is located between the pixels adjacent in the column direction, and another one of the plurality of gate electrodes is located between the pixels adjacent in the row direction.

15. The imaging apparatus according to claim 8, wherein the four of the pixels sharing the floating diffusion are arranged in two rows and two columns, and the gate electrode of the transfer transistor of each of the four of the pixels sharing the floating diffusion is located between the pixels adjacent among the four of the pixels.

16. The imaging apparatus according to claim 15, wherein a width of the pixel separation section in a portion where corners of the four of the pixels arranged in the two rows and the two columns face each other is wider than a width of the pixel separation section surrounding the four of the pixels.

17. The imaging apparatus according to claim 1, wherein the pixel separation section includes an insulating layer in the pixel separation section.

18. The imaging apparatus according to claim 17, wherein the pixel separation section further includes a conductive material in the pixel separation section, and the conductive material extends from a side of the first surface in the thickness direction of the first semiconductor substrate.

19. The imaging apparatus according to claim 18, wherein the conductive material includes polysilicon.

20. An electronic apparatus comprising an imaging apparatus including a first semiconductor substrate, a plurality of pixels arranged along a row direction and a column direction on the first semiconductor substrate, the plurality of pixels being adjacent to each other, and a pixel separation section that partitions the first semiconductor substrate into a plurality of pixel regions in which the pixels are respectively arranged, wherein each of the plurality of pixels includes a photoelectric conversion section that is located in one of the pixel regions partitioned by the pixel separation section and generates a charge according to incident light, a floating diffusion that holds the charge generated by the photoelectric conversion section, and a transfer transistor that transfers the charge from the photoelectric conversion section to the floating diffusion, and the transfer transistor has a gate electrode that extends in the pixel separation section, along a thickness direction of the first semiconductor substrate, from a second surface of the first semiconductor substrate located on an opposite side to a first surface that is a light incident surface of the first semiconductor substrate.

* * * * *